(12) United States Patent
Kirpalani

(10) Patent No.: US 12,017,155 B2
(45) Date of Patent: Jun. 25, 2024

(54) ELECTROSORPTIVE CAVITATION DEVICES AND METHODS FOR PHASE SEPARATION

(71) Applicant: National Research Council of Canada, Ottawa (CA)

(72) Inventor: Deepak M. Kirpalani, Nepean (CA)

(73) Assignee: National Research Council of Canada, Ottawa (CA)

( * ) Notice: Subject to any disclaimer, the term of this patent is extended or adjusted under 35 U.S.C. 154(b) by 1043 days.

(21) Appl. No.: 16/494,189

(22) PCT Filed: Mar. 13, 2018

(86) PCT No.: PCT/CA2018/050299
§ 371 (c)(1),
(2) Date: Sep. 13, 2019

(87) PCT Pub. No.: WO2018/165750
PCT Pub. Date: Sep. 20, 2018

(65) Prior Publication Data
US 2020/0086237 A1    Mar. 19, 2020

Related U.S. Application Data

(60) Provisional application No. 62/471,060, filed on Mar. 14, 2017.

(51) Int. Cl.
*B01D 17/06* (2006.01)
*C02F 1/34* (2023.01)
(Continued)

(52) U.S. Cl.
CPC ............ *B01D 17/06* (2013.01); *C02F 1/34* (2013.01); *C02F 1/465* (2013.01); *C11B 1/10* (2013.01);
(Continued)

(58) Field of Classification Search
CPC .................................................. B01D 17/06
See application file for complete search history.

(56) References Cited

U.S. PATENT DOCUMENTS

| | | |
|---|---|---|
| 7,762,715 B2 | 7/2010 | Gordon et al. |
| 8,002,992 B2 | 8/2011 | Foret |

(Continued)

FOREIGN PATENT DOCUMENTS

| | | |
|---|---|---|
| CA | WO2010123903 | 10/2010 |
| CN | 2672646 | 1/2005 |

(Continued)

OTHER PUBLICATIONS

Supplementary European Search Report dated Dec. 11, 2020 from EP Application No. 18767266.2.

(Continued)

*Primary Examiner* — Peter Keyworth

(57) ABSTRACT

Provided herein are phase separation devices and methods for performing phase separation of an aqueous mixture. Said devices and methods may include a cavitation component for cavitating the aqueous mixture to produce a cavitated aqueous mixture; and an electrosorption component for performing an electrosorptive phase separation of the cavitated aqueous mixture. Such devices and methods may be used for phase separation of aqueous mixtures including algal aqueous mixtures and/or mining or waste water aqueous mixtures, for example.

14 Claims, 62 Drawing Sheets

(51) Int. Cl.
*C02F 1/465* (2023.01)
*C11B 1/10* (2006.01)
*C02F 1/461* (2023.01)
*C02F 103/10* (2006.01)
*C02F 103/16* (2006.01)

(52) U.S. Cl.
CPC ............... *C02F 2001/46171* (2013.01); *C02F 2103/10* (2013.01); *C02F 2103/16* (2013.01)

(56) References Cited

U.S. PATENT DOCUMENTS

| | | | |
|---|---|---|---|
| 8,673,129 | B2 | 3/2014 | Gordon et al. |
| 8,673,154 | B2 | 3/2014 | Kniep et al. |
| 8,771,499 | B2 | 7/2014 | McCutchen et al. |
| 8,808,529 | B2 | 8/2014 | McAlister |
| 8,845,906 | B2 | 9/2014 | Henley |
| 8,968,571 | B2 | 3/2015 | Lee et al. |
| 2007/0056611 | A1 | 3/2007 | Martin |
| 2010/0290307 | A1 | 11/2010 | Gordon et al. |
| 2011/0147231 | A1 | 6/2011 | Gordon |
| 2012/0129244 | A1 | 5/2012 | Green et al. |
| 2012/0205301 | A1 | 8/2012 | McGuire et al. |
| 2013/0042756 | A1 | 2/2013 | Oda et al. |
| 2014/0017754 | A1 | 1/2014 | Kale et al. |
| 2014/0116942 | A1 | 5/2014 | Gordon et al. |
| 2014/0251904 | A1* | 9/2014 | Ranade ............ C02F 3/28 210/205 |
| 2014/0263093 | A1* | 9/2014 | Sprague ............ C02F 1/34 210/748.16 |

FOREIGN PATENT DOCUMENTS

| | | |
|---|---|---|
| CN | 201467824 U | 5/2010 |
| CN | 101948154 | 1/2011 |
| CN | 101948154 A | 1/2011 |
| CN | 101948154 A1 | 1/2011 |
| CN | 102442746 | 5/2012 |
| EP | 2756068 A1 | 7/2014 |
| JP | 52-132546 | 11/1977 |
| JP | 2004-122045 | 4/2004 |
| JP | 2004-174325 | 6/2004 |
| JP | 2012-523849 | 10/2012 |
| JP | 2015-508016 | 3/2015 |
| SU | 625741 A1 | 9/1978 |
| WO | 2010/123903 | 10/2010 |
| WO | 2013/116357 | 8/2013 |

OTHER PUBLICATIONS

Yujie, Feng, Applications of Electrochemical Technology in Environmental Engineering, Chemical Industry Press, pp. 103-104, May 2002 (Chinese publication).
Yujie, Feng, Applications of Electrochemical Technology in Environmental Engineering, Chemical Industry Press, pp. 103-104, May 2002 (English translation).
Moshen, Cui, High-Pressure Water Jet Technologies, Coal Industry Press, pp. 108-110, Oct. 1993 (Chinese publication).
Moshen, Cui, High-Pressure Water Jet Technologies, Coal Industry Press, pp. 108-110, Oct. 1993 (English translation).
Office Action dated Dec. 3, 2021 from corresponding application EP 18767266.2.
International Search Report and Written Opinion for Application No. PCT/CA2018/050299.
International Preliminary Report on Patentability for Application No. PCT/CA2018/050299 dated Sep. 26, 2019.
Japanese Office Action dated Jan. 5, 2022.
English translation of Japanese Office Action dated Jan. 5, 2022.
Lee, Andrew K.; Lewis, David M.; Ashman, Peter J., Microalgal cell disruption by hydrodynamic cavitation for the production of biofuels, J Appl Phycol 27, 1881-1889 (2015), Dec. 16, 2014.
Yang, Kun-Lin; Ying, Tung-yU; Yiacoumi, Sotira; Tsouris, Costas; Vittoratos, E. Steven, Electrosprption of ions from aqueous solutions by carbon aerogel: an electrical double-layer model, Langmuir 2001, 1961-1969, Feb. 16, 2001.
Office Action dated Jun. 2, 2022 from corresponding Chinese Application No. 201880031308.9.

* cited by examiner

D

A

B

C

D

A

B Small 0.21 in. ≤ A ≤ 0.84 in.
0.29 in. ≤ B ≤ 0.87 in.

C Large

A

B $15° \leq C \leq 60°$
$1.18$ in. $\leq X \leq 4.70$ in.

C

D

*Full water phase separation not attained

Setup I

Setup I after few hours of settling time

Setup II

Setup II after few hours of settling time

Setup III

Setup III after few hours of settling time

Raw Sample

Sample immediately after testing

Sample after 20 hours of rest

Low pressure Cavitation

Additional Photos

Comparison of low pressure test (left) and high pressure test (right) water samples, taken from float cell (collection vessel)

A

B

C

D

A

B

C

D

E

F

G

ELECTROSORPTIVE CAVITATION DEVICES AND METHODS FOR PHASE SEPARATION

FIELD OF INVENTION

The present invention relates generally to devices and methods for phase separation of aqueous mixtures. More specifically, the present invention relates to phase separation devices and methods using electrosorptive cavitation.

BACKGROUND

Many industrial processes involve one or more phase separation steps in which aqueous mixtures are processed to separate hydrophilic and hydrophobic phases or components, and/or to separate out contaminants, desirable products, or other components present in an aqueous mixture. In the field of algae processing, for example, algal lipids or oils are extracted from algae cultivated in an aqueous environment. Phase separation is also performed as part of waste water management operations, and in industrial mining operations, for example.

Lipid extraction and/or phase separation of aqueous mixtures may be costly, time-consuming, and/or may involve high energy demands. By way of example, algal biofuel production typically involves cell disruption, harvesting, de-watering, and lipid extraction steps. Such harvesting and de-watering has conventionally involved filtration, reverse osmosis, electrocoagulation-electroflocculation (EF-EC), centrifugation, and/or drum drying for concentration, and lipid extraction involving disruption or conversion of algae using pressure, stress, heat, or solvent treatment.

Currently, mechanical and high energy cell disruption methods such as high-pressure homogenisers or sonication typically involve an energy input in the order of hundreds of $MJ\ kg^{-1}$ of the dry mass. Heat based approaches following the concentration of the biomass to at least 10 wt % may also lead to a lower quality of fuel while consuming the biomass, complicating recovery of other potentially valuable products. In addition, many laboratory process methods are not readily scalable, making commercial or pilot scale biofuel production difficult.

Hydrodynamic cavitation (HC) has been previously used for cell disruption, however the cell disruption by HC was periplasmic and thus mainly confined to the cell wall and membrane, and involved solvents for extraction following the HC process and additional unit operations for separation of the phases.

Alternative, additional, and/or improved devices and/or methods for phase separation of aqueous mixtures are desirable.

SUMMARY OF INVENTION

In certain embodiments, there are provided herein devices and methods for phase separation of aqueous mixtures using electrosorptive cavitation. Cavitation of aqueous mixtures may be used to generate a cavitated aqueous mixture, which may be subjected to electrosorption, thereby providing phase separation of the aqueous mixture. Such combination of cavitation and electrosorption as described herein may be used to achieve phase separation in a variety of different aqueous mixtures, including algal aqueous mixtures and/or mining or waste water aqueous mixtures, for example.

In an embodiment, there is provided herein a phase separation device for performing phase separation of an aqueous mixture, said device comprising:

a cavitation assembly for cavitating the aqueous mixture to produce a cavitated aqueous mixture; and an electrosorption assembly for receiving the cavitated aqueous mixture and performing an electrosorptive phase separation of the cavitated aqueous mixture.

In an embodiment of the above device, the device may be a lipid extraction and phase separation device for performing phase separation of an aqueous mixture, said device comprising:

a cavitation assembly for cavitating the aqueous mixture to produce a cavitated aqueous mixture with extracted lipids; and an electrosorption assembly for receiving the cavitated aqueous mixture and performing an electrosorptive phase separation of the cavitated aqueous mixture.

In another embodiment of the above device or devices, the cavitated aqueous mixture may comprise cavitation voids comprising vapour, and the electrosorptive phase separation of the cavitated aqueous mixture may include electrosorptive vapour bubble generation.

In still another embodiment of the above device or devices, the electrosorption assembly may perform electrosorptive phase separation including microflotation.

In yet another embodiment of the above device or devices, the cavitation assembly may comprise a tangential flow aqueous mixture inlet, a vortex stabilizer in communication with the inlet, and a nozzle in communication with the vortex stabilizer, the nozzle comprising a divergent outlet in communication with the electrosorption assembly.

In another embodiment of the above device, the vortex stabilizer may comprise a vortex stabilizer insert comprising a conical portion having a longitudinal slit for allowing vortexing aqueous mixture to exit the vortex stabilizer and enter the nozzle.

In yet another embodiment of the above device or devices, the nozzle may comprise a restriction flow channel having a length L and a diameter d, wherein the restriction flow channel receives the aqueous mixture and directs the aqueous mixture to the divergent outlet.

In another embodiment of the above device, the restriction flow channel may have a d/L ratio of about 0.005-0.02.

In still another embodiment of the above device or devices, d may be about 0.03-0.0625 inches.

In another embodiment of the above device or devices, the divergent outlet may comprise a conical channel which progressively widens toward the electrosorption assembly with a divergent angle of about 30°-45°.

In still another embodiment of the above device or devices, the divergent outlet may have a diameter to length ratio of about 0.1875-0.3.

In another embodiment of the above device or devices, the electrosorption assembly may comprise a cathode and an anode, the cathode forming an outer shell defining an interior core, with the anode disposed within the core. In certain embodiments, the cathode may comprise a conductive spiral tube with a central core, and the anode may comprise a conductive member disposed within the central core. In certain embodiments, the cathode may comprise a longitudinal tube, coil, spiral, or other suitable structure, and may define an interior core having a longitudinal axis along which the anode is disposed. The cathode may be substantially continuous, or may comprise a series of individual members longitudinally oriented in series.

In yet another embodiment, the cathode may comprise a conductive spiral coil or tube comprising two or more turns, wherein each turn, in combination with the anode, may form a distinct electrochemical cell. In certain embodiments, the cathode may comprise an array of rings aligned in series, each forming a distinct electrochemical cell in combination with the electrode. The person of skill in the art having regard to the teachings of the instant application will be aware of suitable cathode/anode configurations, and will be able to select a suitable cathode/anode configuration suitable for a particular application.

In still another embodiment of the above device or devices, the cathode may comprise a carbon-based fiber conductive material, anodized aluminium, $TiO_2$, brass, or stainless steel.

In yet another embodiment of the above device or devices, the device may be configured vertically or on an incline, such that the electrosorption assembly receives the cavitated aqueous mixture at a bottom end thereof and performs electrosorptive phase separation of the cavitated aqueous mixture as the cavitated aqueous mixture moves toward a top end of the electrosorption assembly, the top end being elevated relative to the bottom end. In certain embodiments, the cavitated aqueous mixture may exit the top end of the electrosorption assembly and be collected in a floatation cell or other phase separation tank.

In still another embodiment of the above device or devices, the electrosorption assembly may comprise a cathode and an anode, the cathode forming an outer shell defining an interior core, and the anode disposed within the core.

In yet another embodiment of the above device or devices, the cathode may comprise a continuous conductive member.

In another embodiment of the above device or devices, wherein the cathode may comprise a plurality of individual conductive members longitudinally aligned in series.

In still another embodiment, the cathode may comprise a tube, spiral, or coil. In yet another embodiment, the cathode may comprise two or more tubes, spirals, coils, or rings, or a combination thereof. In another embodiment, the tube, spiral, or coil may define a helix comprising two or more turns, wherein each turn, in combination with the anode, forms a distinct electrochemical cell. In still another embodiment, the cathode may comprise two or more spaced apart rings aligned in series, which form, in combination with the anode, a plurality of distinct electrochemical cells.

In certain embodiments, there is provided herein a method for continuous phase separation of an aqueous mixture, said method comprising:
cavitating the aqueous mixture to produce a cavitated aqueous mixture; and
performing electrosorptive phase separation of the cavitated aqueous mixture.

In another embodiment of the above method, the cavitating the aqueous mixture produces cavitation voids comprising vapour within the cavitated aqueous mixture, and wherein the electrosorptive phase separation of the cavitated aqueous mixture induces electrosorptive vapour bubble generation.

In yet another embodiment of the above method or methods, the electrosorptive phase separation may include microflotation.

In still another embodiment of the above method or methods, the step of cavitating may comprise passing the aqueous mixture through a cavitation assembly as defined hereinabove.

In another embodiment of the above method or methods, the step of performing electrosorptive phase separation may comprise passing the cavitated aqueous mixture through an electrosorption assembly as defined hereinabove.

In another embodiment of any of the above device or devices, the aqueous mixture may comprise a microalgal culture. In certain embodiments, the microalgal culture may comprise *Chlorella vulgaris* algal biomass, Scenedesmus algal biomass, or a combination thereof, for example.

In still another embodiment of any of the above method or methods, the aqueous mixture may comprise a microalgal culture. In certain embodiments, the microalgal culture may comprise *Chlorella vulgaris* algal biomass, Scenedesmus algal biomass, or a combination thereof, for example.

In another embodiment of the above device or devices, the electrosorptive phase separation may include algal lipid extraction.

In another embodiment of the above method or methods, the electrosorptive phase separation may include algal lipid extraction.

Figure 57:
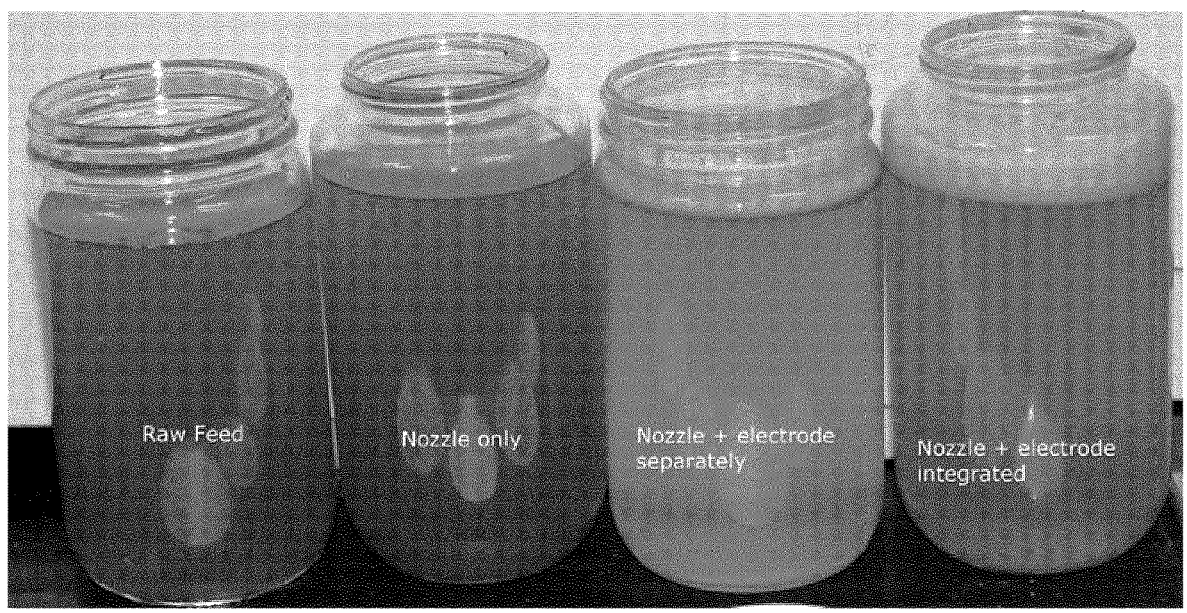
Figure 58:
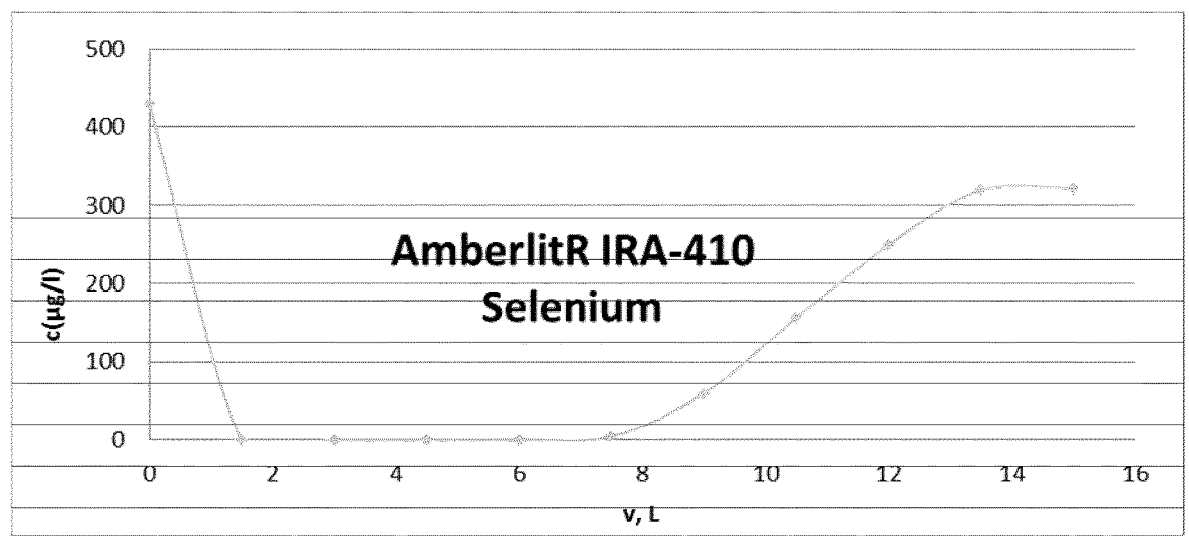
Figure 59:
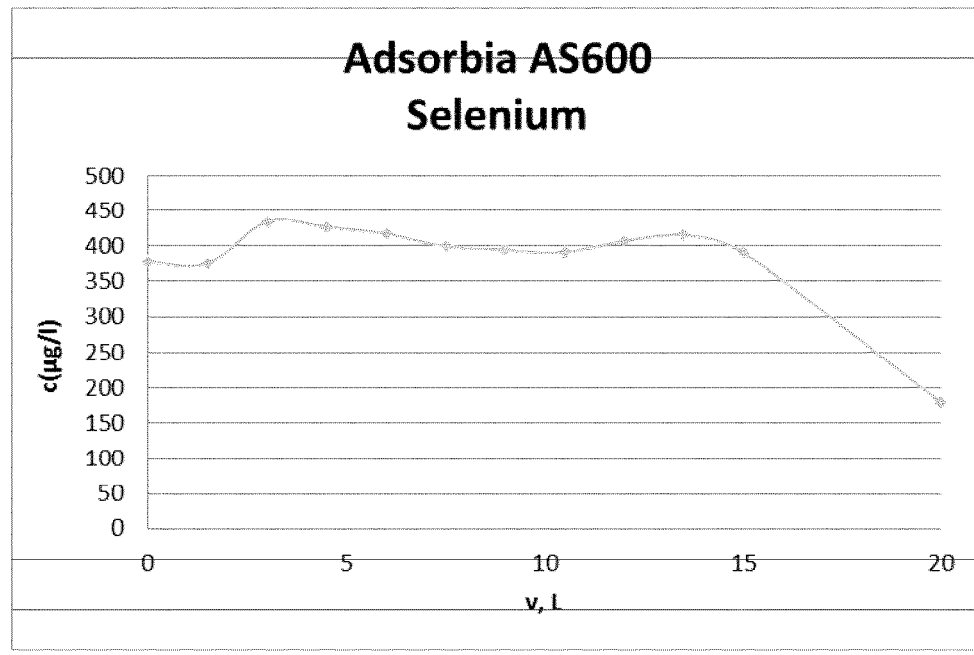

(A) Raw feed 0.5 g/L *Botryococcus braunii* Race A; (B) Nozzle only; (C) Nozzle→electrode separately (Aqueous flow-through); (D) Nozzle→electrode separately (Foam); (E) Nozzle+electrode integrated (Aqueous flow-through); (F) Nozzle+electrode integrated (Foam); and (G) Nozzle+electrode integrated (Aqueous settled);

FIG. 57 shows photographs of the samples of biomass analysed using continuous electrosorptive cavitation compared with electrosorption and cavitation carried out in separate processes. (1) Raw Feed, (2) Cavitation Output (Nozzle only), (3) Cavitation with a residence time of 5 minutes followed by electrosorption (Nozzle+electrode separately) and (4) Electrosorptive Cavitation (Nozzle+electrode integrated);

FIG. 58 shows rapid selenium concentration increase from strong base anion exchange in metallurgical coal affected water outlet stream; and FIG. 59 shows that selenium effluent concentration was not affected sufficiently by adsorption processing with Adsorbia As 600 adsorbent.

DETAILED DESCRIPTION

Described herein are devices and methods for phase separation of aqueous mixtures using electrosorptive cavitation. Cavitation of aqueous mixtures may be used to generate a cavitated aqueous mixture, which may be subjected to electrosorption, thereby providing phase separation of the aqueous mixture. By way of example, in certain embodiments, the devices and methods described herein may be for lipid extraction from a lipid-containing aqueous mixture, such as an algal aqueous mixture. In such embodiments, cavitation of the aqueous mixture may generate a cavitated aqueous mixture comprising algal biomass, lipids, and water, which may be subjected to electrosorption. It will be appreciated that embodiments and examples are provided for illustrative purposes intended for those skilled in the art, and are not meant to be limiting in any way.

In an embodiment, there is provided herein a phase separation device for performing phase separation of an aqueous mixture, said device comprising:

a cavitation assembly for cavitating the aqueous mixture to produce a cavitated aqueous mixture; and an electrosorption assembly for receiving the cavitated aqueous mixture and performing an electrosorptive phase separation of the cavitated aqueous mixture.

In another embodiment, there is provided herein a method for continuous phase separation of an aqueous mixture, said method comprising:

cavitating the aqueous mixture to produce a cavitated aqueous mixture; and performing electrosorptive phase separation of the cavitated aqueous mixture.

Figure 14:
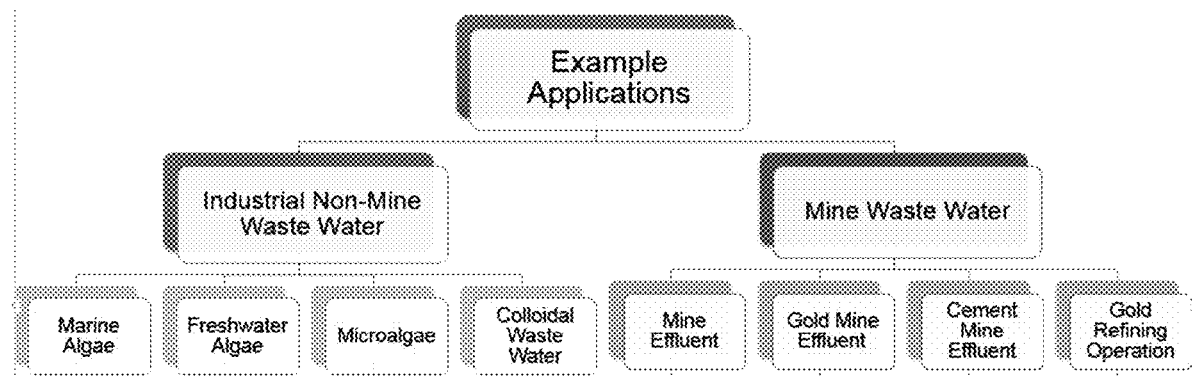
FIG. 14 shows examples of aqueous mixtures for which phase separation may be desired, and industrial or commercial operations commonly associated therewith.

As will be understood, the aqueous mixture may be any suitable aqueous mixture comprising water and one or more suitable components to be separated therefrom. By way of example, suitable aqueous mixtures may include algal aqueous mixtures and/or mining or waste water aqueous mixtures. In certain embodiments, the aqueous mixture may include industrial waste water, or industrial mining waste water. The aqueous mixture may comprise, for example, marine algae, freshwater algae, microalgae, colloidal waste water, mine effluent, gold mine effluent, cement mine effluent, and/or waste water from a gold ore processing and refining operation, metallurgical coal production, another suitable mine water application, and/or a municipal sewage water treatment, for example. The skilled person having regard to the teachings herein will be aware of suitable aqueous mixtures for which phase separation may be desired. FIG. 14 provides certain examples of aqueous mixtures for which phase separation may be desired, and industrial or commercial operations commonly associated therewith.

It is contemplated herein that, in certain embodiments, the aqueous mixture may include an aqueous mixture for which removal of oxyanions such as Arsenic and Selenium may be desired; recovery of base and/or precious metals from effluents may be desired; cyanide destruction may be desired; ammonia removal may be desired; fermentation process water treatment may be desired; removal of contaminants from oils may be desired; and/or lignocellulosic biomass pre-treatment may be desired.

As will be understood, phase separation may include any suitable separation of aqueous mixture components, and may involve partial, substantial, or full phase separation. In certain embodiments, hydrophobic components and/or components having low water solubility present in the aqueous mixture may be separated from a water fraction. By way of example, phase separation may involve formation of separate hydrophobic (i.e. oil, lipid, or oleaginous) and hydrophilic (i.e. water) layers, or isolation/extraction of hydrophobic (i.e. oil, lipid, hydrocarbon) components from the aqueous mixture, or isolation/extraction of mixture components having low or reduced solubility in water, or collection of mixture components such as metals or other cations/anions (which may be, optionally, oxidized) and/or lipids and/or other hydrophobic components on the respective cathode or anode portion of the electrosorption assembly, or any combination thereof.

In certain embodiments, phase separation devices as described herein may be in fluid communication with one or more conventional separation systems, wherein processed liquids exit the phase separation device and enter the conventional separation system for further phase separation and/or isolation. By way of example, phase separation devices as described herein may be in fluid communication with one or more settling chambers, flotation tanks, or skimming tanks (see, for example, U.S. Pat. No. 8,968,571, which is herein incorporated by reference in its entirety) which receive processed sample from the phase separation devices as described herein and allow for further phase separation thereof.

The skilled person will recognize that phase separation as described herein may be used, in certain embodiments, to separate and/or isolate particular components of a given aqueous mixture, and/or to extract/remove particular contaminants from a given aqueous mixture, for example. In certain embodiments, phase separation may involve extraction of desirable components such as, for example, algal lipids/oils, lignocellulosic material, or valuable metals from an aqueous mixture. In certain other embodiments, phase separation may involve regeneration of waste water through removal of one or more hydrophobic or metal contaminants. As will be recognized, the components to be extracted or separated from the aqueous mixture via phase separation will depend on the particular aqueous mixture used, and the particular downstream application(s) of the aqueous mixture and/or component(s) separated therefrom.

The cavitation assembly may be any suitable assembly which can receive the aqueous mixture to be processed, and cavitate the aqueous mixture to produce a cavitated aqueous mixture. As will be understood, the cavitation assembly may process (i.e. cavitate) the aqueous mixture to form cavitation voids comprising vapour in the aqueous mixture. In certain embodiments, and without wishing to be bound by theory, at least some of such cavitation voids may collapse, thereby generating nuclei which may assist in electrosorptive phase separation in the electrosorption assembly, as described in further detail below. As will be understood, in certain embodiments, the cavitation assembly may comprise a nozzle, in which the aqueous mixture is received and directed to a divergent outlet section, as described in further detail below. The skilled person having regard to the teachings herein will be aware of suitable cavitation assembly designs, and will be able to select a suitable cavitation assembly for the particular application.

Where, for example, an algal aqueous mixture is to be processed, cavitation by the cavitation assembly may result in at least some disruption or breakage of the algal cell, thereby exposing desirable algal components such as, for example, algal lipids, which may collect on the cavitation voids. Where, for example, a mining waste water aqueous mixture is to be processed, cavitation by the cavitation assembly and action of the forming/collapsing cavitation voids may result in formation of at least some hydroxyl radicals, which may oxidize metals in the mining waste (i.e. an advanced oxidation (AOP) process), thereby altering metal solubility and/or preparing the metals for cathode attachment in the electrosorption assembly. As will be understood, in certain embodiments, chemical oxygen demand (COD) of an aqueous mixture may be altered by treatment described herein.

In certain embodiments, the cavitation assembly may comprise a tangential flow aqueous mixture inlet, a vortex stabilizer in communication with the inlet, and a nozzle in communication with the vortex stabilizer, the nozzle comprising a divergent outlet in communication with the electrosorption assembly. The tangential flow aqueous mixture inlet and vortex stabilizer may generate a swirl or spiral flow of the aqueous mixture entering the nozzle. The nozzle section may receive the spiral-flowing aqueous mixture, and direct the mixture to a divergent outlet section, as described in further detail below. In certain embodiments, the vortex stabilizer may comprise a vortex stabilizer insert comprising a conical portion having a longitudinal slit for allowing vortexing aqueous mixture to exit the vortex stabilizer and enter the nozzle.

In certain embodiments, the cavitation assembly may comprise a nozzle which may comprise a restriction flow channel having a length L and a diameter d, wherein the restriction flow channel receives the aqueous mixture and directs the aqueous mixture to the divergent outlet. In still another embodiment, the restriction flow channel may have a d/L ratio of about 0.005-0.02, for example. In yet another embodiment, d may be about 0.03-0.0625 inches, for example. In another embodiment, the divergent outlet may comprise a conical channel which progressively widens toward the electrosorption assembly, with a divergent angle of about 30°-45°, for example. In still another embodiment, the divergent outlet may have a diameter to length ratio of about 0.1875-0.3, for example.

The electrosorption assembly may be any suitable assembly which can receive the cavitated aqueous mixture, and perform electrosorptive phase separation of the cavitated aqueous mixture. As will be understood, the electrosorption assembly may comprise a cathode and an anode, to which certain components of the aqueous mixture may attach or agglomerate, thereby facilitating their separation from the aqueous mixture, for example. In certain embodiments, and without wishing to be bound by theory, the electrosorption assembly may multiply cavitation voids in the cavitated aqueous mixture through an advanced oxidation process, thereby providing electrosorptive vapour bubble generation. In certain embodiments, such electrosorptive vapour bubble generation may facilitate phase separation via microflotation. The skilled person having regard to the teachings herein will be aware of suitable electrosorption assembly designs, and will be able to select a suitable electrosorption assembly for the particular application.

In certain embodiments, for example, the electrosorption assembly may comprise a cathode and an anode, the cathode forming an outer shell defining an interior core, with the anode disposed within the core. By way of example, the cathode may comprise a conductive spiral tube with a central core, and the anode may comprise a conductive member disposed within the central core. In certain embodiments, the cathode may comprise, for example, a longitudinal tube, coil, spiral, or other suitable structure, and may define an interior core having a longitudinal axis along which the anode is disposed. The cathode may be substantially continuous, or may comprise a series of individual members longitudinally oriented in series. In yet another embodiment, the cathode may comprise a conductive spiral coil or tube comprising two or more turns, wherein each turn, in combination with the anode, may form a distinct electrochemical cell. In certain embodiments, the cathode may comprise an array of rings aligned in series, each forming a distinct electrochemical cell in combination with the electrode. The person of skill in the art having regard to the teachings of the instant application will be aware of suitable cathode/anode configurations, and will be able to select a suitable cathode/anode configuration suitable for a particular application.

Where, for example, an algal aqueous mixture is to be processed, electrosorptive phase separation by the electrosorption assembly may result in at least some attachment and/or aggregation of algal lipids/oils on the surface of a cathode portion of the electrosorption assembly. Without wishing to be bound by theory, it is believed that algal lipids/oils may accumulate on cavitation voids, nuclei, and/or other voids or vapour bubbles created by action of the cavitation and/or electrosorption assembly, which may then become attached to the cathode portion of the electrosorption assembly. Collapse of cathode-attached cavitation voids and/or other voids or vapour bubbles having algal lipids or oils attached thereto may further promote algal lipid or oil clumping or agglomeration at the cathode. Algal lipids or oils may then be retrieved from the cathode, and/or may be retrieved through flotation or other density separation, for example. By way of example, liquid exiting the electrosorption assembly may be allowed to phase-separate, and the lipid-rich layer may be collected. In certain embodiments, electrosorptive vapour bubble generation in the electrosorption assembly may facilitate phase separation through phase separation, particularly where algal-size bubbles (i.e. about 2-5 μm) are generated through regulation of pressure, flow, and/or energy applied at the electrosorption assembly.

Where, for example, a mining waste water aqueous mixture is to be processed, electrosorptive phase separation by the electrosorption assembly may include accumulation of cationic or oxidized metal species at the cathode, and anionic species at the anode. Action of the hydroxyl radicals resulting from formation/collapse of cavitation voids may result in oxidation of metals in the mining waste, thereby altering metal solubility and/or facilitating metals attachment to the cathode of the electrosorption assembly and corollary anions formed are further reduced in the process.

In certain embodiments, the electrosorption assembly may comprise a cathode and an anode, the cathode comprising a conductive spiral coil or tube defining an inner central core or passage, and the anode comprising a conductive member axially disposed within the central core or passage. In certain embodiments, the conductive spiral coil or tube of the cathode may comprise two or more turns, wherein each turn, in combination with the anode, may form a distinct electrochemical cell. As such will be understood, in certain embodiments, the anode of electrosorption assemblies as described herein are not sacrificial anodes, and the skilled person may therefore select an appropriate anode material accordingly.

In certain embodiments, the spiral cathode and anode may be enclosed within an outer shell, such that the cavitated aqueous mixture exiting the cavitation assembly (and having a spiral flow pattern) may encounter a flow channel having a substantially circular cross-section defined by the outer shell, and may become exposed to the cathode and anode of the electrosorption assembly as it passes through the flow channel. In certain embodiments, the spiral flow of the cavitated aqueous mixture passing through the flow channel, and the spiral structure (i.e. handedness, etc.) of the cathode may be matched, thereby providing reduced fluid flow resistance through the electrosorption apparatus and providing increased contact and residence time between the cavitated aqueous mixture and the electrosorptive assembly.

In certain embodiments, the cathode of the electrosorption assembly may comprise a carbon-based conductive material, copper, aluminium (with and without anodization), $TiO_2$, brass, or stainless steel. In certain embodiments, the anode of the electrosorption assembly may comprise carbon, stainless steel, iron, or aluminium (anodized or non-anodized). The person of skill in the art having regard to the teachings provided herein will be able to select suitable cathode and anode materials based on the particular application, particular contaminants involved, desired effluent discharge limits, and/or other such considerations.

In further embodiments the phase separation device may be configured vertically or on an incline, such that the electrosorption assembly receives the cavitated aqueous mixture at a bottom end thereof and performs electrosorptive phase separation of the cavitated aqueous mixture as the cavitated aqueous mixture moves toward a top end of the electrosorption assembly, the top end being elevated relative to the bottom end. In certain embodiments, the cavitated aqueous mixture may exit the top end of the electrosorption assembly and be collected in a flotation cell or other phase separation tank.

Example 1—An Example Phase Separation Device

Figure 1:
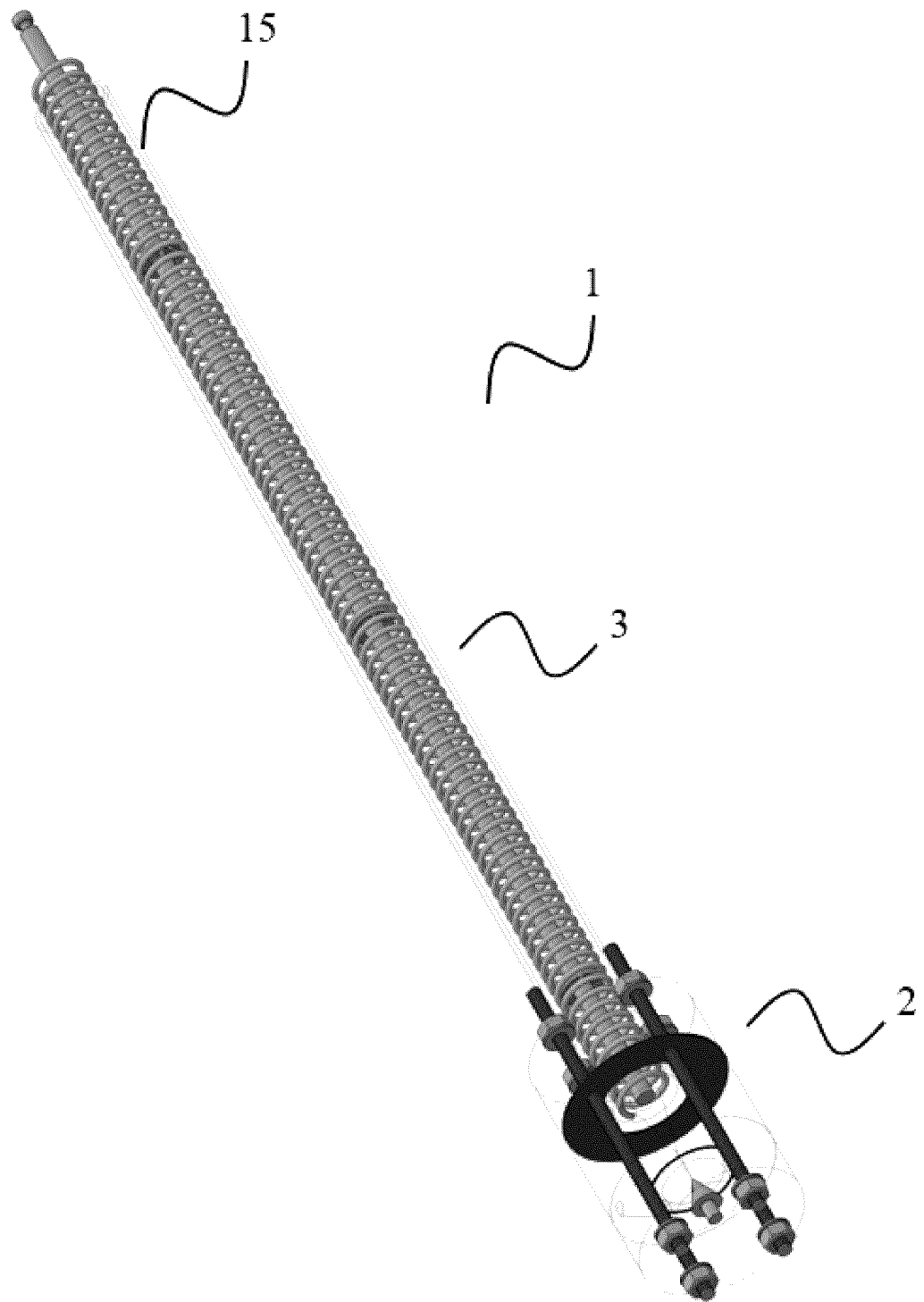
FIG. 1 shows a perspective view of an embodiment of a phase separation device as described herein, with the outer surfaces of the cavitation and electrosorption assemblies made transparent to show interior components of the device.

FIG. 1 shows a perspective view of an embodiment of an "electrosorptive cavitation" phase separation device as described herein. This illustrative device embodiment applies principles of fluid flow in a circular cross section flow channel (i.e. a pipe or tube) and the least resistant path of spiral flow, so as to encourage contact and residence time between the aqueous mixture to be treated and the electrosorption assembly. When applied to algal aqueous mixtures, the illustrated phase separation device may employ cavitating lipid extraction processes enhanced by electrosorption to extract and separate water, lipid and biomass phases in batch, or continuously.

Figure 2:
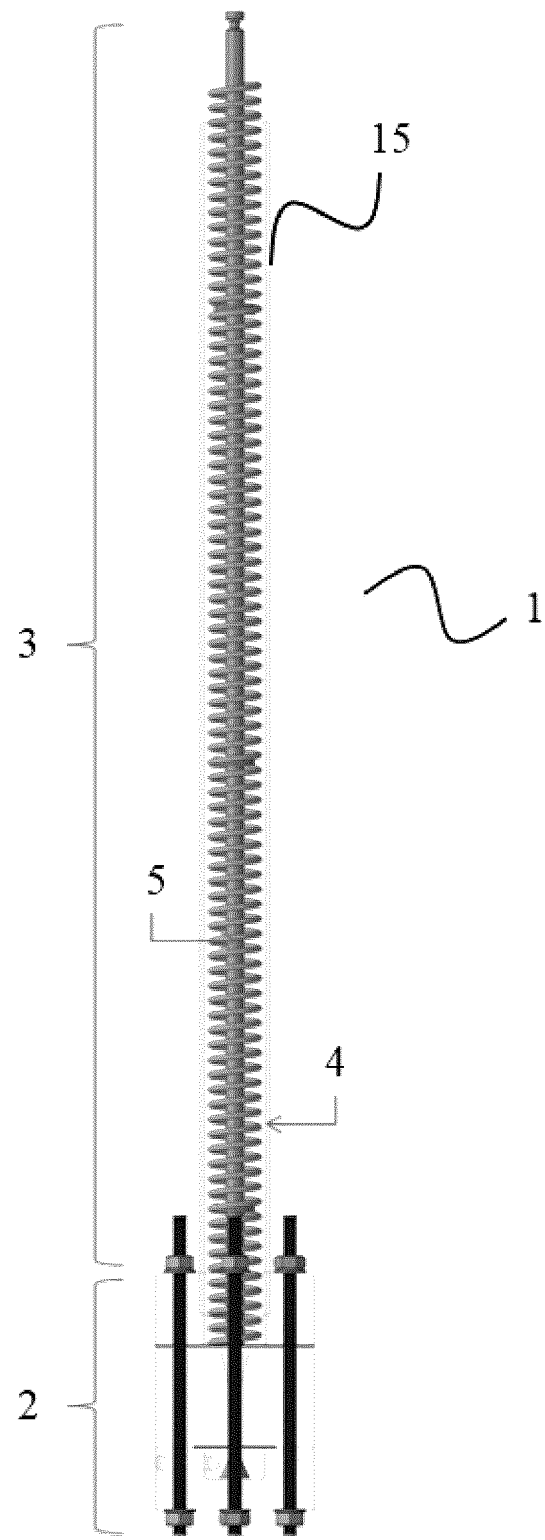
FIG. 2 shows a front plan view of the device shown in FIG. 1, with the outer surfaces of the cavitation and electrosorption assemblies made transparent to show interior components of the device.

The illustrated phase separation device (1) comprises a cavitation assembly (2) for cavitating an aqueous mixture to produce a cavitated aqueous mixture, and an electrosorption assembly (3) for receiving the cavitated aqueous mixture and performing an electrosorptive phase separation of the aqueous mixture. FIG. 2 shows a front plan view of the device shown in FIG. 1. Phase separation device (1) may be used for performing a method for continuous phase separation of an aqueous mixture, said method comprising: cavitating the aqueous mixture to produce a cavitated aqueous mixture; and performing electrosorptive phase separation of the cavitated aqueous mixture. In this example, use of device (1) for performing phase separation of an algal aqueous mixture to obtain algal lipids/oils for biofuel application is described, however it will be understood that such devices are not limited to processing algal aqueous mixtures, and may also be used to process a variety of other suitable aqueous mixtures.

Phase separation device (1) comprises a cavitation assembly (2), which is configured to receive the aqueous mixture to be processed, and cavitate the aqueous mixture to produce a cavitated aqueous mixture. The cavitation assembly (2) cavitates the aqueous mixture to form cavitation voids comprising vapour in the aqueous mixture, at least some of which may collapse, thereby generating nuclei which may assist in electrosorptive phase separation in the electrosorption assembly (3), as described in further detail below. Cavitation by cavitation assembly (2) results in at least some, or a majority of, the disruption or breakage of the algal cells of the aqueous mixture, thereby exposing desirable algal lipids, which collect on the surface of cavitation voids (bubbles) through lipid-bubble surface forces.

Figure 3:
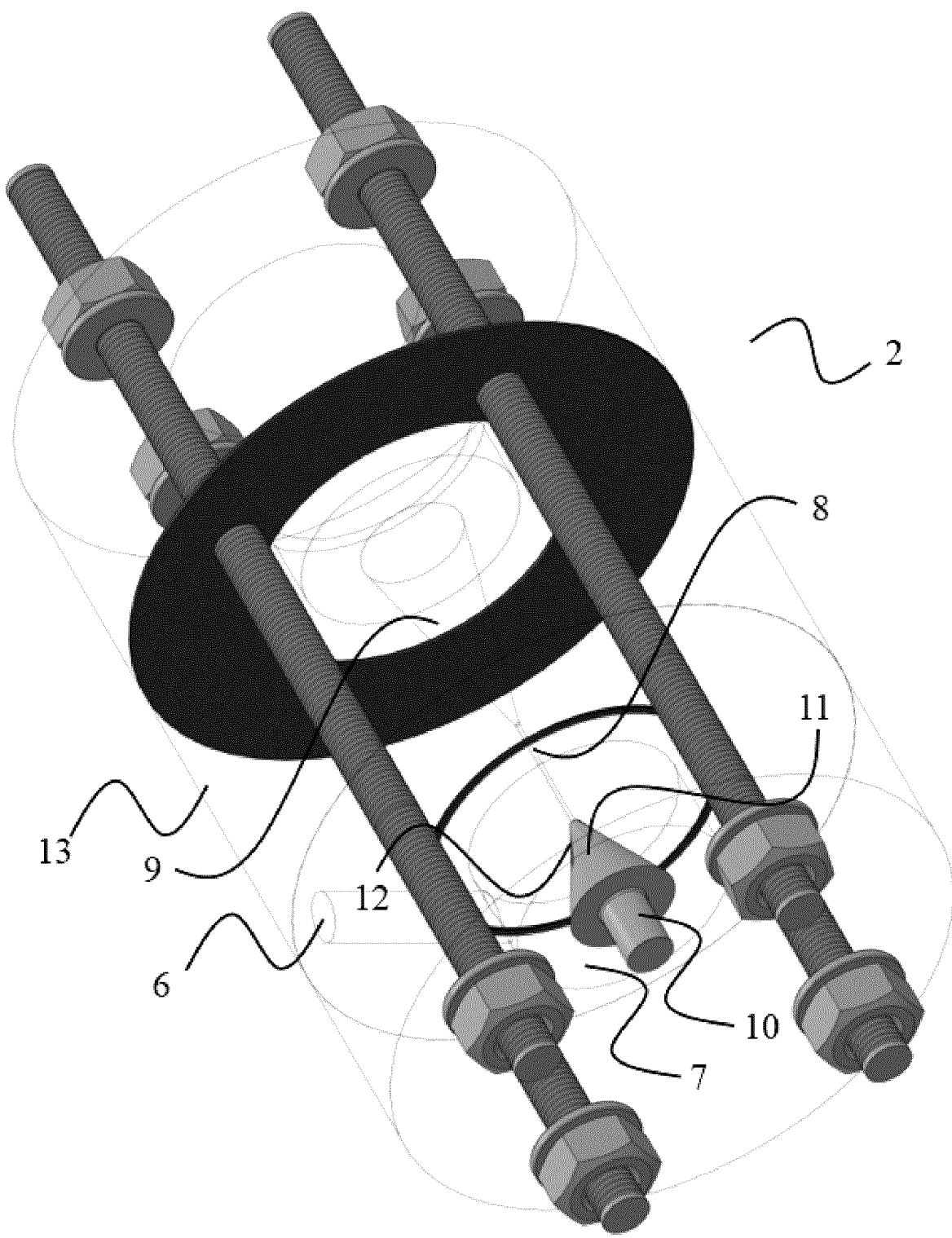
FIG. 3 shows a perspective view of the cavitation assembly of the device shown in FIG. 1, with the outer surfaces of the cavitation assembly made transparent to show interior components of the device.
Figure 4:
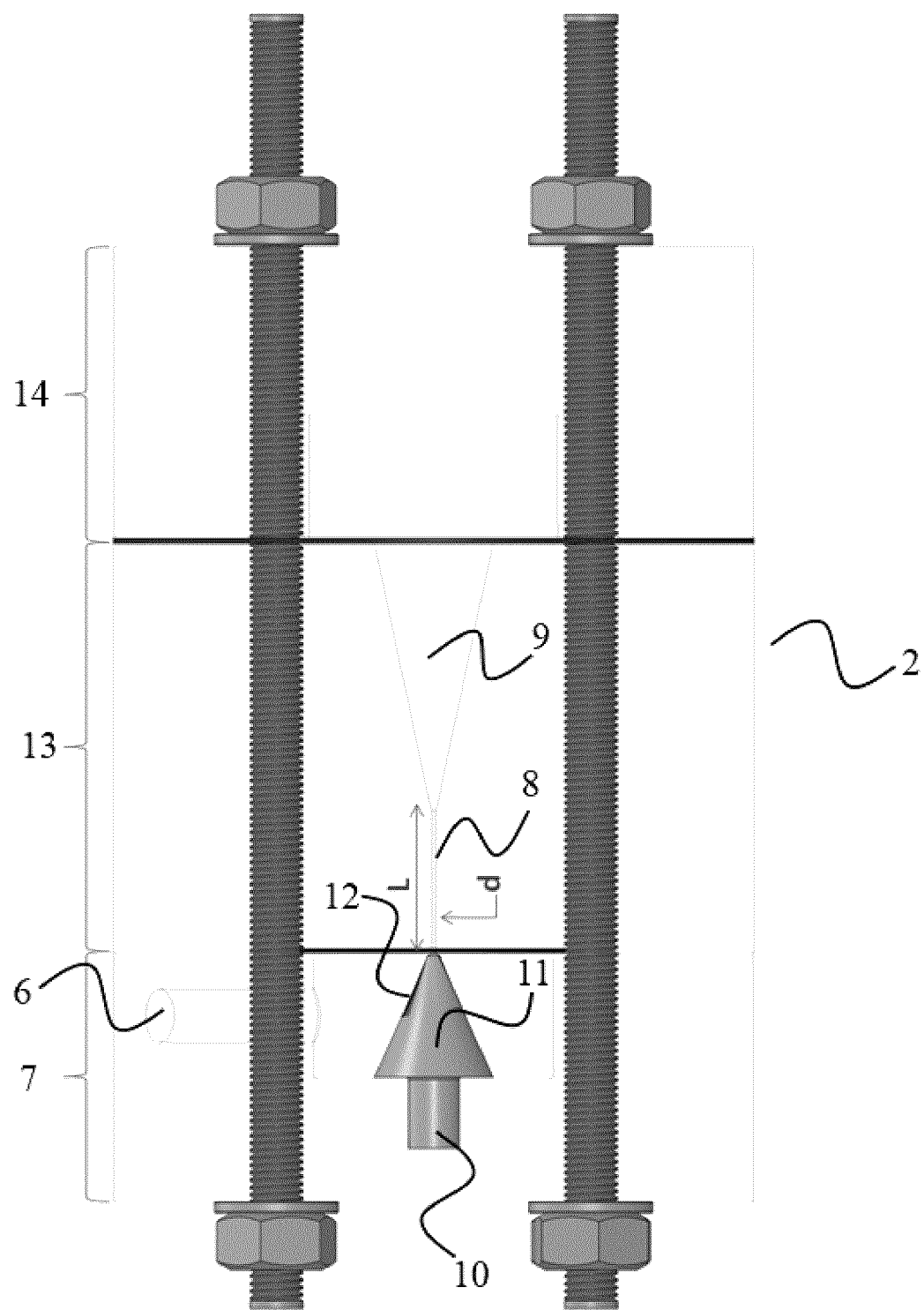
FIG. 4 shows a front plan view of the cavitation assembly of the device shown in FIG. 1, with the outer surface of the cavitation assembly made transparent to show interior components of the device.
Figure 7:
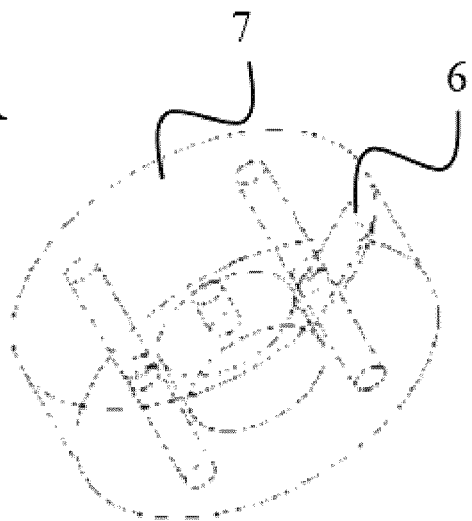
FIG. 7 shows (A) perspective, (B) side plan, (C) side plan, and (D) front plan views of the vortex stabilizer of the cavitation assembly of the device shown in FIG. 1.
Figure 7:
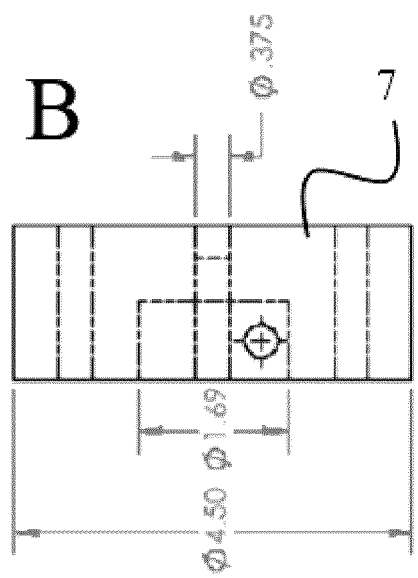
Figure 7:
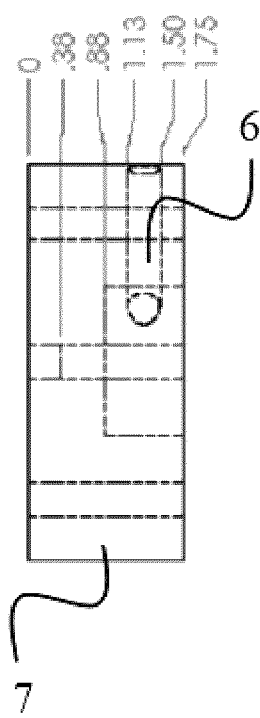
Figure 7:
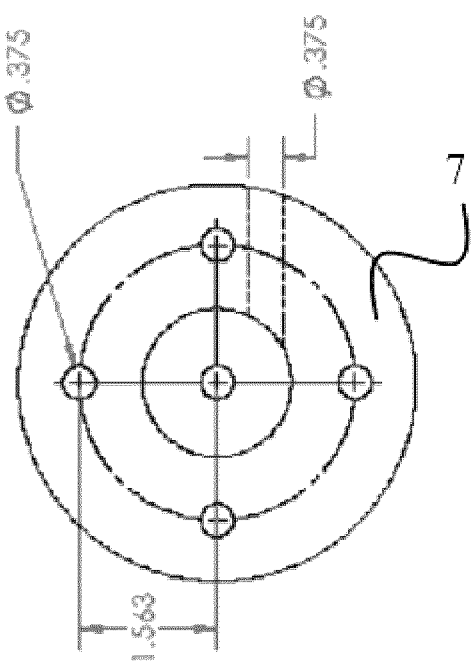
Figure 8:
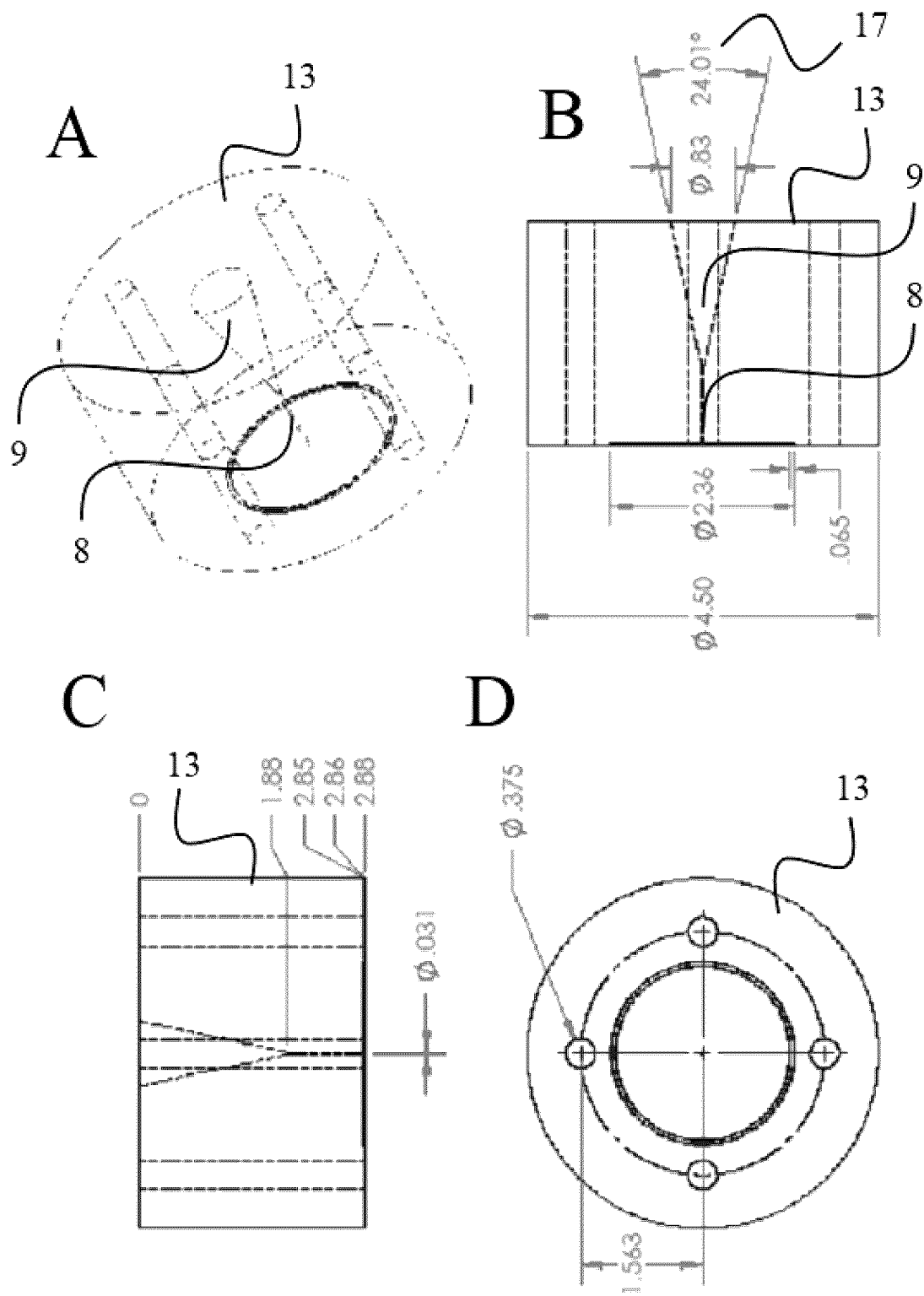
FIG. 8 shows (A) perspective, (B) side plan, (C) side plan, and (d) front plan views of the nozzle of the cavitation assembly of the device shown in FIG. 1.
Figure 9:
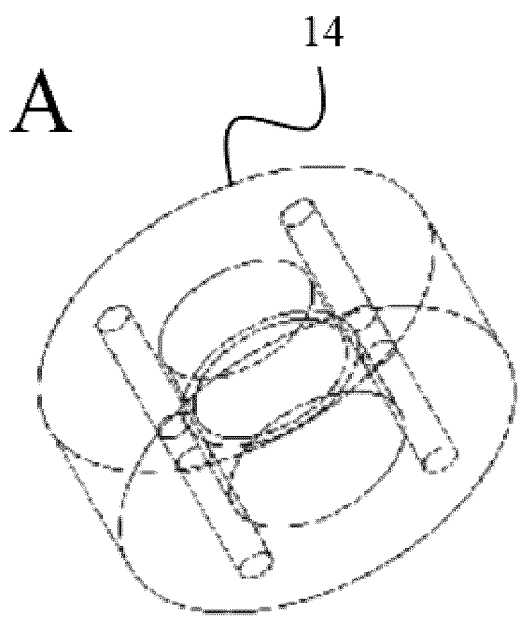
FIG. 9 shows (A) perspective, (B) side plan, (C) side plan, and (D) front plan views of the flange of the cavitation assembly of the device shown in FIG. 1.
Figure 9:
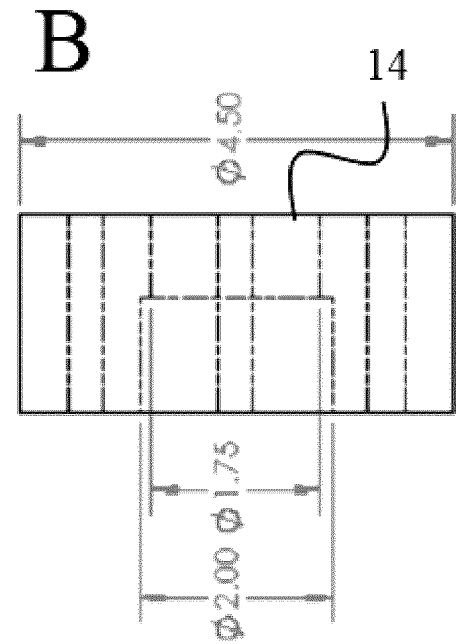
Figure 9:
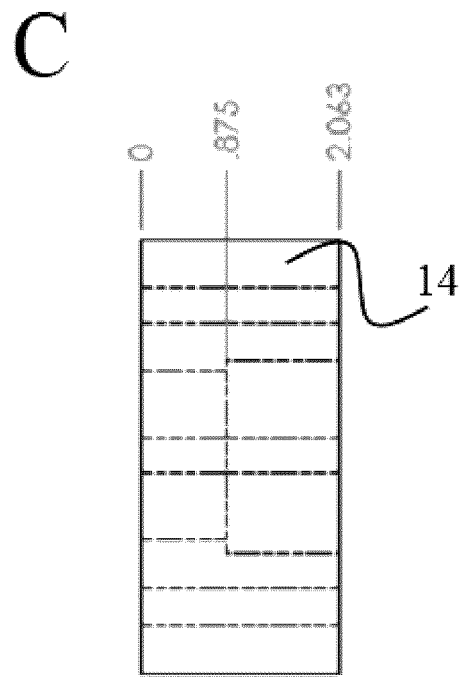
Figure 9:
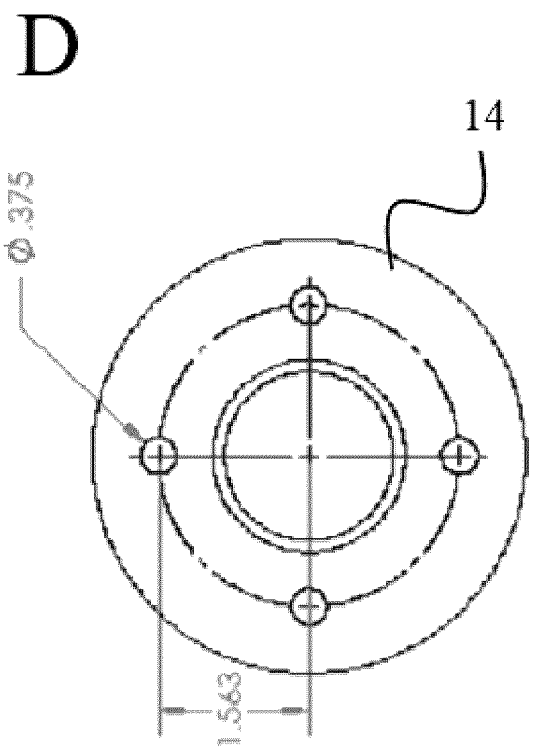

As shown in figure detail in FIGS. 3 and 4, cavitation assembly (2) comprises a tangential flow aqueous mixture inlet (6), which directs the aqueous mixture to vortex stabilizer (7) in communication with the inlet (6), and a nozzle (13) in communication with the vortex stabilizer (7), the nozzle (13) comprising a divergent outlet (9) in communication with the electrosorption assembly (3). FIG. 7 shows vortex stabilizer (7) of cavitation assembly (2) of device (1) in further detail. FIG. 8 shows nozzle (13) of cavitation assembly (2) of device (1) in further detail.

Figure 10:
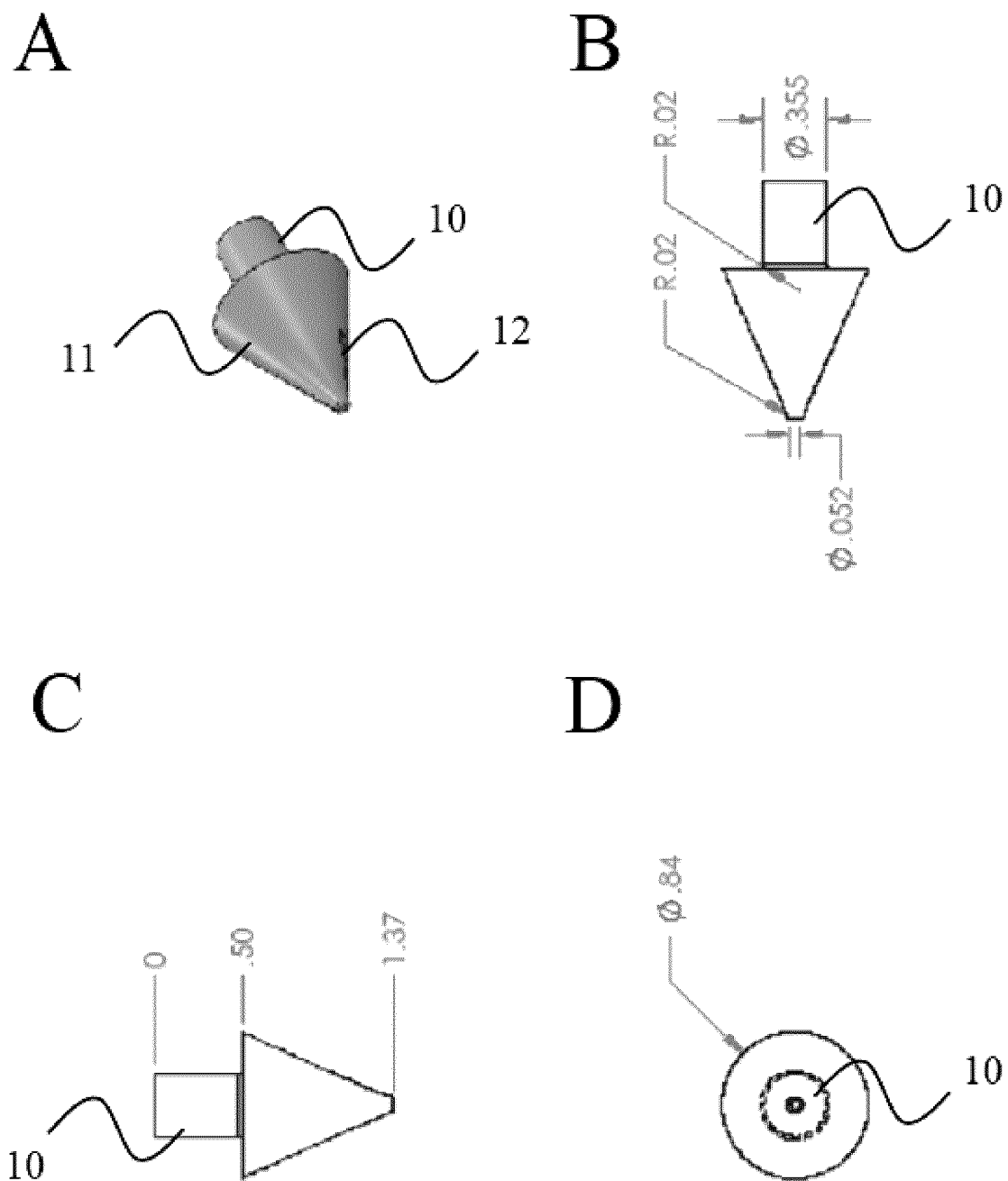
FIG. 10 shows (A) perspective, (B) side plan, (C) side plan, and (D) rear plan views of the vortex stabilizer insert of the cavitation assembly of the device shown in FIG. 1.

Low to high pressure (1724-11721 kPa, for example), which may depend on concentration of algal culture, algal cell size and shape, and/or desired throughput/flowrate, for example, may be applied to the tangential flow aqueous mixture inlet (6), and the tangential flow aqueous mixture inlet (6) and vortex stabilizer (7) may generate a swirl or spiral flow of the aqueous mixture entering the nozzle (13). In certain embodiments, for example, low pressure may be applied, such as a pressure of about 240 kPa to about 1825 kPa for example about 1724 kPa, and flow may be adjusted accordingly to maintain quality of lipid formed. The nozzle (13) may receive the spiral-flowing aqueous mixture, and direct the mixture to the divergent outlet (9). In the illustrated cavitation assembly (2), the vortex stabilizer (7) may comprise a vortex stabilizer insert (10) comprising a conical portion (11) having a longitudinal slit (12) for allowing vortexing aqueous mixture to exit the vortex stabilizer (7) and enter the nozzle (13). Vortex stabilizer insert (10) is shown in further detail in FIG. 10.

Nozzle (13) comprises a restriction flow channel (8) having a length L and a diameter d (see FIG. 4), wherein the restriction flow channel (8) receives the aqueous mixture and directs the aqueous mixture to the divergent outlet (9). In phase separation device (1), the restriction flow channel (8) employs a relatively long flow channel and low d/L ratio (i.e. a d/L ratio of about 0.005-0.02, for example, and a d of about 0.03-0.0625 inches, for example), thereby generating a small channel effect to control the cavitation zone length and location downstream. In certain embodiments, such a system may allow for a stable cavitation zone to be formed resulting in new bubbles entering from incipient cavities and collapsing bubbles at the other end resulting in a stable zone (length) or cavitation region. The divergent outlet (9) comprises a conical channel which progressively widens toward the electrosorption assembly (3), with a divergent angle of about 30°-45°, for example, and a small channel to divergent outlet ratio of about 0.1875-0.3, for example.

Figure 11:
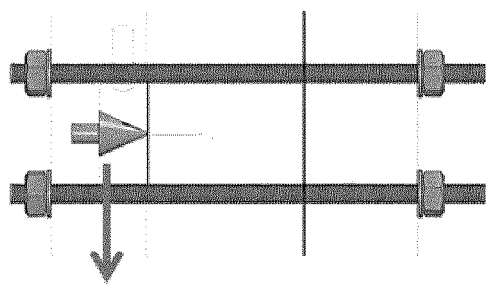
FIG. 11 shows examples of small and large-sized vortex stabilizer inserts.
Figure 11:
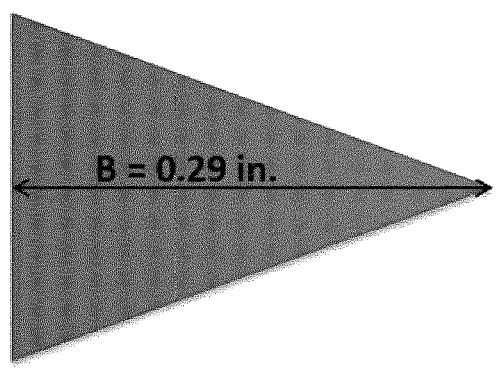
Figure 11:
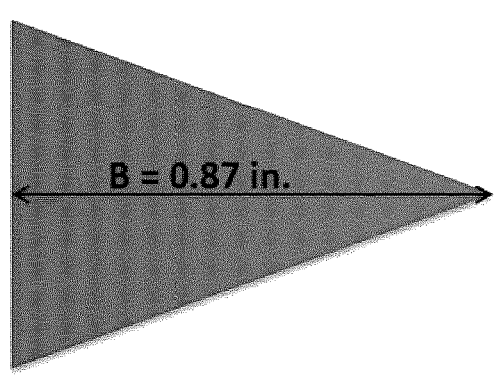

FIG. 11 shows examples of small and large-sized vortex stabilizer inserts, of which vortex stabilizer insert (10) is one example.

Figure 12:
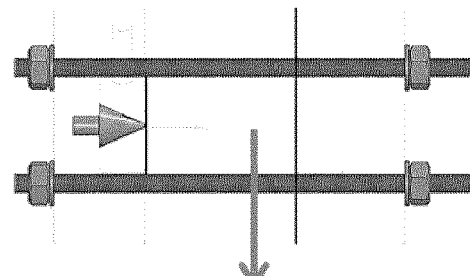
FIG. 12 shows examples of small, medium, and large-sized divergent outlets of nozzle portions of cavitation assembly embodiments.
Figure 12:
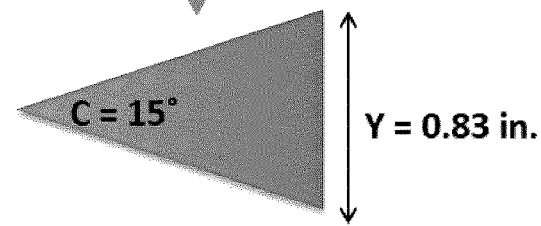
Figure 12:
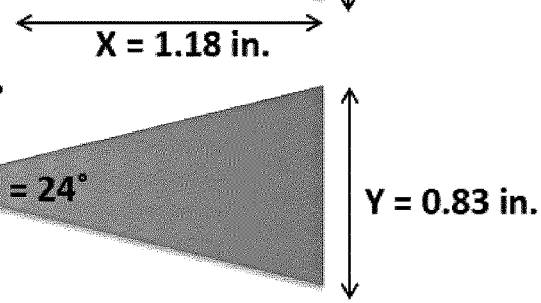
Figure 12:
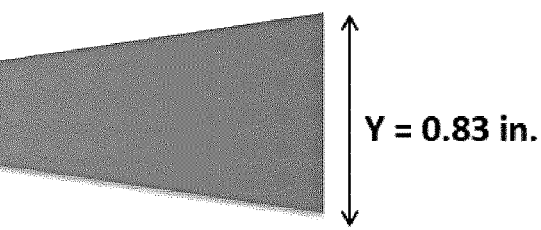

FIG. 12 shows examples of small, medium, and large-sized divergent outlets of nozzle portions of cavitation assembly embodiments, of which divergent outlet (9) is one example.

The cavitation assembly (2) cavitates the aqueous mixture to form cavitation voids comprising vapour in the aqueous mixture, at least some of which may collapse, thereby generating nuclei which may assist in electrosorptive phase separation in the electrosorption assembly (3). Aqueous mixture passing through divergent outlet (9) experiences partial pressure drop below the vapour pressure, resulting in the formation of such cavitation voids. When such cavitation voids collapse, sites of high-energy are created due to micro-implosions, resulting in generation of nuclei which enhance bubble production rate during electrosorption. In certain embodiments, and without wishing to be bound by theory, the bubble nuclei formed during cavitation may enhance the rate of formation of bubbles in the electrosorption and may lead to the propagation of bubble clouds. Lipid bubble attachment may occur in the bubble clouds, and lead to sorption of bubbles on the surface of the electrode.

Divergent outlet (9) of cavitation assembly (2) is in communication with electrosorption assembly (3), allowing cavitated aqueous mixture to exit cavitation assembly (2) and enter electrosorption assembly (3). In illustrated phase separation device (1), the cavitation assembly (2) and the electrosorption assembly (3) are coupled together via flange (14) as shown in FIGS. 1, 2, 4, and 9.

Electrosorption assembly (3) receives the cavitated aqueous mixture from the cavitation assembly (2), and performs electrosorptive phase separation of the cavitated aqueous mixture. As shown in FIG. 2, electrosorption assembly (3) comprises a cathode (4) and an anode (5), to which certain components of the aqueous mixture may attach or agglomerate, thereby facilitating their separation from the aqueous mixture.

Figure 5:
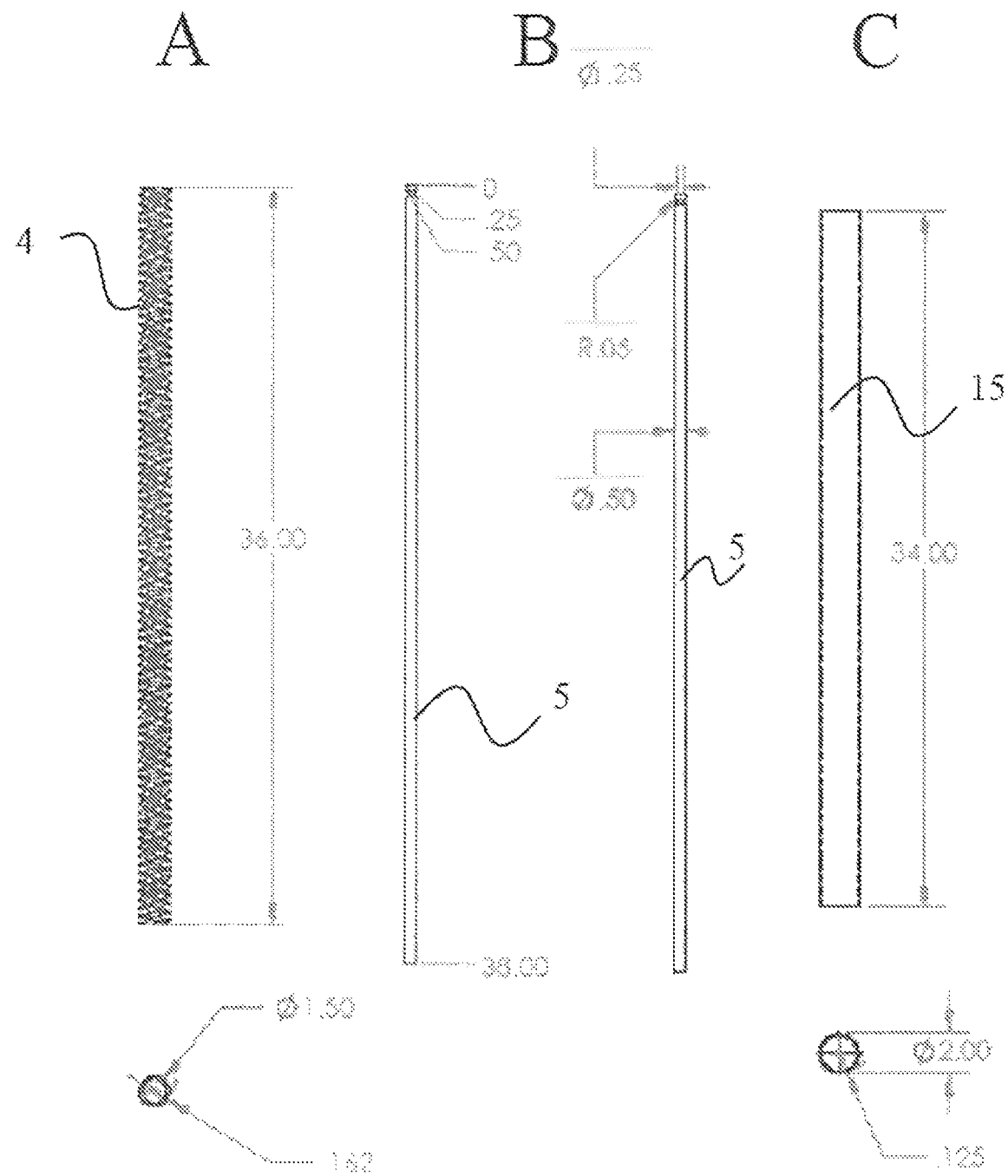
FIG. 5 shows (A) a front plan view of the conductive spiral coil cathode of the electrosorption assembly of the device shown in FIG. 1; (B) front plan views of the rod-shaped anode of the electrosorption assembly of the device shown in FIG. 1; (C) a front plan view of the outer enclosure of the electrosorption assembly of the device shown in FIG. 1; and (D) a perspective view of the assembled electrosorption assembly of the device shown in FIG. 1.
Figure 5:
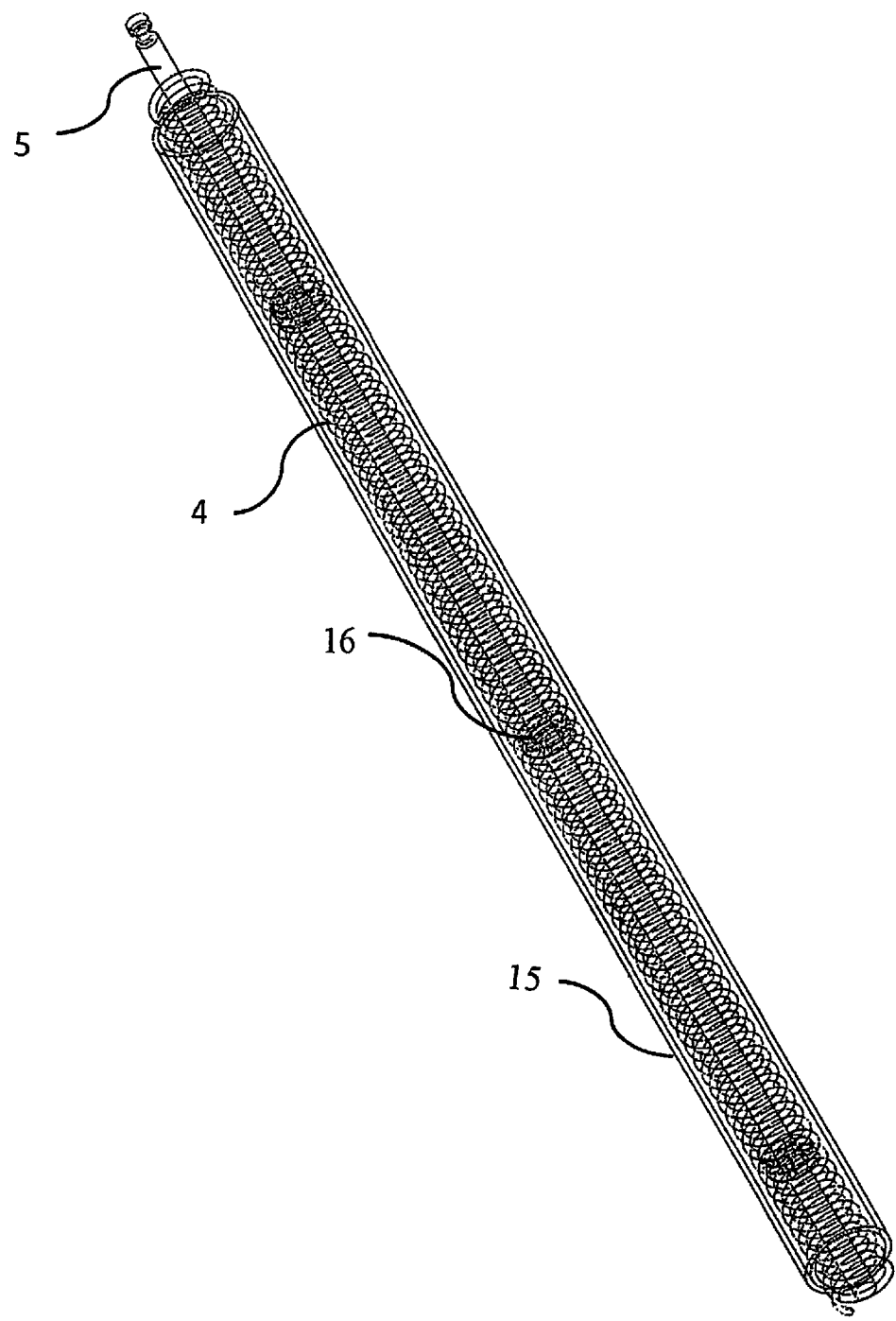
Figure 6:
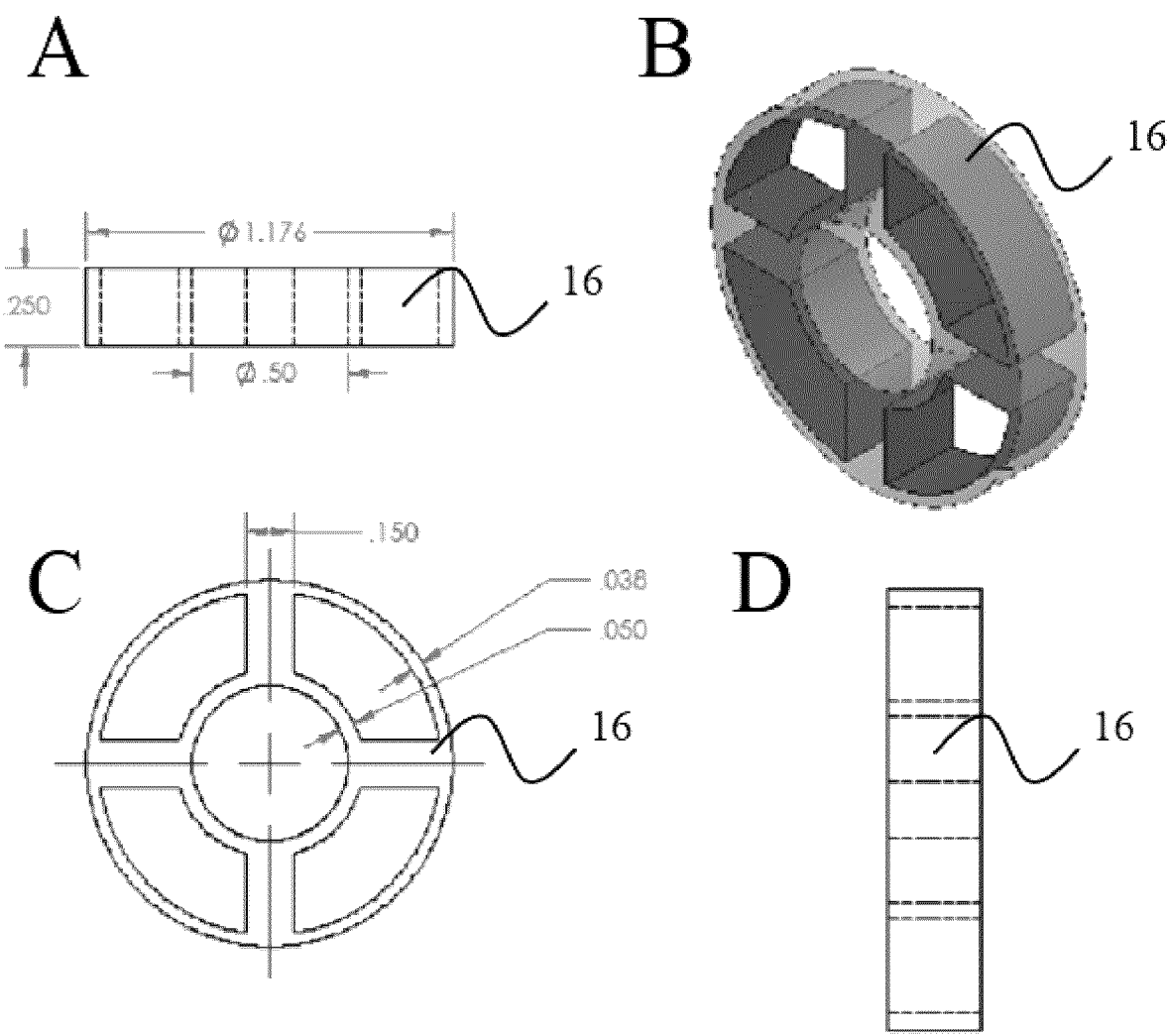
FIG. 6 shows (A) side plan, (B) perspective, (C) front plan, and (D) side plan views of an anode separator component of the electrosorption assembly of the device shown in FIG. 1.

In phase separation device (1), electrosorption assembly (3) comprises a cathode (4) and an anode (5), the cathode (4) comprising a conductive spiral coil defining an inner central core or passage, and the anode (5) comprises a conductive rod-shaped member co-axially disposed within the central core or passage defined by the spiral-shaped cathode (4). The conductive spiral coil of cathode (4) comprises multiple turns, wherein each turn, in combination with the associated portion of anode (5), forms a distinct electrochemical cell. In the device of this example, one or more anode separators (16) as shown in FIGS. 5(D) and 6 are used to position anode (5) within the central core defined by spiral cathode (4).

Although depicted as a spiral coil in this example, it will be understood that the cathode may adopt other suitable configurations. For example, in certain embodiments, the cathode may be configured as a longitudinal tube, coil, spiral, or other suitable structure, and may define an interior core having a longitudinal axis along which the anode is disposed. The cathode may be substantially continuous, or may comprise a series of individual members longitudinally oriented in series. The cathode may comprise a conductive spiral coil or tube comprising two or more turns, wherein each turn, in combination with the anode, may form a distinct electrochemical cell. In certain embodiments, the cathode may comprise an array of rings or other such units aligned in series, each forming a distinct electrochemical cell in combination with the anode. The person of skill in the art having regard to the teachings of the instant application will be aware of suitable cathode/anode configurations, and will be able to select a suitable cathode/anode configuration suitable for a particular application.

In this example, spiral cathode (4) and anode (5) are enclosed within an outer shell (15), which comprises a pipe or tube, such that the cavitated aqueous mixture exiting the cavitation assembly (2) (and having a spiral flow pattern) encounters a flow channel having a substantially circular cross-section defined by the outer shell (15) pipe, and becomes exposed to cathode (4) and anode (5) of the electrosorption assembly (3) as it passes through this flow channel. The spiral flow of the cavitated aqueous mixture passing through the flow channel, and the spiral structure (i.e. handedness, etc.) of cathode (5) are matched, thereby providing reduced fluid flow resistance through the electrosorption apparatus (3) and providing increased contact and residence time between the cavitated aqueous mixture and the electrosorptive assembly (3). FIG. 5 shows further details of (A) conductive spiral coil cathode (4), (B) rod-shaped anode (5), and (C) outer shell (15) of electrosorption assembly (3) of phase separation device (1) described in this Example. FIG. 5 (D) provides a perspective view of assembled electrosorption assembly (3), with the outer shell (15) comprising a transparent tube to allow for visual inspection during operation (drawing units are in inches, and are indicated for non-limiting and illustrative purposes intended for the person of skill in the art).

Cathode (4) of the electrosorption assembly (3) may comprise, for example, a spiral wound carbon-based fiber conductive material, activated or impregnated cloth conductive material, anodized aluminium, iron, $TiO_2$, brass, or stainless steel, or other suitable conductive material. In phase separation device (1), a central core positive conductive source attached to an AC power input serves to enhance the advanced oxidation generated by cavitating nuclei, resulting in lipid-biomass-water phase separation through lipid-bubble interactions and reduced polarity of the algal cells rendering their effective separation and flotation of the lipid and algae phases with eventual settling of algae (by gravity) in the flotation cell in a single step.

In certain embodiments, the anode of the electrosorption assembly may comprise carbon, stainless steel, iron, or anodized aluminium. As will be understood, electrosorption assembly (3) performs electrosorptive function, and therefore does not comprise a sacrificial anode. As will be understood, electrosorption is based on sorption of material or contaminant on the electrodes, and does not involve release of electrode material. The electrode is thus non-sacrificial in the case of electrosorption.

Electrosorptive phase separation by electrosorption assembly (3) results in at least some attachment and/or aggregation of algal lipids/oils on the surface of cathode (4) of the electrosorption assembly (3). Without wishing to be bound by theory, it is believed that algal lipids/oils may accumulate on cavitation voids, nuclei, and/or other voids or vapour bubbles created by action of the cavitation and/or electrosorption assembly, which may then become attached to cathode (4) of electrosorption assembly (3). Collapse of cathode-attached cavitation voids and/or other voids or vapour bubbles having algal lipids or oils attached thereto may further promote algal lipid or oil clumping or agglomeration at cathode (4). Algal lipids or oils may then be retrieved from cathode (4), and/or may be retrieved through floatation or other density separation, for example. By way of example, liquid exiting electrosorption assembly (3) may be allowed to phase-separate, and the lipid-rich layer may be collected. In certain embodiments, electrosorptive vapour bubble generation in electrosorption assembly (3) may facilitate phase separation through phase separation, particularly where algal-size bubbles (i.e. about 2-5 µm) are generated through regulation of pressure, flow, and/or energy applied at the electrosorption assembly. Energy input by electrosorption assembly (3) may multiply cavitation voids in the cavitated aqueous mixture via an advanced oxidation process, thereby providing electrosorptive vapour bubble generation. Such electrosorptive vapour bubble generation may further facilitate phase separation via microflotation. Without wishing to be bound by theory, in certain embodiments, cavitation bubbles may be considered as nuclei which collapse with high intensity and tensile forces in algae culture, for example. This may allow for early nuclei to form in the electrosorption section and cause increased bubble generation. Separation may occur by lipid-bubble attachment with algae, the separated layers travelling up the tube into a microflotation cell, which may accelerate separation of phases, for example.

Phase separation device (1) described in this Example is designed to operate in single step-fashion, without requiring addition of added chemicals, solvents, flocculants, adsorbents, or pH buffer agents (it will be recognized that nutrients supplied to the culture during the algal growth in the photobioreactors may be present in examples where an algal aqueous mixture is to be processed). The combination of hydrodynamic cavitation and electrosorption design in a single step as described in this example may allow for scale-up and reduced complexity for one-step processes for both extraction and separation.

Figure 13:
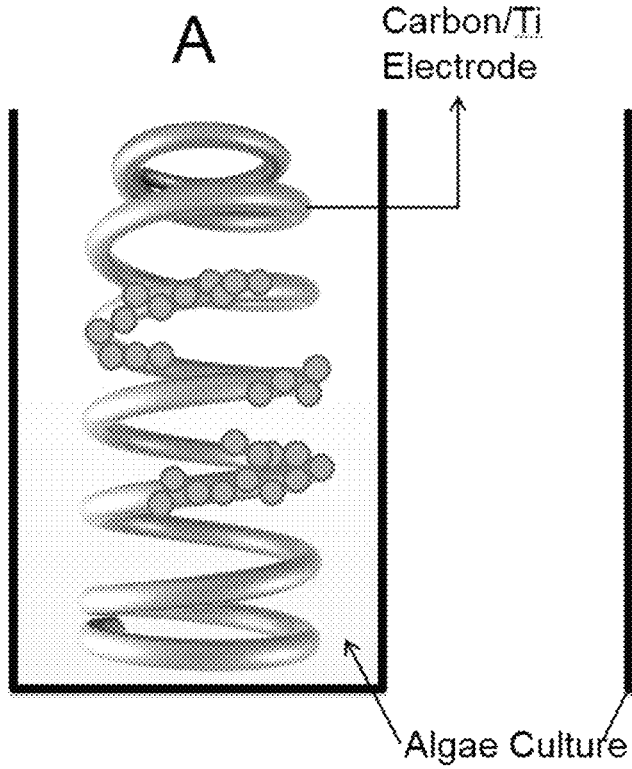
FIG. 13 shows an illustrative comparison of (A) electrosorption and (B) electrocoagulation processes.
Figure 13:
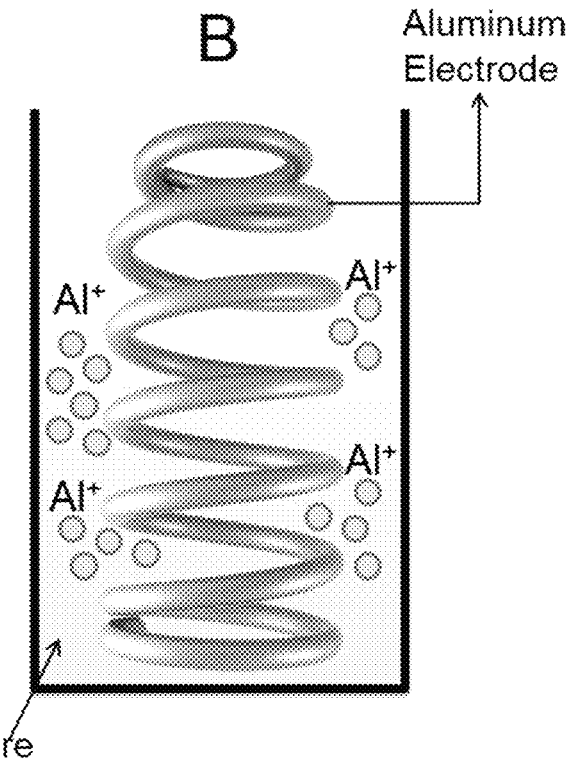

As will be recognized, phase separation device (1) employs electrosorption. Electrosorption is generally considered as potential-induced adsorption of molecules on the surface of charged electrodes, and is used herein for separation of phases with the use of high specific-area electrodes. Electrosorption involves charging and discharging the electrical double layer at the surface of electrodes by applying potential or current. In this respect, electrosorption is distinguished from conventional electrochemical or Faradaic processes such as electrocoagulation or electroflocculation, and offers in-situ regeneration of adsorbent with good energy consumption compared with the other separation processes (see, for example, Yang, K. L., Ying T-Y, Yiacoumi, S., Tsouris, C and Vittoratos, S. Electrosorption of Ions from Aqueous Solutions by Carbon Aerogel: An Electrical Double-Layer Model, *Langmuir*, 2001, 17 (6), pp 1961-1969; herein incorporated by reference in its entirety). FIG. 13 shows an illustrative comparison of (A) electrosorption and (B) electrocoagulation processes, indicating distinctions there between.

The phase separation device of this Example has been tested for continuous flow operation of up to about 1.5 L/min in the processing of algal aqueous mixtures having an algal concentration of about 0.1 g/L and 1 g/L.

Example 2—Direct Culture Extraction of Algae Using Electrosorptive Cavitation

A series of experiments were designed and performed in order to test phase separation of algal aqueous mixtures using phase separation devices as described herein. Testing included analysis of individual cavitation assemblies and electrosorption assemblies, and testing of combined electrosorptive cavitation phase separation devices as described herein.

The following tables provide experimental set-up and processing conditions of various experiments designed to assess the electrosorptive cavitation devices described herein. Experimental observations for each test are provided, along with accompanying figure(s) depicting experimental setup and processed samples produced.

TABLE 1

Bench Scale Test -1A

| | |
|---|---|
| Test Setup | Test in 1 L beaker with spinning magnet |
| Solution Type | Reconstituted algae from paste combined with potable water |
| Concentration | 2.5 g/L algae paste Unprocessed, non-cavitated |
| Additives to Culture | None |
| Capacitance Separation Setup | Spiral (Segmented) cathode with high conductivity metal rod anode |
| Volume | 1 L |
| Conductivity | |
| pH | |
| Pressure | N/A |
| Frequency | N/A |
| Voltage | 31 V |
| Current | 5.22 A (at start, decreased steadily) |
| | 5.10 A (after sometime- Not recorded) |
| | 2.00 A (after sometime - Not recoded) |
| Run Time | 6:00 min run |
| | 3:00 min rest |
| Additional Details | |
| Physical Observations | Clear separation of phases |
| | White and deep green layers at top - algae and lipid separation |

Figure 15:
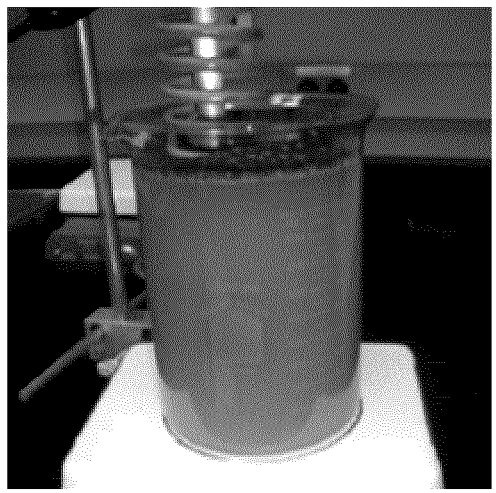
FIG. 15 depicts an experimental setup for an electrosorption process using 2.5 g/L of algal culture as shown in Example 2 with clear separation of phases.
Figure 15:
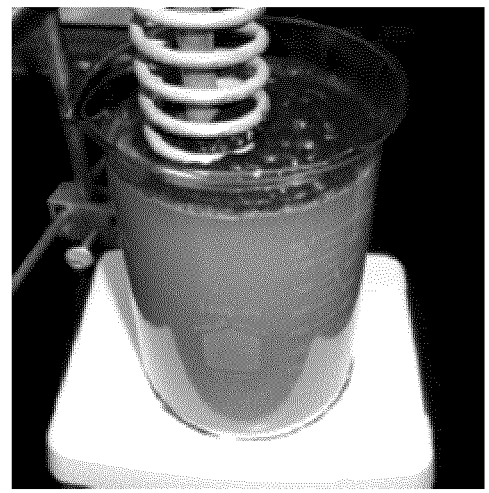
Figure 15:
Figure 15:
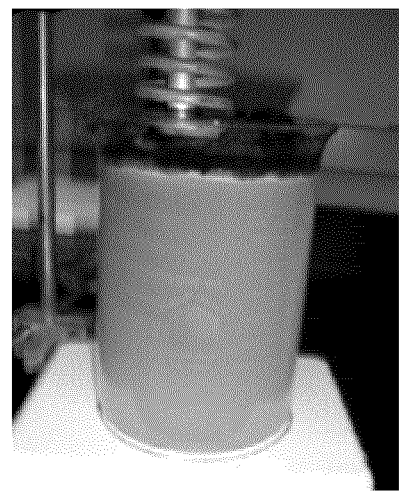
Figure 15:
Figure 15:
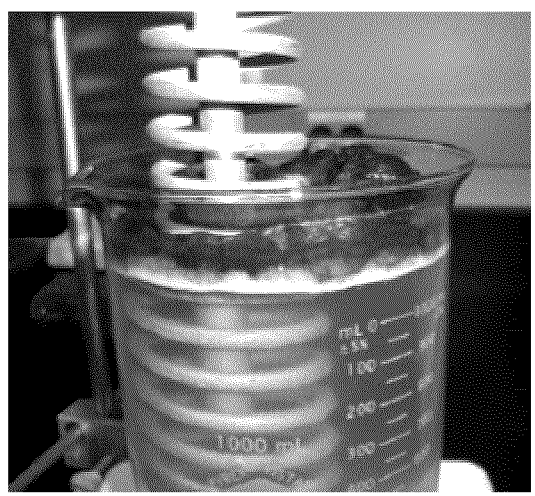

Experimental setup, and processed sample produced, shown in FIG. 15.

TABLE 2

Bench-Scale Test-1B

| | |
|---|---|
| Test Setup | Test in 1 L beaker with spinning magnet |
| Solution Type | Reconstituted algae from paste combined with potable water |
| Concentration | 2.5 g/L algae paste Unprocessed, non-cavitated |
| Additives to Culture | 30 mL hydrochloric acid |
| Capacitance Separation Setup | Spiral coil cathode with high conductivity metal rod anode |
| Volume | 1 L |
| Conductivity | |
| pH | |
| Pressure | N/A |
| Frequency | N/A |
| Voltage | 31 V |
| Current | 8.5 A (at start, decreased steadily) |
| | 4.5 A (after some time) |
| Run Time | |
| Additional Details | |
| Physical Observations | Clear separation of phases |
| | White and deep green layers at top - algae and lipid separation |

Figure 16:
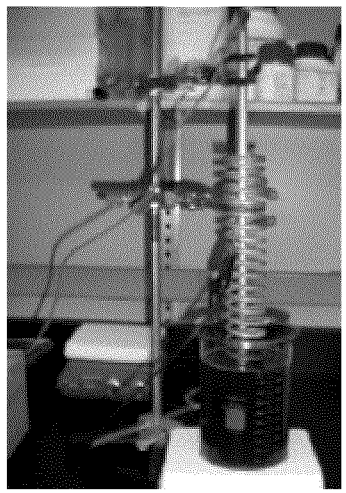
FIG. 16 depicts an experimental setup for an electrosorption process using 2.5 g/L of algal culture with 30 mL/L of hydrochloric acid as shown in Example 2 with clear separation of phases.
Figure 16:
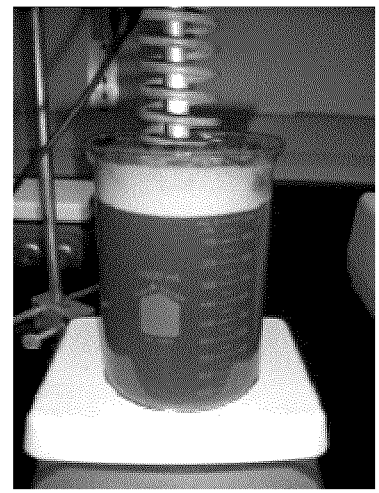
Figure 16:
Figure 16:
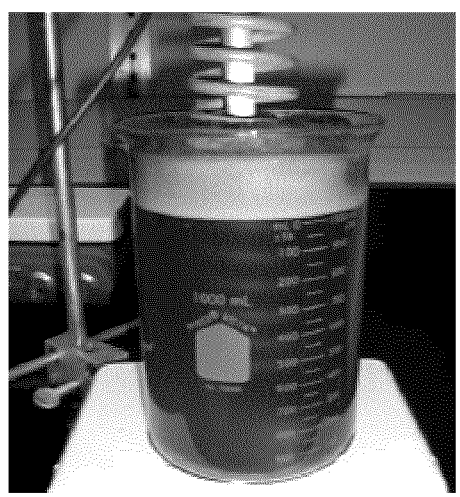
Figure 16:
Figure 16:
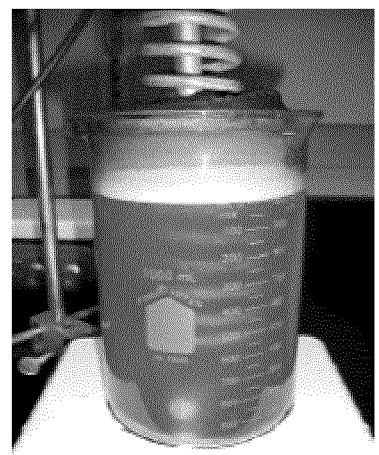

Experimental setup, and processed sample produced, shown in FIG. 16.

TABLE 3

Bench Scale Test-1C

| | |
|---|---|
| Test Setup | Test in 1 L beaker with spinning magnet |
| Solution Type | Reconstituted algae from paste combined with potable water |
| Concentration | 2.5 g/L algae paste Unprocessed, non-cavitated |
| Additives to Culture | 8 mL hydrochloric acid |
| Capacitance Separation Setup | Spiral coil cathode with high conductivity metal rod anode |
| Volume | 750 mL |
| Conductivity | |
| pH | 6.93 min (raw sample) |
| | 2.50 min (with HCl) |
| | 4:40 min (end of run) |
| Pressure | N/A |
| Frequency | N/A |
| Voltage | 31 V |
| Current | 1.31 A (at start) |
| | 0.62 A (after 5 mins) |
| Run Time | 6:00 min |
| Additional Details | |
| Physical Observations | Clear separation of phases |

Figure 17:
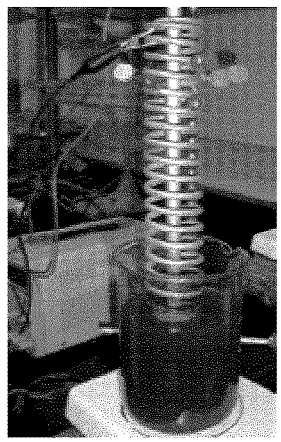
FIG. 17 depicts an experimental setup for an electrosorption process using 2.5 g/L of algal culture with 8 mL/L of hydrochloric acid added as shown in Example 2 with clear separation of phases.
Figure 17:
Figure 17:
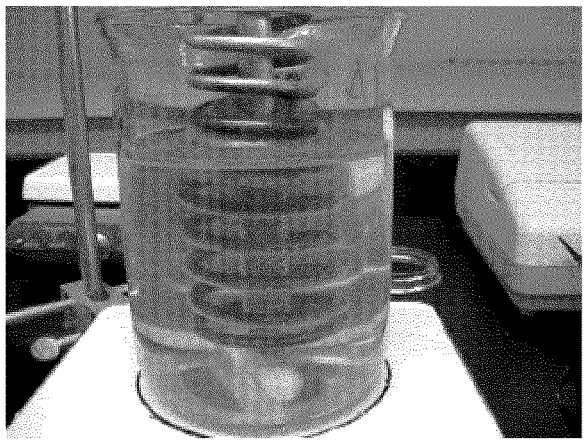
Figure 17:

Experimental setup, and processed sample produced, shown in FIG. 17.

TABLE 4

Bench Scale Test-1D

| | |
|---|---|
| Test Setup | Test in 1 L beaker with spinning magnet |
| Solution Type | Reconstituted algae from paste combined with potable water |
| Concentration | 2.5 g/L algae paste |
| | Processed through cavitation system for 1 run at 1200 psi and 30 Hz |
| Additives to Culture | 2 mL hydrochloric acid, then additional 5 mL added |
| Capacitance Separation Setup | Spiral coil cathode with high conductivity metal rod anode |
| Volume | 750 mL |
| Conductivity | 174.0 mV (end of run) |
| pH | 6.90 (raw sample) |
| | 3.10 (with HCl) |
| | 2.60 (with additional HCl) |
| | 4.10 (end of run) |
| Pressure | 1200 psi |
| Frequency | 30 Hz |
| Voltage | 31 V |
| Current | 0.8 A (at start) |
| | 0.6 A (after 9 min) |
| Run Time | 6:00 min - no change in solution, no separation |
| | Paused test and added 5 mL acid |
| | 9:00 - solution separating slowly |
| | Paused test and lowered both electrodes further into solution |
| | 11:00 - solution cleared, test stopped |
| Additional Details | |
| Physical Observations | Clear separation of phases |

Figure 18:
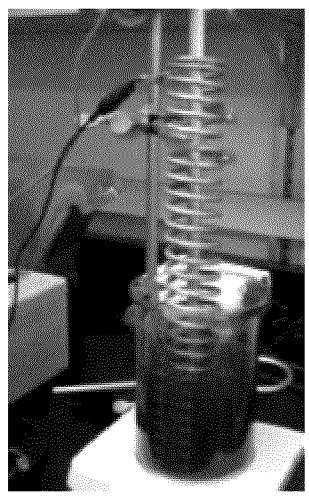
FIG. 18 depicts an experimental setup for an electrosorption process using 2.5 g/L of algal culture with 2 mL/L followed by 7 mL/L of hydrochloric acid as shown in Example 2 with clear separation of phases.
Figure 18:
Figure 18:
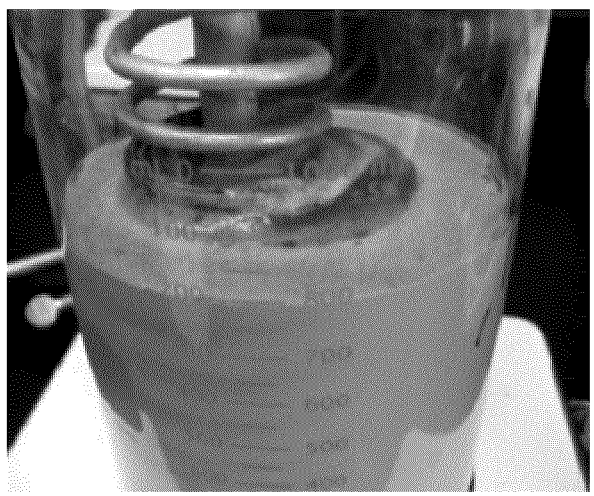
Figure 18:
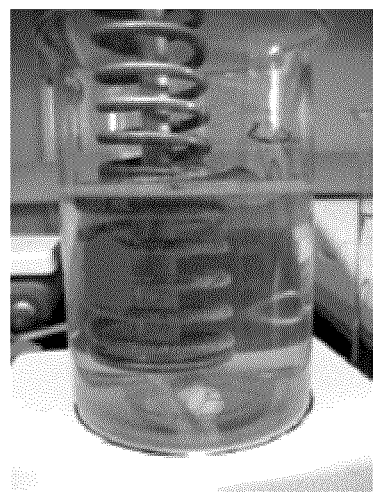

Experimental setup, and processed sample produced, shown in FIG. 18.

TABLE 5

Bench Scale Test-1E

| | |
|---|---|
| Test Setup | Test in 1 L beaker with spinning magnet |
| Solution Type | Reconstituted algae from paste combined with potable water |
| Concentration | 2.5 g/L algae paste |
| | Processed through cavitation system for 2 runs at 1200 psi and 30 Hz |

TABLE 5-continued

| Bench Scale Test-1E | |
|---|---|
| Additives to Culture | Hydrochloric acid |
| Capacitance Separation Setup | Spiral coil cathode with high conductivity metal rod anode |
| Volume | 750 mL |
| Conductivity | |
| pH | 6.65 (raw sample) |
| | 2.50 (with HCl) |
| | 4.22 (end of run) |
| Pressure | 1200 psi |
| Frequency | 30 Hz |
| Voltage | 31 V |
| Current | 153 A (at start) |
| | 0.67 A (after 6 min) |
| Run Time | 6:00 min |
| Additional Details | |
| Physical Observations | Clear separation of phases |

Figure 19:
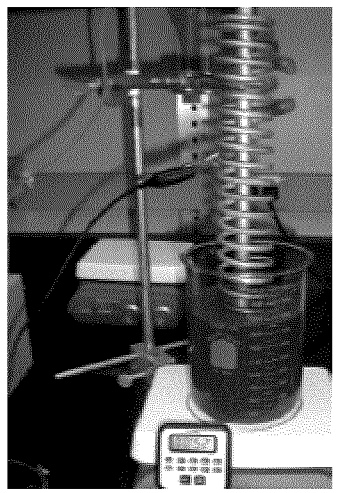
FIG. 19 depicts an experimental setup for an electrosorptive cavitation process using 2.5 g/L of algal culture processed through cavitation system with the addition of 10 mL of hydrochloric acid at 1200 psi (8375 kPa.) and electrosorption applied at 31 V and 1.45 A as shown in Example 2 with clear separation of phases.
Figure 19:
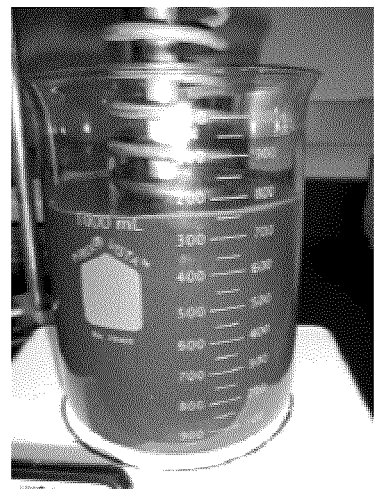
Figure 19:
Figure 19:
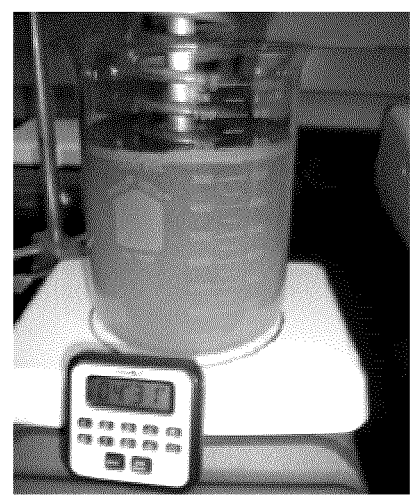
Figure 19:
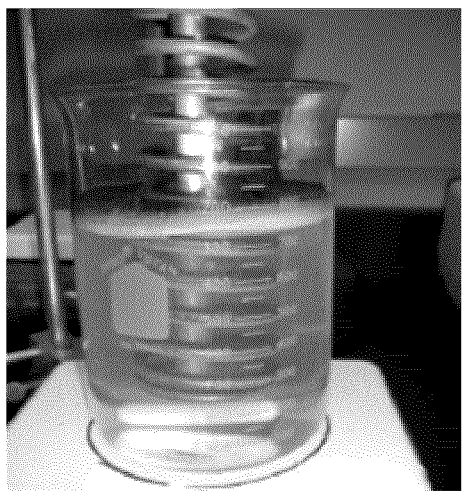
Figure 19:

Experimental setup, and processed sample produced, shown in FIG. 19.

TABLE 6

| Bench Scale Test-1F | |
|---|---|
| Test Setup | Test in 1 L beaker with spinning magnet |
| Solution Type | Reconstituted algae from paste combined with potable water |
| Concentration | 2.5 g/L algae paste |
| | Processed through cavitation system for 2 runs at 1200 psi and 30 Hz |
| Additives to Culture | Hydrochloric acid |
| Capacitance Separation Setup | Spiral coil cathode with high conductivity metal rod anode |
| Volume | 750 mL |
| Conductivity | |
| pH | 6.77 (raw sample) |
| | 2.50 (with HCl) |
| | 3.50 (end of run) |
| Pressure | 1200 psi |
| Frequency | 30 Hz |
| Voltage | 31 V |
| Current | 1.45 A (at start) |
| Run Time | 3:00 min - solution close to full clarity |
| | 5:00 min - full clarity, test stopped |
| Additional Details | |
| Physical Observations | Clear separation of phases |

Figure 20:
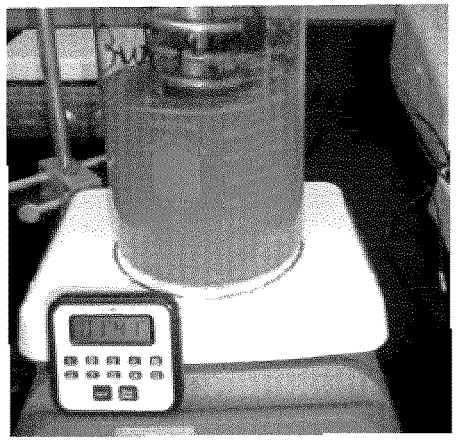
FIG. 20 depicts an experimental setup for an electrosorptive cavitation process using 2.5 g/L of algal culture processed through 1 L batch system with electrosorption applied at 31 V and 1.45 A with the addition of 10 mL of hydrochloric acid/750 mL of culture as shown in Example 2 with clear separation of phases.
Figure 20:
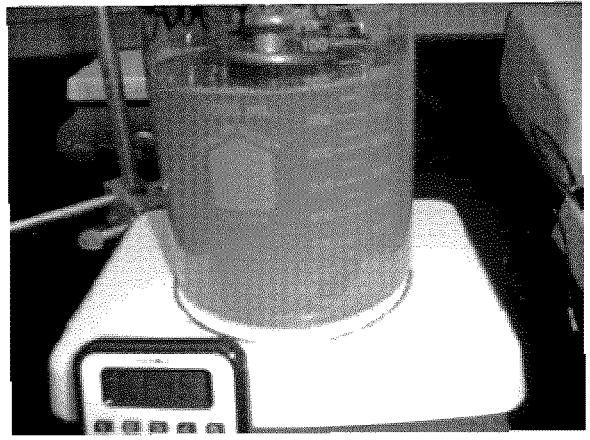
Figure 20:
Figure 20:
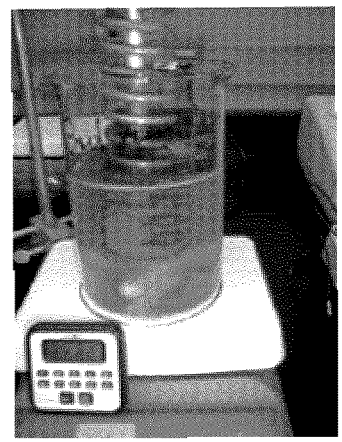
Figure 20:
Figure 20:
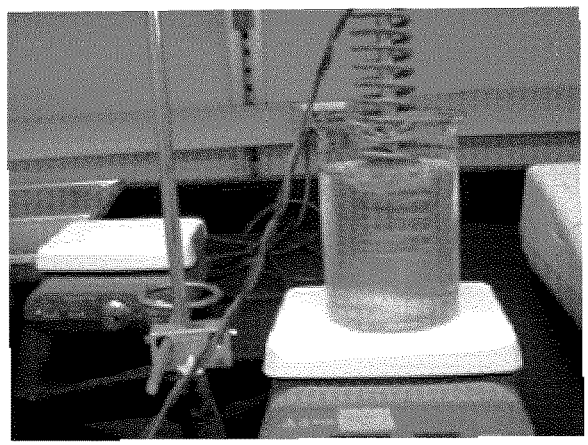

Experimental setup, and processed sample produced, shown in FIG. 20.

TABLE 7

| Bench Scale Test-2A | |
|---|---|
| Test Setup | Test in 1 L beaker with spinning magnet |
| Solution Type | Reconstituted algae from paste combined with potable water |
| Concentration | 2.5 g/L algae paste |
| | Sonicated |
| Additives to Culture | 10 mL hydrochloric acid, added at 1:00 min |
| Capacitance Separation Setup | Spiral coil cathode with high conductivity metal rod anode |
| Volume | 750 mL |
| Conductivity | |
| pH | 5.39 (raw sample) |
| | 3.95 (end of run) |
| Pressure | |
| Frequency | |
| Voltage | 31 V |
| Current | 1.95 A (after 2:00 min) |
| | 1.70 A (after 2:20 min) |

TABLE 7-continued

| Bench Scale Test-2A | |
|---|---|
| Run Time | 6:00 min - solution almost reached full clarity, test stopped |
| Additional Details | |
| Physical Observations | Clear separation of phases in short amount of time with foaming of lipid. |

Figure 21:
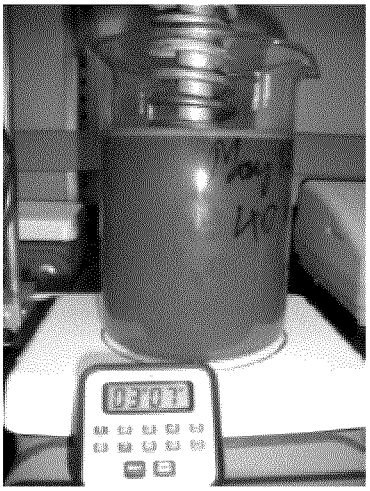
FIG. 21 depicts an experimental setup for an electrosorption process using 2.5 g/L of algal culture processed through 1 L batch system with electrosorption applied at 31 V and 1.45 A with the addition of 0.5 mL of hydrochloric acid/750 mL of culture as shown in Example 2 with clear separation of phases.
Figure 21:
Figure 21:
Figure 21:
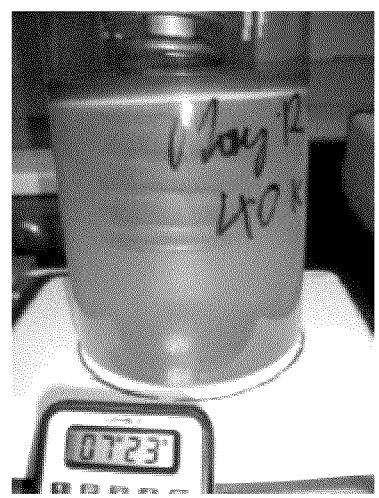
Figure 21:
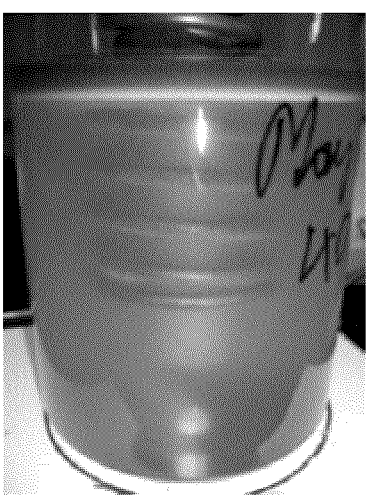
Figure 21:

Experimental setup, and processed sample produced, shown in FIG. 21.

TABLE 8

| Bench Scale Test-2B | |
|---|---|
| Test Setup | Test in 1 L beaker with spinning magnet |
| Solution Type | Reconstituted algae from paste combined with potable water |
| Concentration | 2.5 g/L algae paste |
| | Unprocessed, non-cavitated |
| Additives to Culture | 0.5 mL hydrochloric acid |
| Capacitance Separation Setup | Spiral cathode with high conductivity metal rod anode |
| Volume | 700 mL |
| Conductivity | |
| pH | 5.57 (raw sample) |
| | 4.00 (with HCl) |
| | 4.50 (end of run) |
| Pressure | |
| Frequency | |
| Voltage | 31 V |
| Current | 0.22 A |
| Run Time | 6:25 min - solution cleared, test stopped |
| Additional Details | |
| Physical Observations | |

Figure 22:
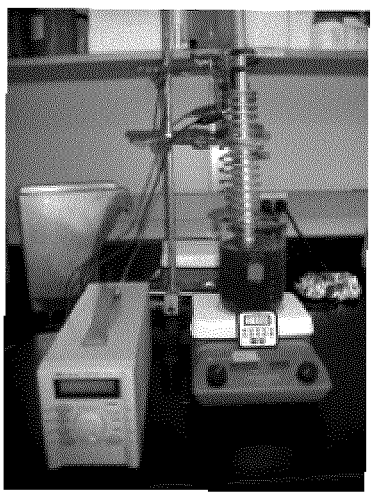
FIG. 22 depicts an experimental setup for an electrosorptive cavitation process using 2.5 g/L of algal culture processed through 1 L batch system with electrosorption applied at 31 V and 1.45 A with the addition of 1.5 mL of hydrochloric acid/750 mL of culture as shown in Example 2 with clear separation of phases.
Figure 22:
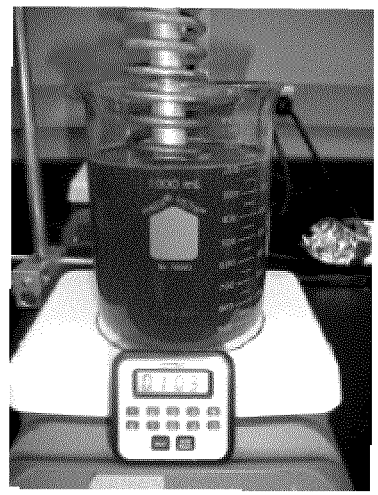
Figure 22:
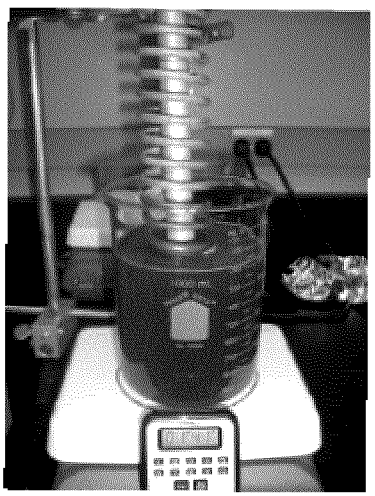
Figure 22:
Figure 22:
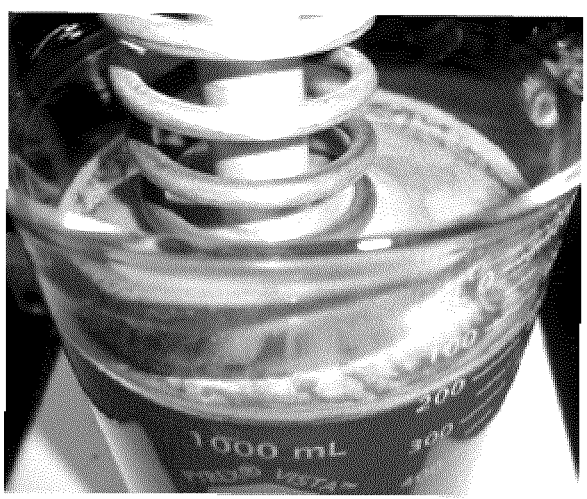
Figure 22:
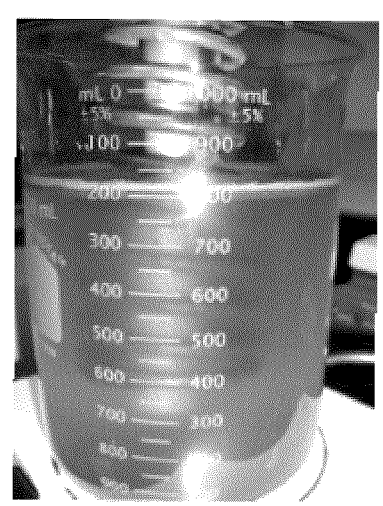

Experimental setup, and processed sample produced, shown in FIG. 22.

TABLE 9

| Bench Scale Test-2C | |
|---|---|
| Test Setup | Test in 1 L beaker with spinning magnet |
| Solution Type | Reconstituted algae from paste combined with potable water |
| Concentration | 2.5 g/L algae paste |
| | Sonicated |
| Additives to Culture | 0.5 mL hydrochloric acid |
| | 0.5 mL additional acid added at 3:30 min |
| | 0.5 mL additional acid added at 5:30 min |
| Capacitance Separation Setup | Spiral coil cathode with high conductivity metal rod anode |
| Volume | 700 mL |
| Conductivity | |
| pH | 3.40 (raw sample) |
| | 5.40 (with HCl) |
| Pressure | |
| Frequency | |
| Voltage | 31 V |
| Current | 0.34 A |
| Run Time | 7:00 min - solution cleared, test stopped |
| Additional Details | |
| Physical Observations | |

Figure 23:
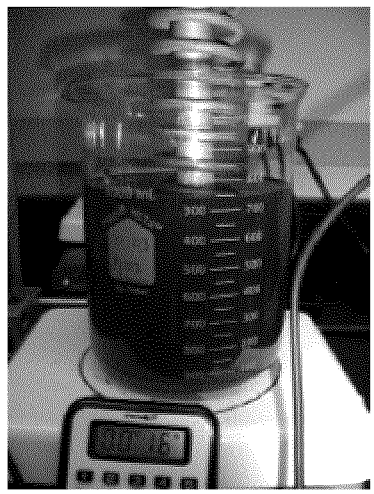
FIGS. 23-29 depict experimental setups, and processed samples produced, in the testing performed in Example 2.
Figure 23:
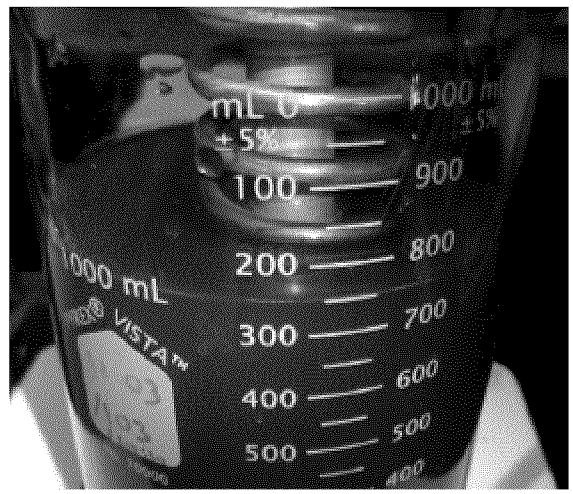
Figure 23:
Figure 23:

Experimental setup, and processed sample produced, shown in FIG. 23.

TABLE 10

| Bench Scale Test-3A | |
|---|---|
| Test Setup | Test in Broadband Sonication System |
| Solution Type | Reconstituted algae from paste combined with potable water |

TABLE 10-continued

Bench Scale Test-3A

| | |
|---|---|
| Concentration | 2.5 g/L algae paste |
| | Non-processed, non-cavitated |
| Additives to Culture | None |
| Capacitance | Spiral coil cathode with high conductivity metal |
| Separation Setup | rod anode |
| Volume | 500 mL |
| Conductivity | |
| pH | 7.00 (raw sample) |
| Pressure | |
| Frequency | 574 Hz |
| Voltage | 31 V |
| Current | 0.30 A |
| Run Time | 15:30 min - sonication time |
| | 15:00 min - electrosorption time |
| Additional Details | |
| Physical Observations | Separated to almost full clarity |

Figure 24:
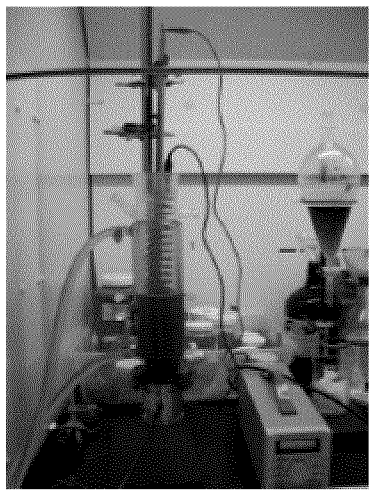
Figure 24:
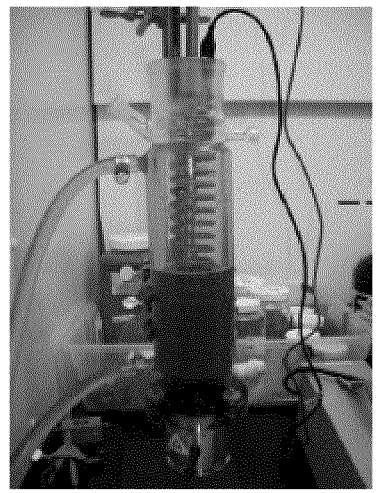
Figure 24:
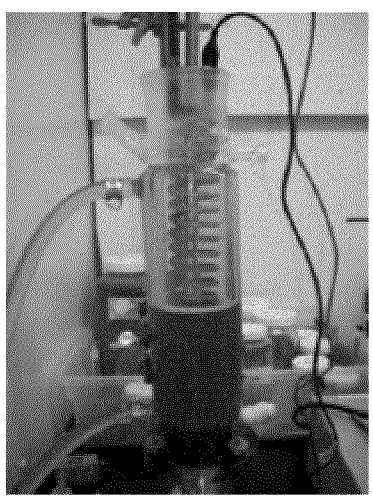
Figure 24:
Figure 24:
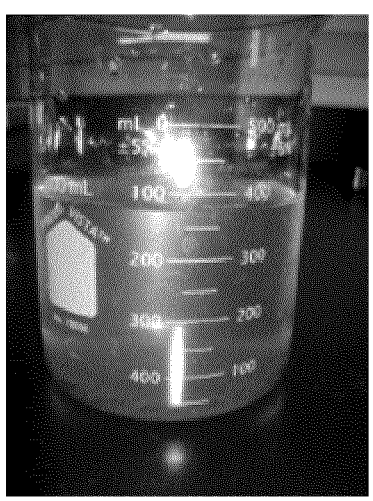
Figure 24:
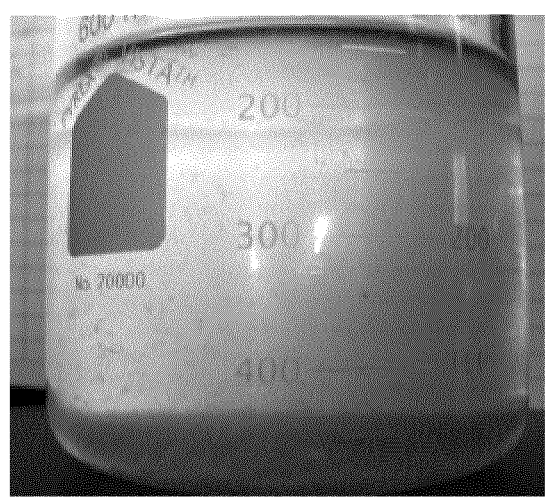

Experimental setup, and processed sample produced, shown in FIG. 24.

TABLE 11

Bench Scale Test-3B

| | |
|---|---|
| Test Setup | Test in Broadband Sonication System |
| Solution Type | Reconstituted algae from paste combined with potable water |
| Concentration | 2.5 g/L algae paste |
| | Non-processed, non-cavitated |
| Additives to Culture | None |
| Capacitance | Spiral coil cathode with high conductivity metal |
| Separation Setup | rod anode |
| Volume | 500 mL |
| Conductivity | |
| pH | |
| Pressure | |
| Frequency | 574 Hz |
| Voltage | 15 V |
| Current | 0.15 A |
| Run Time | 3:00 min - power turned on (3:00 min of sonication only) |
| | 7:25 min - changed power from CV to CC of 0.277 V |
| Additional Details | |
| Physical Observations | |

Figure 25:
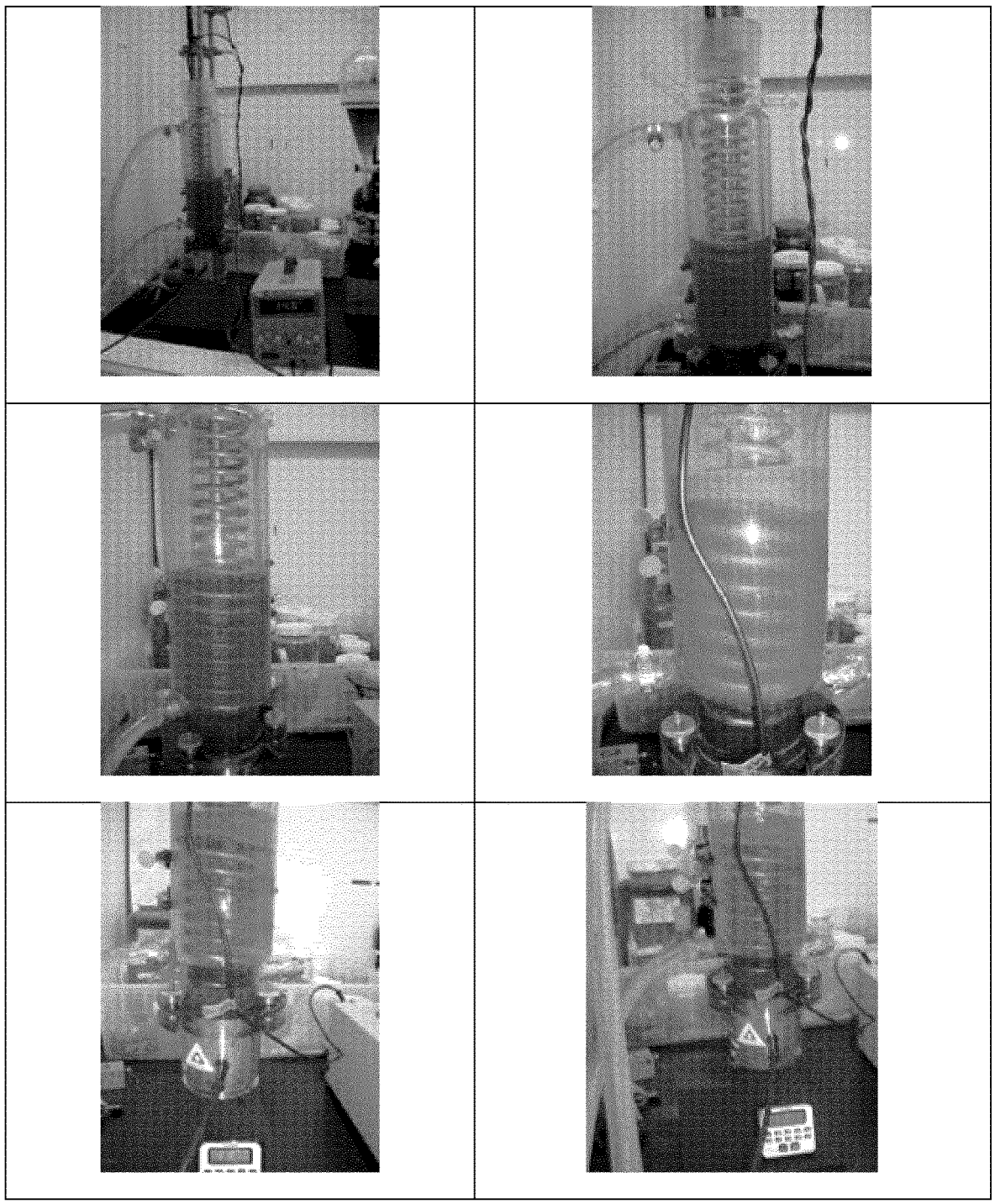

Experimental setup, and processed sample produced, shown in FIG. 25.

TABLE 12

Bench Scale Test-4A.

| | |
|---|---|
| Test Setup | Test in 1 L beaker with spinning magnet Technology) |
| Solution Type | Reconstituted algae from paste combined with potable water |
| | Added nutrient-rich water to increase conductivity (Nutrient: BBM stock) |
| Concentration | 2.5 g/L algae paste |
| | Nutrient-rich water added to the existing potable water + algae paste |
| Additives to Culture | None |
| Capacitance | Spiral coil cathode with high conductivity metal |
| Separation Setup | rod anode |
| Volume | 800 mL |
| Conductivity | 560 uS/cm |
| pH | 6.70 (raw sample with nutrient-rich water) |
| Pressure | N/A |
| Frequency | N/A |
| Voltage | 36 V |
| Current | 0.9 A |
| Run Time | 8:18 min - test stopped, solution clarity |
| Additional Details | |
| Physical Observations | Notable lipid-water separation |
| | Clarity reached by end of run |

These experiments were performed to examine the effect of magnetism on the electrosorption process. Phase separation was obtained using a spinning magnetic stirrer. Under the conditions tested, the phase separation occurred after a long time, and no specific benefit was observed using a magnet. However, conductivity increase, as shown in Tables 13 and 14 (among others) showed shorter phase separation periods.

Figure 26:
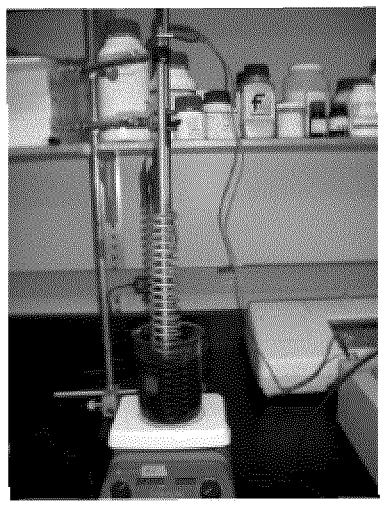
Figure 26:
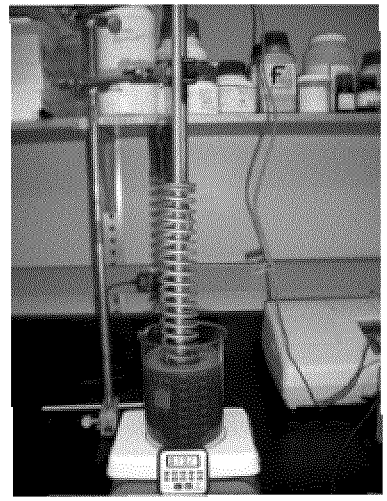
Figure 26:
Figure 26:
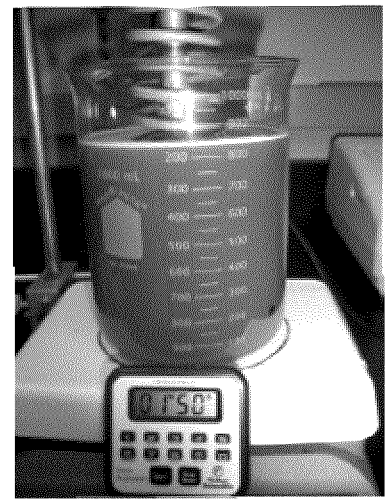
Figure 26:
Figure 26:

Experimental setup, and processed sample produced, shown in FIG. 26.

TABLE 13

Bench Scale Test-4B

| | |
|---|---|
| Test Setup | Test in Broadband Sonication System |
| Solution Type | Reconstituted algae from paste combined with potable water |
| | Added nutrient-rich water to increase conductivity (Nutrient: BBM stock) |
| Concentration | 2.5 g/L algae paste |
| | Nutrient-rich water added to the existing potable water + algae paste |
| Additives to Culture | None |
| Capacitance | Spiral coil cathode with high conductivity metal |
| Separation Setup | rod anode |
| Volume | 700 mL |
| Conductivity | 987 uS/cm |
| pH | |
| Pressure | N/A |
| Frequency | 574 kHz |
| Voltage | 36 V |
| Current | 3.8 A |
| Run Time | 1:40 min - test stopped |
| Additional Details | Nutrient-rich water was added to the solution in increments of 300 mL to increase the conductivity |
| | Final conductivity of 987 uS/cm attained |
| Physical Observations | Clear separation of phases |
| | Bubbling and raising of lipids to top of cylinder |

Figure 27:
Figure 27:
Figure 27:
Figure 27:

Experimental setup, and processed sample produced, shown in FIG. 27.

TABLE 14

Bench Scale Test-5A

| | |
|---|---|
| Test Setup | Test in 1 L beaker with spinning magnet |
| Solution Type | Nutrient-rich water and algae paste |
| Concentration | Reconstituted algae: 0.08% |
| | 3.8 g algae paste in 3.5 L nutrient-rich water |
| Additives to Culture | None |
| Capacitance | Spiral cathode with high conductivity metal |
| Separation Setup | rod anode |
| Volume | 800 mL |
| Conductivity | 1730 uS/cm |
| pH | |
| Pressure | N/A |
| Frequency | N/A |
| Voltage | 36 V |
| Current | 2.5 A at start, 2.8 A when power turned on for second time |

TABLE 14-continued

| Bench Scale Test-5A | |
|---|---|
| Run Time | 3:00 min - power turned off |
| | 6:00 min - min rest period, then power turned on |
| | 8:00 min - test stopped |
| Additional Details | |
| Physical Observations | At 40 seconds, can see separation of phases beginning |

Figure 28:
Figure 28:
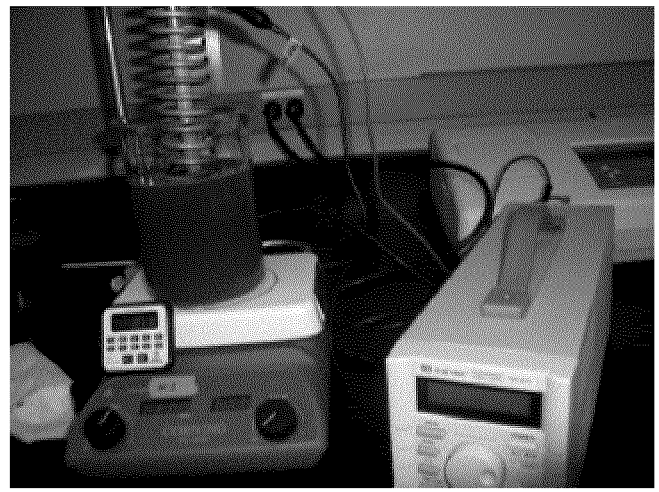
Figure 28:
Figure 28:

Experimental setup, and processed sample produced, shown in FIG. 28.

TABLE 15

| Bench Scale Test-5B | |
|---|---|
| Test Setup | Test in sonicator |
| Solution Type | Nutrient-rich water and algae paste |
| Concentration | Reconstituted algae: 0.08% |
| | 3.8 g algae paste in 3.5 L nutrient-rich water |
| Additives to Culture | None |
| Capacitance Separation Setup | Spiral cathode with high conductivity metal rod anode |
| Volume | 700 mL |
| Conductivity | 1730 uS/cm |
| pH | |
| Pressure | N/A |
| Frequency | 574 kHz |
| Voltage | 36 V |
| Current | 6.7 A |
| Run Time | 2:24 min |
| Physical Observations | |
| Additional Details | |

Figure 29:

Experimental setup, and processed sample produced, shown in FIG. 29.

Example 3—Evaluation of Capacitance-Based Separation Using Reduced Cross Sectional Area A series of experiments were designed and performed in order to test capacitance-based separation using reduced cross-sectional area. The following tables provide experimental set-up and processing conditions of a series of tests which were performed. Experimental observations for each test are provided, along with accompanying figure(s) depicting experimental setup and processed samples produced.

TABLE 16

| Analysis Test 1 | |
|---|---|
| Test Setup | Solution of algae paste in nutrient-rich water run through low pressure nozzle system, then tested using empirical evaluation using reduced cross sectional area laboratory test |
| Solution Type | Nutrient-rich water and algae paste |
| Concentration | Reconstituted algae: 0.08% |
| | 3.8 g algae paste in 3.5 L nutrient-rich water |
| Additives to Culture | None |
| Capacitance Separation Setup | Spiral coil cathode with high conductivity metal rod anode |
| Volume | 600 mL |
| Conductivity | 1730 uS/cm |
| pH | |
| Pressure | N/A |
| Frequency | N/A |
| Voltage | 36 V |

TABLE 16-continued

| Analysis Test 1 | |
|---|---|
| Current | 10 A |
| Run Time | 1:9 min |
| Additional Details | |
| Physical Observations | |

Figure 30:
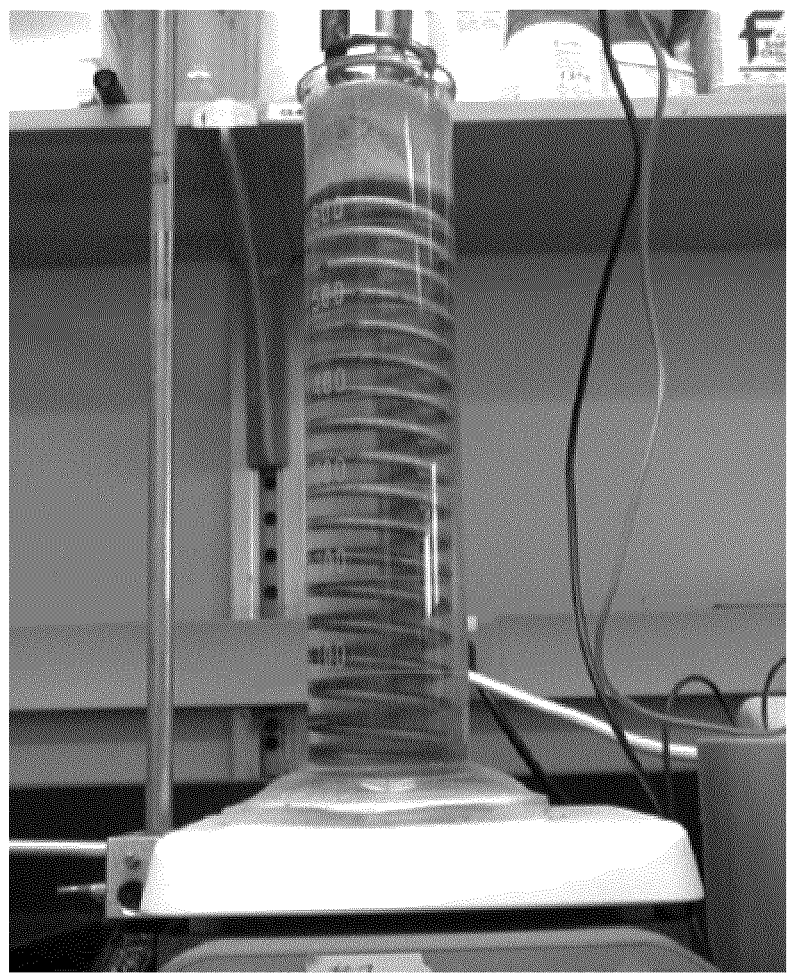
FIGS. 30-45 depict experimental setups, and processed samples produced, in the testing performed in Example 3.

Experimental setup, and processed sample produced, shown in FIG. 30.

TABLE 17

| Analysis Test-2A | |
|---|---|
| Test Setup | Solution of algae paste in nutrient-rich water run through low pressure nozzle system, then tested using empirical evaluation using reduced cross sectional area laboratory test |
| Solution Type | Nutrient-rich water and algae paste |
| Concentration | 18% dry weight |
| | 116.67 g algae paste in 30 L nutrient-rich water |
| Additives to Culture | None |
| Capacitance Separation Setup | Spiral coil cathode with high conductivity metal rod anode |
| Volume | 600 mL |
| Conductivity | 1730 uS/cm |
| pH | 6.49 |
| Pressure | N/A |
| Frequency | N/A |
| Voltage | 36 V |
| Current | 6 A |
| Run Time | 1:00 min |
| Additional Details | |
| Physical Observations | |

Figure 31:
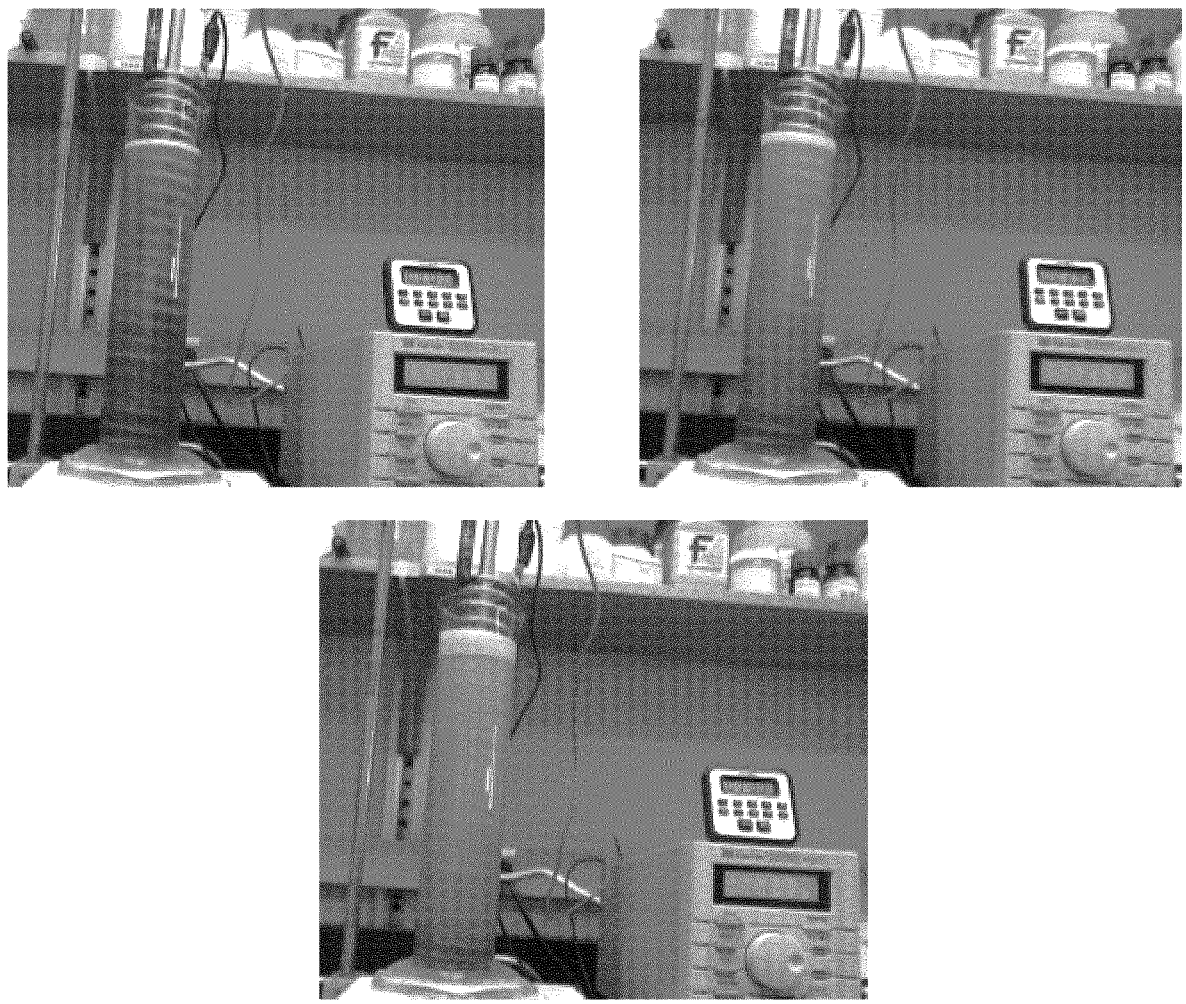

Experimental setup, and processed sample produced, shown in FIG. 31.

TABLE 18

| Analysis Test-2B | |
|---|---|
| Test Setup | Solution of algae paste in nutrient-rich water run through low pressure nozzle system, then tested using empirical evaluation using reduced cross sectional area laboratory test |
| Solution Type | Nutrient-rich water and algae paste |
| Concentration | 18% dry weight |
| | 116.67 g algae page in 30 L nutrient-rich water |
| Additives to Culture | None |
| Capacitance Separation Setup | Spiral coil cathode with high conductivity metal rod anode |
| Volume | 600 mL |
| Conductivity | 1730 uS/cm |
| pH | 6.48 |
| Pressure | N/A |
| Frequency | N/A |
| Voltage | 36 V |
| Current | 7.4 A |
| Run Time | 1:20 min |
| Additional Details | |
| Physical Observations | Rest period allows for full clarity to be achieved |

Figure 32:
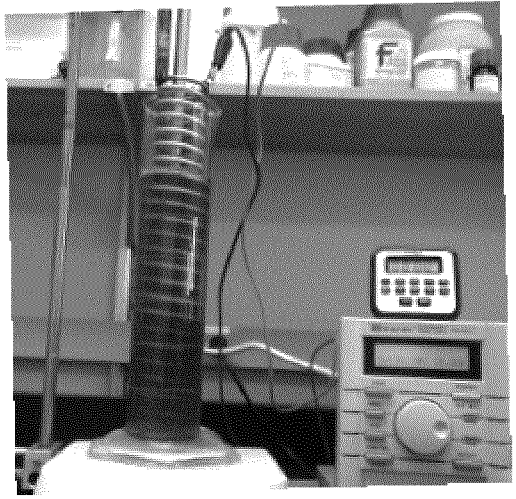
Figure 32:
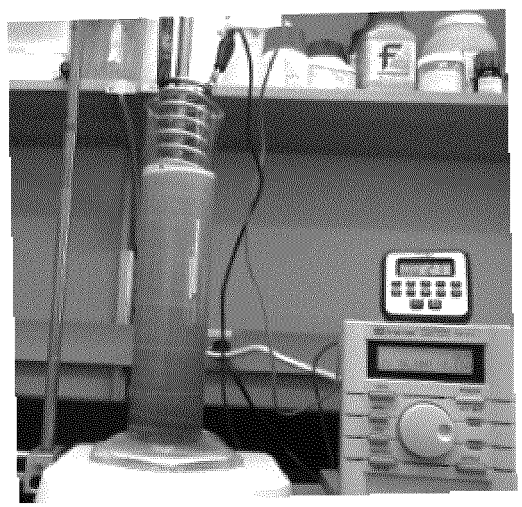
Figure 32:
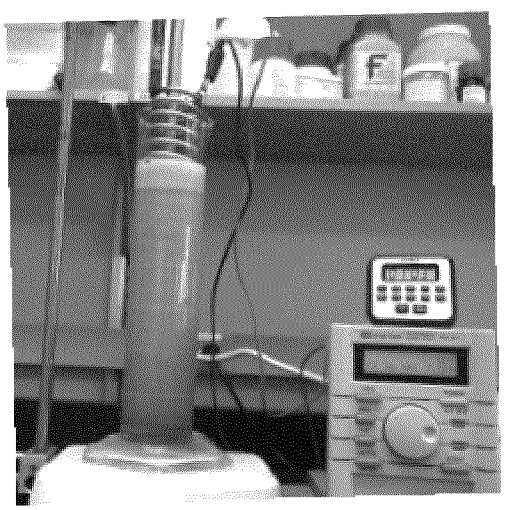
Figure 32:

Experimental setup, and processed sample produced, shown in FIG. 32.

TABLE 19

| Analysis Test-3 | |
|---|---|
| Test Setup | Solution of algae paste in nutrient-rich water run through low pressure nozzle system, then tested using empirical evaluation using reduced cross sectional area laboratory test (with and without sonication) |

TABLE 19-continued

Analysis Test-3

| | |
|---|---|
| Solution Type | Nutrient-rich water and algae paste |
| Concentration | 18% dry weight |
| | 116.67 g algae in 30 L nutrient-rich water |
| Additives to Culture | None |
| Capacitance | Spiral coil cathode with high conductivity metal |
| Separation Setup | rod anode |
| Volume | 600 mL |
| Conductivity | |
| pH | |
| Pressure | Nozzle system run at 1200 psi |
| Frequency | See Matrix Testing chart |
| | Nozzle system run at 30 Hz |
| Voltage | See Motrix Testing chart |
| Current | See Motrix Testing chart |
| Run Time | See Motrix Testing chart |
| Additional Details | For nozzle system, approximate flow was 3 L/min |
| Physical Observations | Experiment end point: water phase separation |
| | Lipid-bubble attachment as top layer (3-4 inch thick layer) |
| | Lipid-bubble cluster contains both lipid and algal phases |
| | Lipid-bubble flotation (around 60-120 seconds) |

Matrix Testing

| Test Type | Sample | Voltage (V) | Current (A) | Run Time (sec) | Freq (Hz) |
|---|---|---|---|---|---|
| Capacitance | Raw | 36 | 8 | 86 | N/A |
| Separation | 1st Run | 36 | 8 | 111 | N/A |
| Test | 2nd Run | 36 | 8 | 80 | N/A |
| | 3rd Run | 36 | 9 | 72 | N/A |
| Capacitance | 2nd Run | 36 | 7 | 120 | 575 |
| Separation + | 3rd Run | 36 | 7 | 83 | 575 |
| Sonication | | | | | |
| Test | | | | | |

Figure 33:
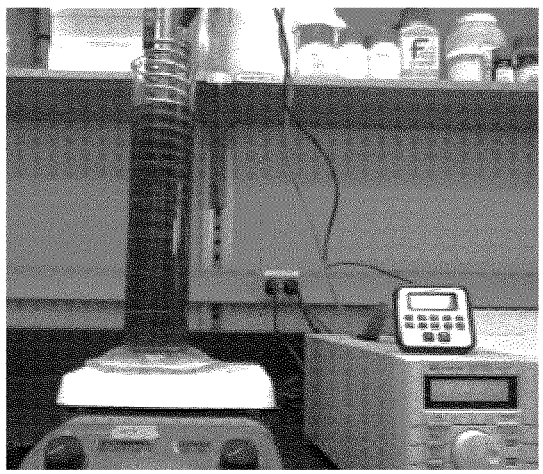
Figure 33:
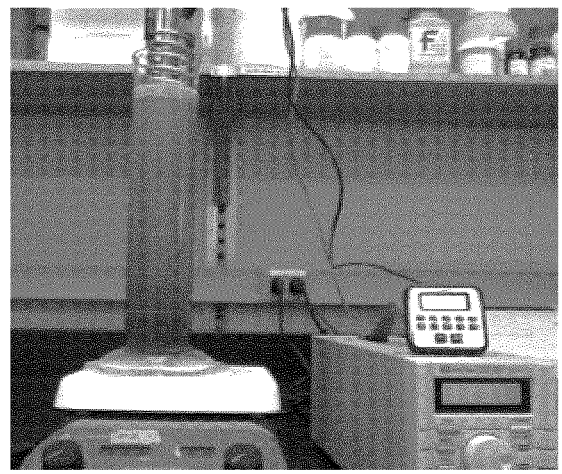
Figure 33:
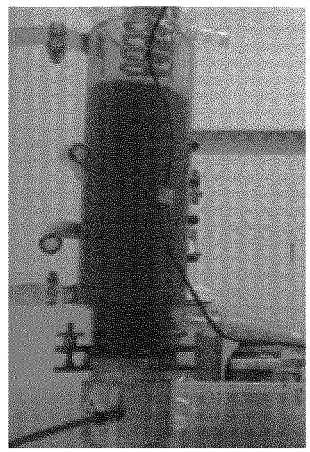
Figure 33:
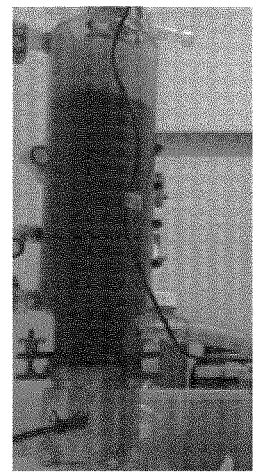

Experimental setup, and processed sample produced, shown in FIG. 33.

TABLE 20

Analysis Test-4

| | |
|---|---|
| Test Setup | Solution of algae paste in nutrient-rich water run through low pressure nozzle system, then tested using empirical evaluation using reduced cross sectional area laboratory test (with and without sonication) |
| Solution Type | Nutrient-rich water and algae paste |
| Concentration | 16% dry weight (0.5 g/L dry) |
| | 93.75 g algae paste in 30 L nutrient-rich water |
| Additives to Culture | None |
| Capacitance | Spiral coil cathode with high conductivity metal |
| Separation Setup | rod anode |
| Volume | 600 mL |
| Conductivity | |
| pH | |
| Pressure | Nozzle system run at 1200 psi |
| Frequency | See Matrix Testing chart |
| | Nozzle system run at 30 Hz |
| Voltage | See Matrix Testing chart |
| Current | See Matrix Testing chart |
| Run Time | See Matrix Testing chart |
| Additional Details | When solution was run through nozzle system, approximate flow was 3 L/min |
| Physical Observations | Experiment end point water phase separation |
| | Lipid-bubble attachment as top layer (3-4 inch thick layer) |
| | Lipid-bubble cluster contains both lipid and algal phases |
| | Lipid-bubble flotation (around 60-120 seconds) |

Nutrient-Rich Water and Algae Poste Solution Matrix Testing

| Test Type | Sample | Voltage (V) | Current (A) | Run Time (sec) | Freq (Hz) |
|---|---|---|---|---|---|
| Electrolysis | Raw | 36 | 8 | 114 | N/A |
| Test | 1st Run | 36 | 7 | 108 | N/A |
| | 2nd Run | 36 | 7 | 123 | N/A |
| | 3rd Run | 36 | 9 | 99 | N/A |
| Electrolysis + | Raw | 36 | 7 | 120 | 575 |
| Sonication Test | 1st Run | 36 | 7 | 121 | 575 |

Figure 34:
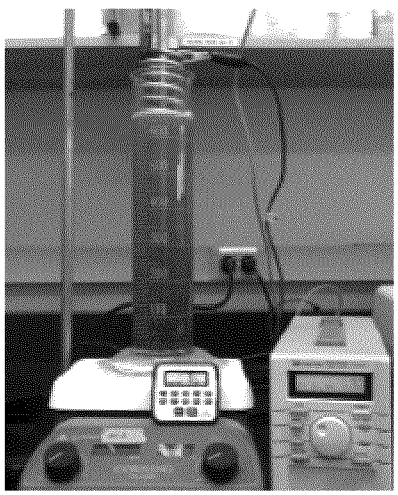
Figure 34:
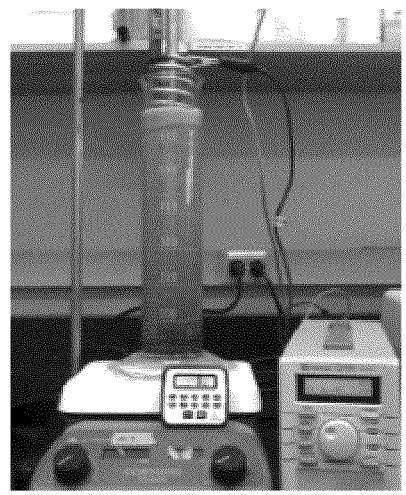
Figure 34:
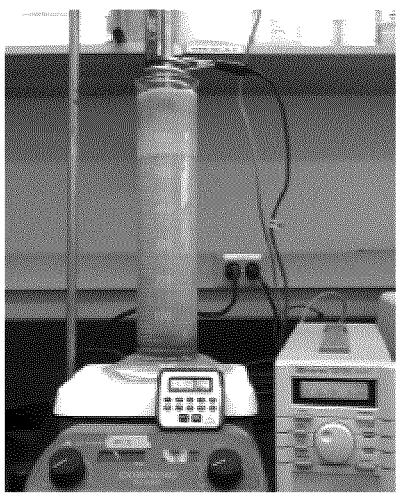
Figure 34:
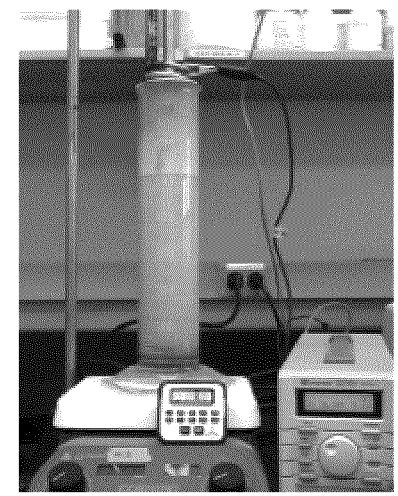

Experimental setup, and processed sample produced, shown in FIG. 34.

TABLE 21

System Test-1

| | |
|---|---|
| Test Setup | Nozzle system test |
| Solution Type | Nutrient-rich water and algae paste |
| Concentration | 0.5 g/L dry weight |
| | 25 g algae paste in 48 L nutrient rich water |
| Additives to Culture | None |
| Capacitance | Spiral coil cathode with high conductivity metal rod anode |
| Separation Setup | 36 in. length |
| Volume | 48 L |
| Conductivity | 1860 uS/cm (initial) |
| pH | |
| Pressure | Low pressure |
| Frequency | N/A |
| Voltage | 19 V |
| Current | 10 A |
| Run Time | 25 hours |
| Resonance Time | 240 seconds |
| Additional Details | Spiral coil cathode isolated from acrylic transparent tube by insulated spacers |
| | High conductivity metal rod anode fixed inside spiral coil cathode using insulated and perforated rings |
| | Inlet: tangential |
| Physical Observations | Water phase separation observed as solution is released into exit tank |
| | Lipid-bubble attachment as top layer |
| | Lipid-bubble cluster contains both lipid and algal phases |

TABLE 21-continued

| | | System Test-1 |
|---|---|---|
| | | Electrode Setup |
| Spring | Material | Zinc and carbon based conductive materials |
| | Outer Diameter | 1.5 in |
| | Inner Diameter | 1.176 in |
| | Wire Diameter | 0.162 in |
| | Length | 36 in |
| Rod | Material | High conductivity activated electrodes - activated carbon, titanium dioxide, iron and aluminum |
| | Diameter | 0.5 in |
| | Length | 36 in |
| Tube | Material | Acrylic |
| | Outer Diameter | 2 in |
| | Inner Diameter | 1.75 in |
| | Thickness | 0.125 in |

Figure 35:
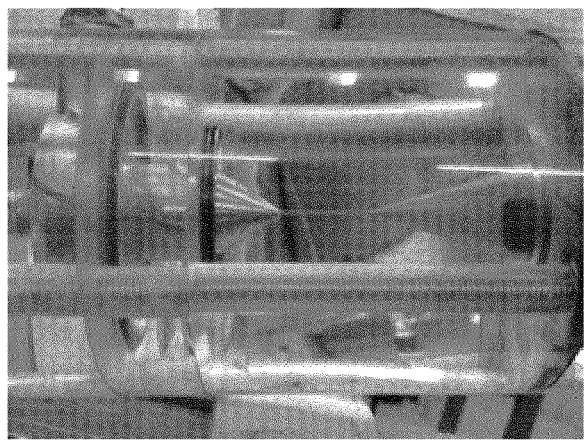
Figure 35:
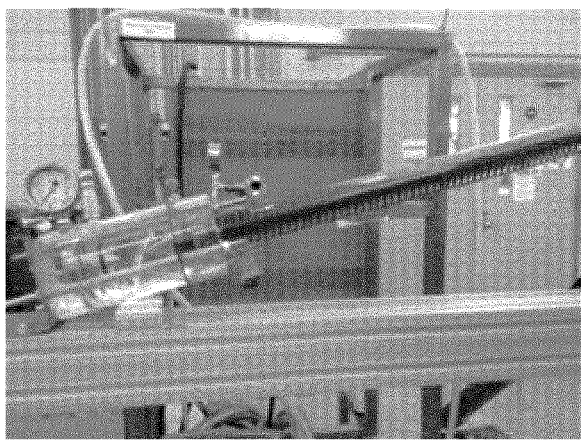
Figure 35:
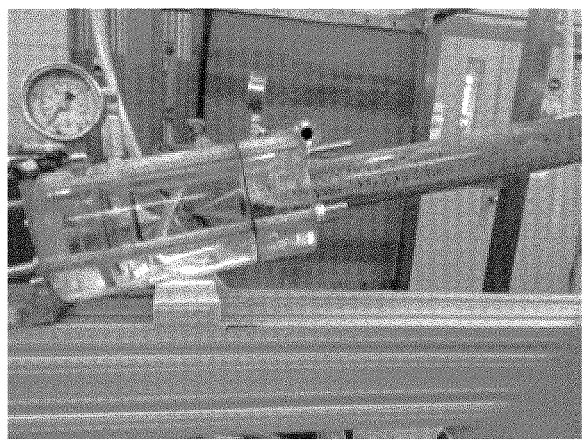
Figure 35:
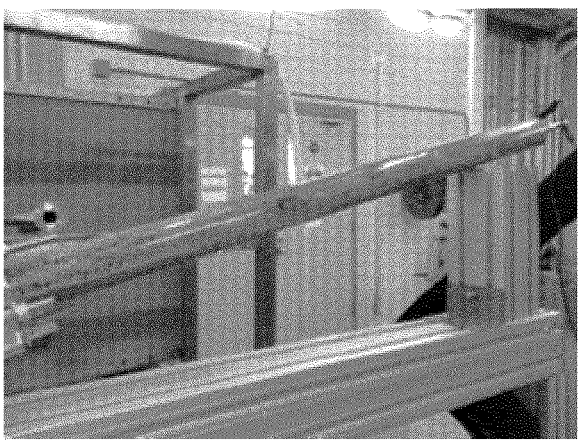
Figure 35:
Figure 35:

Experimental setup, and processed sample produced, shown in FIG. 35.

TABLE 22

| | System Test-2 |
|---|---|
| Test Setup | Electrosorptive Continuous Cavitation |
| Solution Type | Nutrient-rich water and algae paste |
| Concentration | 0.5 g/L dry weight |
| | 16.7 g algae paste in 32 L nutrient-rich water |
| Additives to Culture | None |
| Capacitance | Spiral coil cathode with high conductivity metal rod anode |
| Separation Setup | 36 in. length |
| Volume | 32 L |
| Conductivity | |
| pH | |
| Pressure | Low pressure operation (250 psi) |
| Frequency | N/A |
| Voltage | 12 V |
| Current | 10 A |
| Run Time | 1.5 hours |
| Resonance Time | 240 seconds |
| Additional Details | Perforations in insulated rings around anode increased to allow for better flow |
| | Angle increased to approximately 32" |
| | Inlet: tangential |
| Physical Observations | Water phase separation observed as solution is released into exit tank |
| | Lipid-bubble attachment as top layer (thick layer in tank) |
| | Lipid-bubble cluster contains both lipid and algal phases |

| | | Electrode Setup |
|---|---|---|
| Spring | Material | Zinc and carbon based conductive materials |
| | Outer Diameter | 1.5 in |
| | Inner Diameter | 1.176 in |
| | Wire Diameter | 0.162 in |
| | Length | 36 in |
| Rod | Material | High conductivity activated electrodes - activated carbon, titanium dioxide/Zinc |
| | Diameter | 0.5 in |
| | Length | 36 in |
| Tube | Material | Acrylic |
| | Outer Diameter | 2 in |
| | Inner Diameter | 1.75 in |
| | Thickness | 0.125 in |
| Distance | Between Spring and Rod | 0.338 |
| | Between Spring and Tube | 0.125 |

Figure 36:
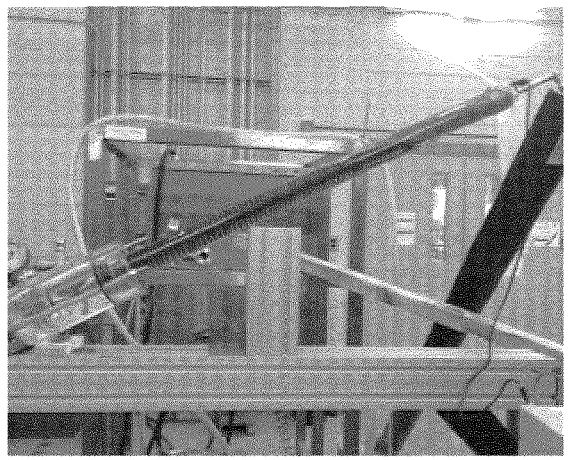
Figure 36:
Figure 36:
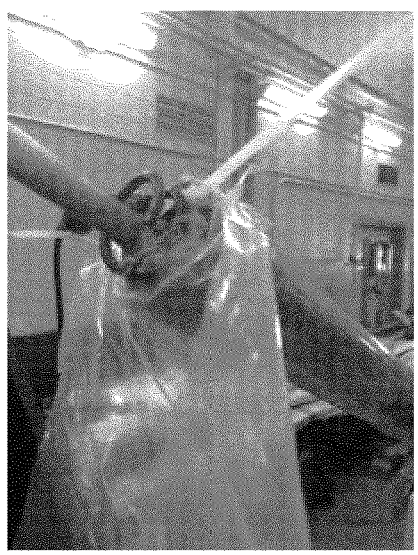
Figure 36:
Figure 36:
Figure 36:

Experimental setup, and processed sample produced, shown in FIG. 36.

TABLE 23

| System Test-3 | |
|---|---|
| Test Setup | Electrosorptive Continuous Cavitation |
| Solution Type | Nutrient-rich water and algae paste |
| Concentration | 0.5 g/L dry weight |
| | 16 g algae paste in 32 L nutrient-rich water |
| | (Concentration = 0.5 g/L) |
| Additives to Culture | None |
| Capacitance | Spiral coil cathode with high conductivity metal |
| Separation Setup | rod anode 36 in. length |
| Volume | 32 L |
| Conductivity | Start: 1635 uS/cm |
| | End: 1520 uS/cm |
| pH | Start: 6.53 |
| | End: 9.48 |
| Turbidity | Start (6" beaker): 25.6 |
| | End (6" beaker): 4.0 |
| | End (1" diameter graduated cylinder #1): 2.98 |
| | End (1" diameter graduated cylinder #2): 1.53 |
| Pressure | Low pressure |
| Frequency | N/A |
| Voltage | Start: 20 V |
| | Middle: 28 V |
| | End: 35 V |
| Current | 10 A |
| Run Time | |
| Resonance Time | |
| Additional Details | Inlet: axial |
| Physical Observations | |

Figure 37:
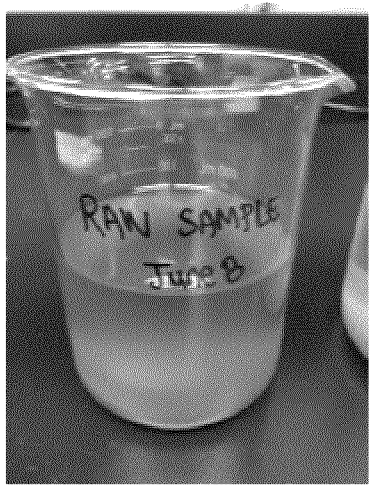
Figure 37:
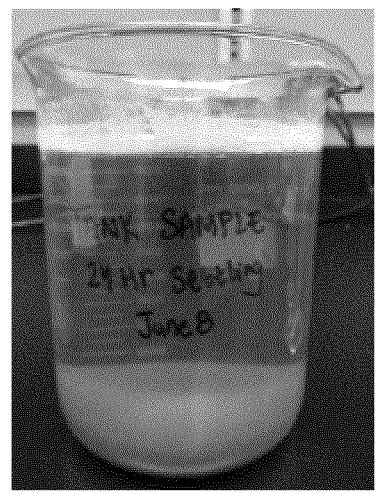
Figure 37:
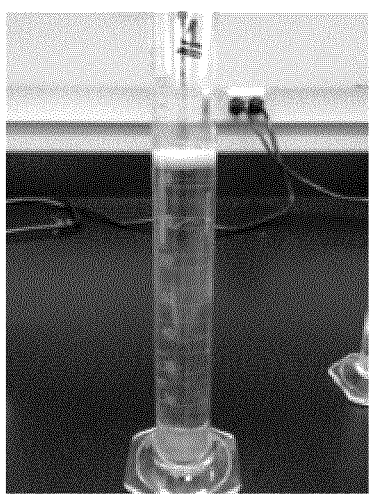
Figure 37:
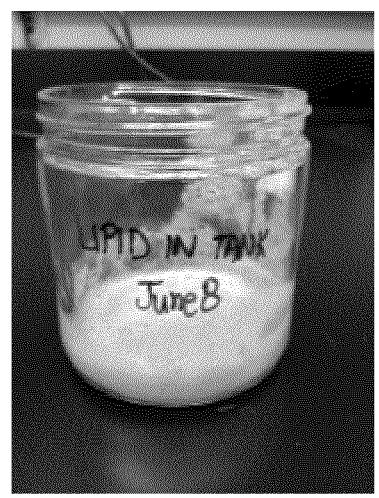
Figure 37:
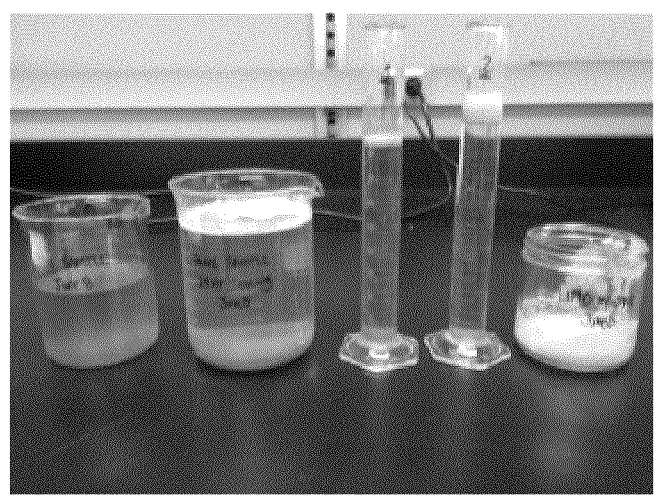

Experimental setup, and processed sample produced, shown in FIG. 37.

TABLE 24

| System Test-4 | |
|---|---|
| Test Setup | Nozzle system test |
| Solution Type | Nutrient-rich water and algae paste |
| Concentration | 0.5 g/L dry weight |
| | 16 g algae paste in 32 L nutrient-rich water |
| Additives to Culture | None |
| Capacitance | Spiral coil cathode with high conductivity metal |
| Separation Setup | rod anode 36 in. length |
| Volume | 32 L |
| Conductivity | Start: 1642 uS/cm |
| | End: 1560 uS/cm |
| pH | Start: 6.55 |
| | End: 8.88 |
| Turbidity | Start (6" beaker): 29.80 |
| | End (6" beaker): 9.30 |
| | End (6" beaker, after 24 hours): 4.75 |
| | End (1" diameter graduated cylinder #1): 8.72 |
| | End (1" diameter graduated cylinder #2): 7.85 |
| Pressure | 250 and 500 psi |
| Frequency | 11 Hz at 250 psi |
| | 16 Hz at 500 psi |
| Voltage | 17 V |
| Current | 10 A |
| Run Time | |
| Resonance Time | |
| Flow | 14 L/min at 250 psi |
| | 2.0 L/min at 500 psi |
| Additional Details | Inlet: axial |
| Physical Observations | |

Figure 38:
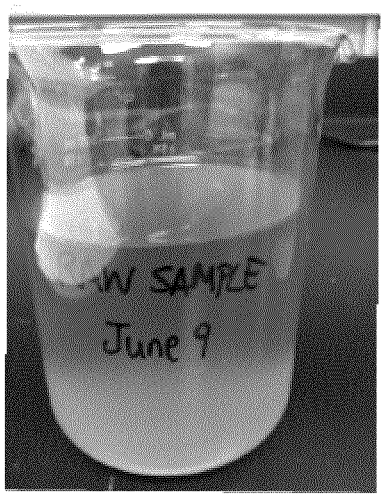
Figure 38:
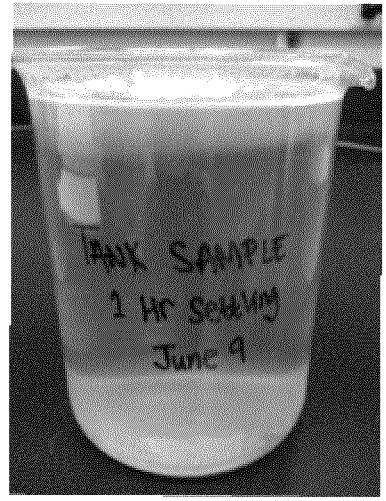
Figure 38:
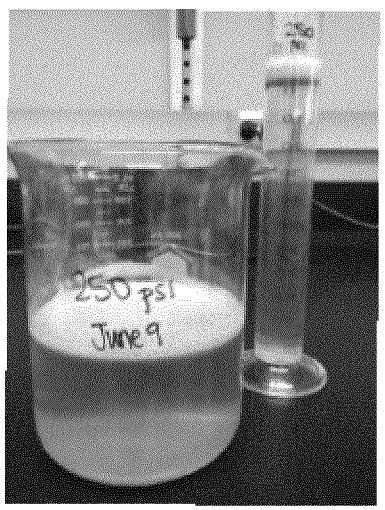
Figure 38:
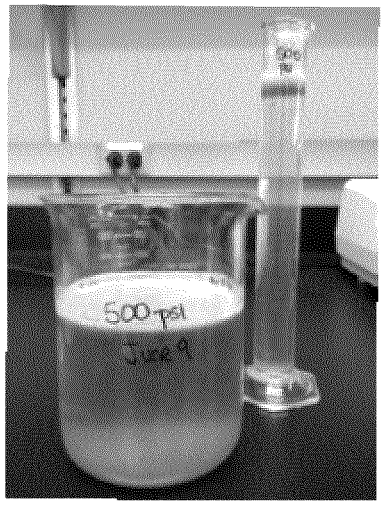
Figure 38:
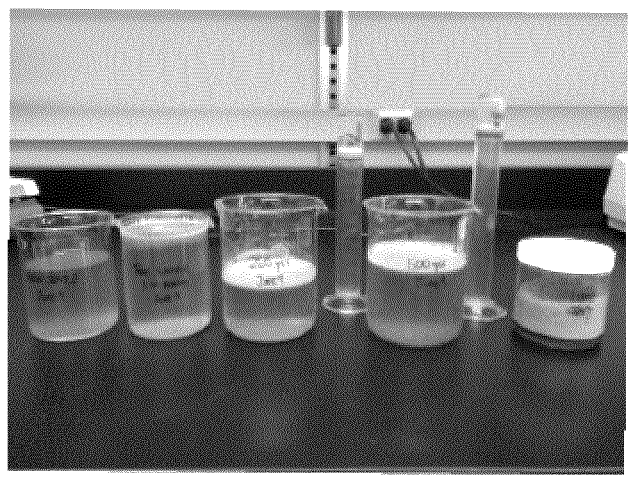

Experimental setup, and processed sample produced, shown in FIG. 38.

TABLE 25

| System Test-5 | |
|---|---|
| Test Setup | Electrosorptive Continuous Cavitation |
| Solution Type | Nutrient-rich water and algae paste |
| Concentration | 0.1% dry |

TABLE 25-continued

| System Test-5 | |
|---|---|
| Additives to Culture | None |
| Capacitance | Spiral coil cathode with high conductivity metal |
| Separation Setup | rod anode 36 in. length |
| Volume | 18 L |
| Conductivity | Start: 1544 uS/cm |
| | End: 1403 uS/cm |
| pH | Start: 6.59 |
| | End: 8.30 |
| Turbidity | Start (6" beaker): 41.0 |
| | End (6" beaker): 16.1 |
| | End (6" beaker, after 7 hours): 5.09 |
| | End (1" diameter graduated cylinder): 9.3 |
| | End (1" diameter graduated cylinder, after |
| | 7 hours): 4.95 |
| Pressure | 250 psi |
| Frequency | 11 Hz |
| Voltage | 17 V |
| Current | 10 A |
| Run Time | 13 minutes 24 second |
| Resonance Time | 72 seconds |
| Flow | 1.4 L/min |
| Mass of lipid | 79.97 g |
| Additional Details | Inlet axial |
| Physical Observations | |

Figure 39:
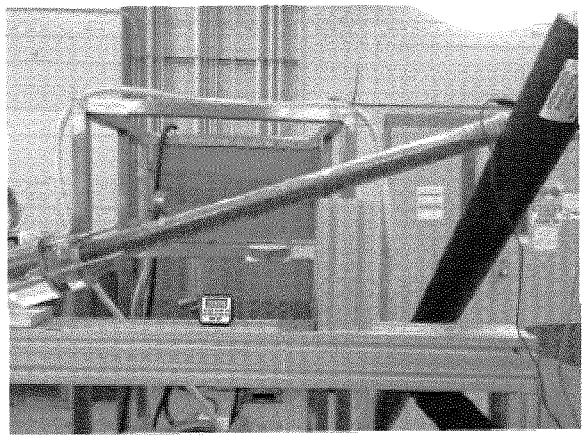
Figure 39:
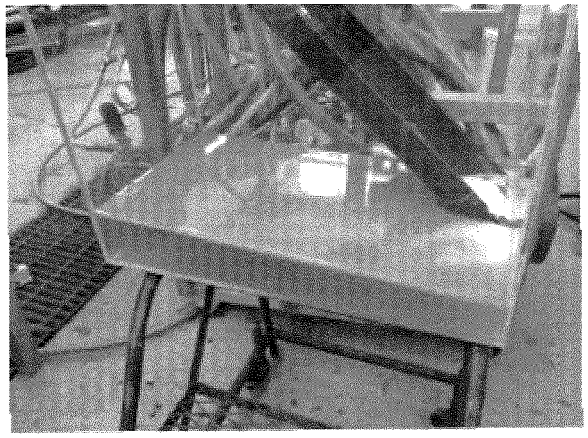
Figure 39:
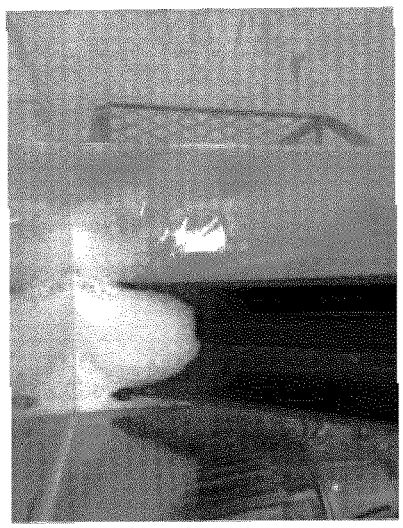
Figure 39:
Figure 39:
Figure 39:
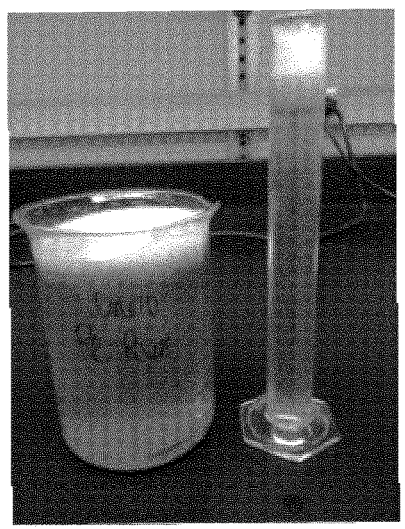

Experimental setup, and processed sample produced, shown in FIG. 39.

TABLE 26

| System Test-6 | |
|---|---|
| Test Setup | Electrosorptive Continuous Cavitation |
| Solution Type | Nutrient-rich water and algae paste |
| Concentration | 0.1% dry |
| Additives to Culture | None |
| Capacitance | Spiral coil cathode with high conductivity metal |
| Separation Setup | rod anode 36 in. length |
| Volume | 18 L |
| Conductivity | Start: 1535 |
| | End: 1467 |
| pH | Start: 6.53 |
| | End: 9.17 |
| Turbidity | Start (6" beaker): 46.8 |
| | End (6" beaker): 28.7 |
| | End (6" beaker, after 7 hours): 14.9 |
| | End (1" diameter graduated cylinder): 15.5 |
| | End (1" diameter graduated cylinder, after |
| | 7 hours): 9.55 |
| Pressure | 500 psi |
| Frequency | 17 Hz |
| Voltage | 16 V |
| Current | 10 A |
| Run Time | 8 minutes 38 seconds |
| Resonance Time | 0:22 min |
| Flow | 2.1 L/min |
| Mass of lipid | 78.46 |
| Additional Details | Inlet: axial |
| Physical Observations | |

Figure 40:
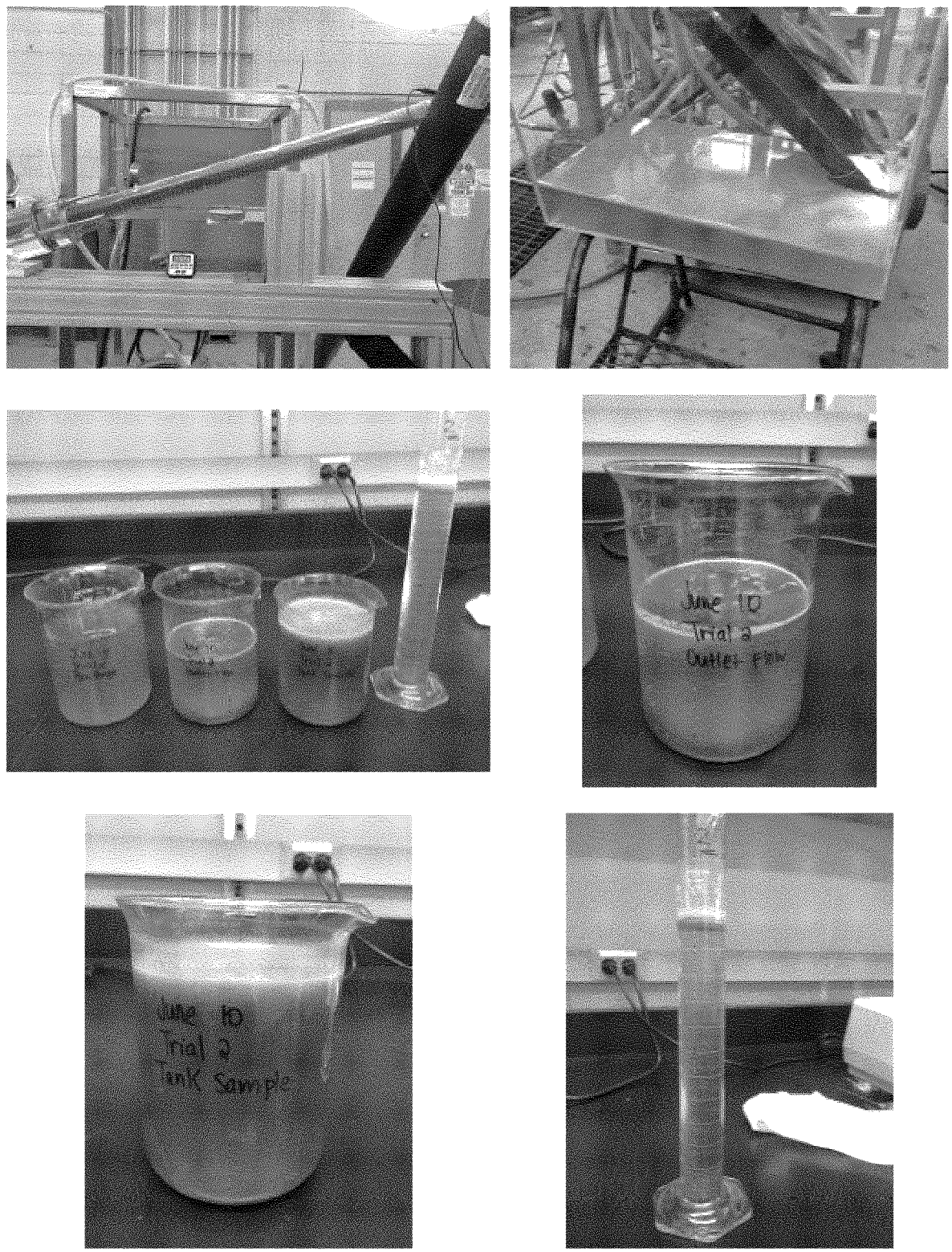

Experimental setup, and processed sample produced, shown in FIG. 40.

TABLE 27

| System Test-7 | |
|---|---|
| Test Setup | Nozzle system test |
| Solution Type | Nutrient rich water and algae paste |
| Concentration | 0.1% dry |
| Additives to Culture | None |
| Capacitance | Spiral coil cathode with high conductivity metal |
| Separation Setup | rod anode 36 in. length |
| Volume | 60 L |

TABLE 27-continued

System Test-7

| | |
|---|---|
| Conductivity | Start: 1560 |
| | End: 1459 |
| pH | Start: 6.53 |
| | End: 9.94 |
| Turbidity | End (after 30 min): 42.0 NTU |
| Pressure | Low pressure |
| Frequency | |
| Voltage | 26 V |
| Current | 10 A |
| Run Time | |
| Resonance Time | 2:25 min |
| Flow | 0.375 L/min |
| Mass of lipid | |
| Additional Details | |
| Physical Observations | |

Figure 41:
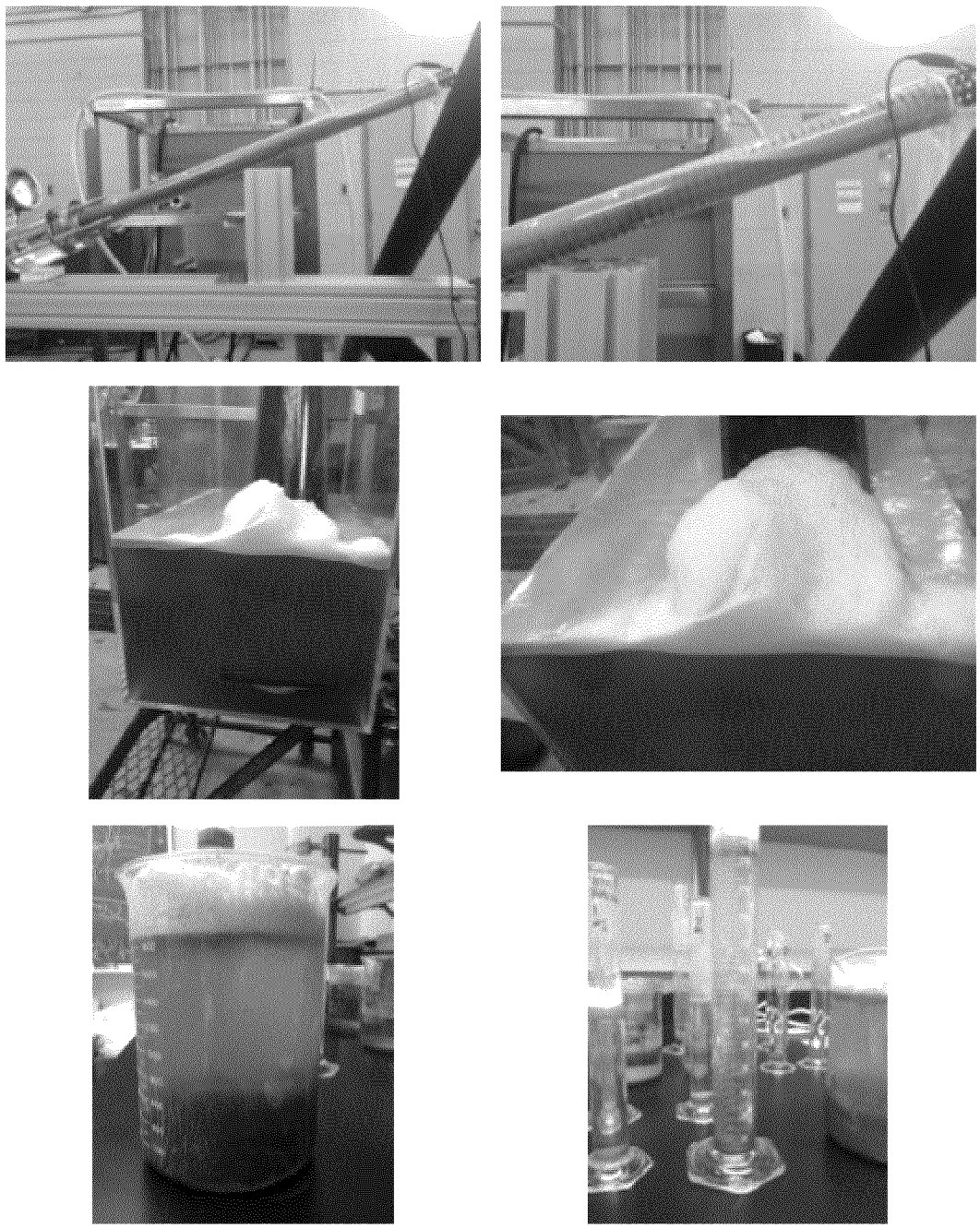

Experimental setup, and processed sample produced, shown in FIG. 41.

TABLE 28

System Test-8

| | |
|---|---|
| Test Setup | Electrosorptive Continuous Cavitatior |
| Solution Type | Nutrient rich water and algae paste |
| Concentration | 0.1% dry |
| Additives to Culture | None |
| Capacitance | Spiral coil cathode with high conductivity metal |
| Separation Setup | rod anode 36 in. length |
| Volume | 32 L |
| Conductivity | |
| pH | |
| Turbidity | |
| Pressure | Low pressure |
| Frequency | |
| Voltage | 19 V |
| Current | 10 A |
| Run Time | |
| Resonance Time | |
| Flow | |
| Mass of lipid | |
| Additional Details | Sample collected into beakers of increasing radius for physical observation of algae separation over time. Three setups were used |
| | I Cylinder separator with low pressure system |
| | II Cylinder separatior with low pressure system and additional inlet tube |
| | III Cylinder separator with 250 psi system and additional inlet tube |
| Physical Observations | See photos |

Figure 42:
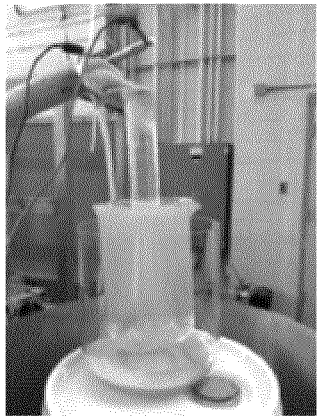
Figure 42:
Figure 42:
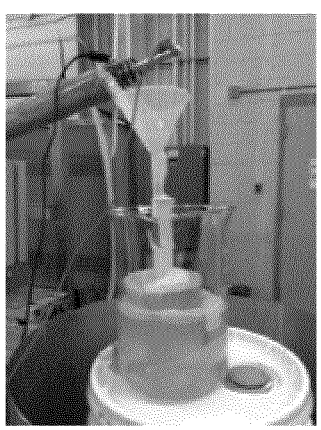
Figure 42:
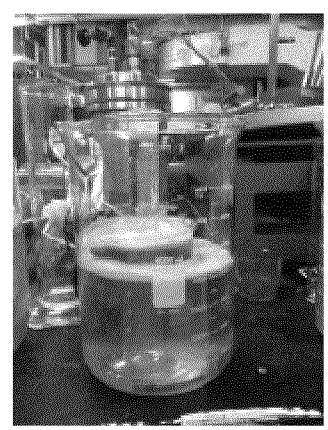
Figure 42:
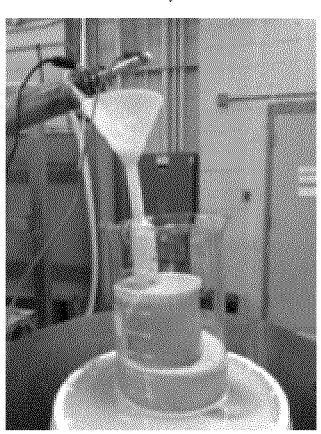
Figure 42:
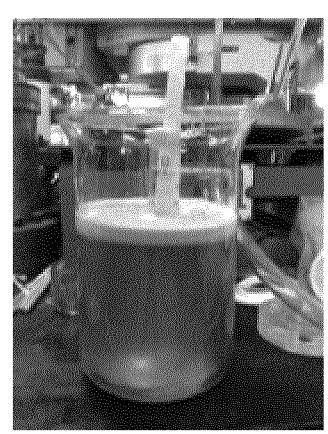

Experimental setup, and processed sample produced, shown in FIG. 42.

TABLE 29

System Test-9

| | |
|---|---|
| Test Setup | Electrosorptive Continuous Cavitatior |
| Solution Type | Nutrient rich water and algae paste |
| Concentration | 0.5% dry |
| Additives to Culture | None |
| Capacitance | Spiral coil cathode with high conductivity metal |
| Separation Setup | rod anode 36 in. length |
| Volume | 40 L |
| Conductivity | 1525 uS/cm |
| pH | |
| Turbidity | |
| Pressure | 250 psi |
| Frequency | 8 Hz |
| Voltage | 15 V |
| Current | 10 A |
| Run Time | 1 hour |
| Resonance Time | 1:20 min |

TABLE 29-continued

System Test-9

| | |
|---|---|
| Flow | 2.1 L/min |
| Mass of lipid | 78.46 |
| Additional Details | Inlet: tangential |
| Physical Observations | |

Figure 43:
Figure 43:
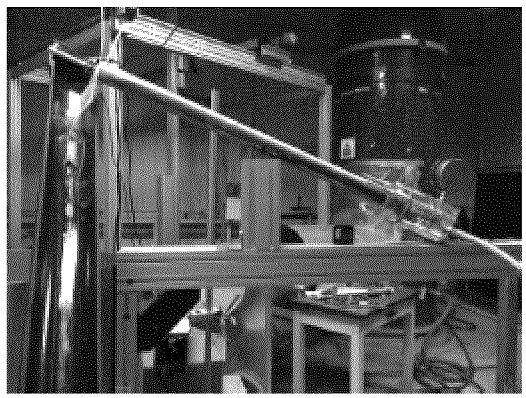
Figure 43:
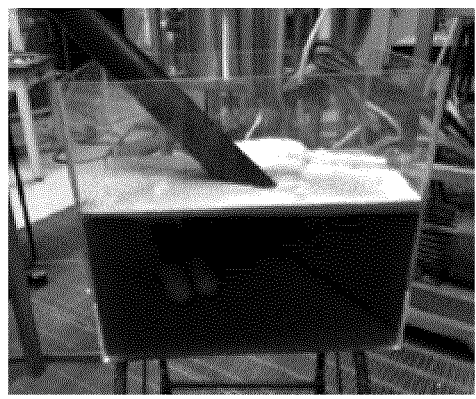
Figure 43:
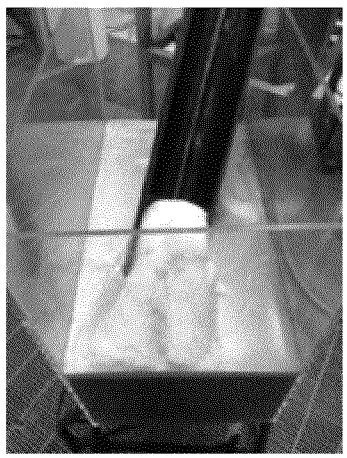
Figure 43:
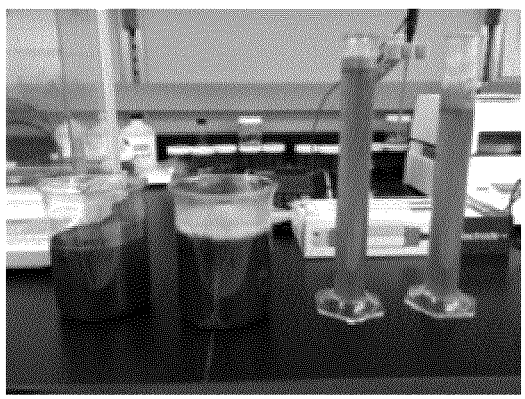
Figure 43:
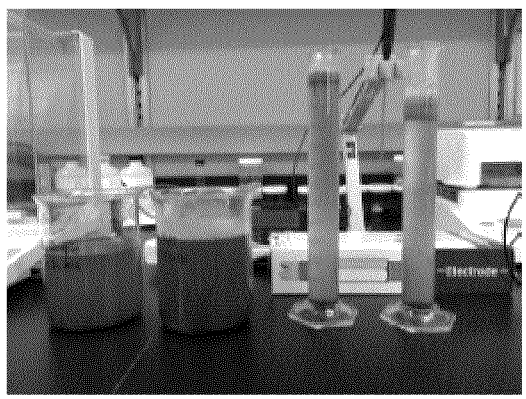

Experimental setup, and processed sample produced, shown in FIG. 43.

TABLE 30

System Test-10

| | |
|---|---|
| Test Setup | Electrosorptive Continuous Cavitatior |
| Solution Type | Nutrient rich water and algae paste |
| Concentration | 0.05% dry |
| Additives to Culture | None |
| Capacitance | Spiral coil cathode with high conductivity metal |
| Separation Setup | rod anode 36 in. length |
| Volume | 40 L |
| Conductivity | Start: 1477 uS/cm |
| | End: 714 uS/cm |
| pH | |
| Turbidity: | End: 4.07 NTU |
| | End (after 3.4 hours): 3.14 NTU |
| Pressure | Low pressure |
| Frequency | 8 Hz |
| Voltage | 15 V |
| Current | 10 A |
| Run Time | 1 hour |
| Resonance Time | 1:20 min |
| Flow | 2.1 L/min |
| Mass of lipid | |
| Additional Details | Inlet: tangential |
| | Collector in 3 L capacity tube |
| Physical Observations | Algae mass settling at bottom of collection tube |
| | Lipid remaining at top of collection tube |

Figure 44:
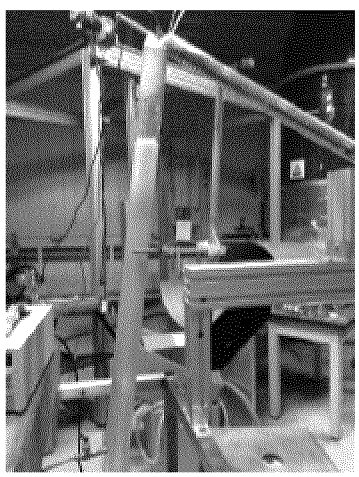
Figure 44:
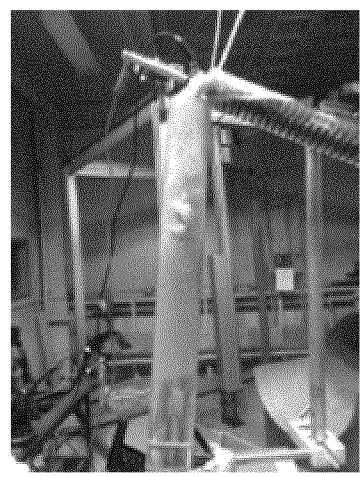
Figure 44:
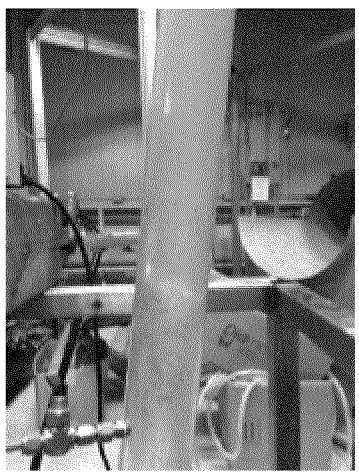
Figure 44:

Experimental setup, and processed sample produced, shown in FIG. 44.

TABLE 31

System Test-11

| | |
|---|---|
| Test Setup | Electrosorptive Continuous Cavitatior Test complete a twice first at 250 psi and then repeated with extremely low pressures |
| Solution Type | Nutrient rich water and algae paste |
| Concentration | 0.05% dry |
| Additives to Culture | None |
| Capacitance | Spiral coil cathode with high conductivity metal |
| Separation Setup | rod anode 36 in. length |
| Volume | 40 L |
| Conductivity | 1515 uS/cm |
| pH | |
| Turbidity | |
| Pressure | 250 psi test: |
| | Low pressure test: |
| Frequency | |
| Voltage | 250 psi test: 16 V |
| | Low pressure test: 10 V |
| Current | 250 psi test: 10 A |
| | Low pressure test: 10 A |
| Run Time | 250 psi test |
| | Collection time in vertical 3.5 L collectior tube = 3:00 min |
| | Settling time = 2 hours (not completely settled) |
| | Complete run time = 11:00 min |
| | Low pressure test: |
| | Collection time in vertical 2.5 L collectior tube = 10:00 min |

TABLE 31-continued

| System Test-11 | |
| --- | --- |
| Resonance Time | 250 psi test: |
| | Low pressure test: 3:00 min |
| Flow | |
| Mass of lipid | Low pressure test: Lipid mass = 1000.86 g |
| Additional Details | |
| Physical Observations | 250 psi test: After 2 hours of settling time, collection tube not cleared completely, cannot observe full separator of phases |
| | Low pressure test: Much clearer separation of phases in less time |

Figure 45:
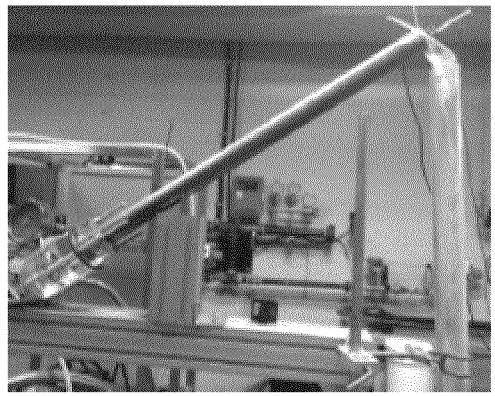
Figure 45:
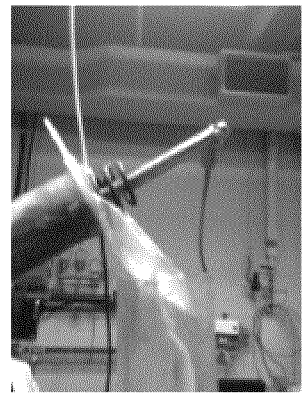
Figure 45:
Figure 45:
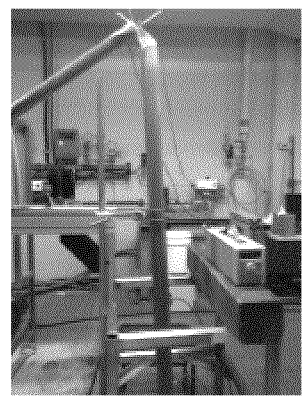
Figure 45:
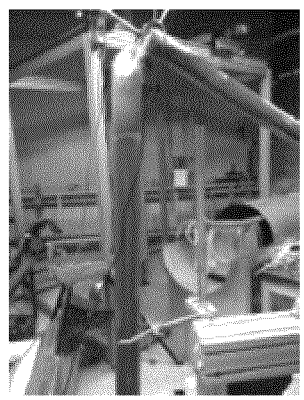
Figure 45:
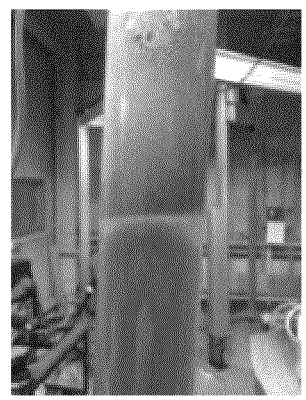

Experimental setup, and processed sample produced, shown in FIG. 45.

Example 4—FAME Analysis for Lipid Extract and Dried Algal Biomass

FAME (Fatty Acid Methyl Ester) analysis experiments were performed to assess lipid extracts and dried algal biomass products produced according to methods described herein (see Example 5).

The following table (Table 32) provides results of FAME analysis of 4 samples: CV2 Biomass, CN2 Biomass, CV2 Lipid, and CN1 Lipid. Experimental protocol is provided in Example 5. Two biomass samples (CN2 and CV2) from the 1500 psi and 18 psi experimental runs in Example 5 were submitted for spectroscopic analysis and 1 lipid sample from the 18 psi run (CN1) was also analyzed. Lipids were extracted from CV2 biomass with solvents using modified Bligh and Dwyer method and then analyzed as shown in Table 32.

Materials and Methods
FAME standards: Supelco® 37 component FAME mix and PUFA-3 (Supelco, USA)
Methyl tricosanoate (23:0 Methyl ester): Sigma-Aldrich, USA
$BF_3$ Solution in MeOH: Sigma-Aldrich, USA
NaOH: Sigma-Aldrich, USA
Hexane: Caledon, Canada Experimental Protocol
Direct trans-esterification-saponification by NaOH followed by $BF_3$-catalyzed methylation was performed. Protocol was as follows:
1. Add 10 mg (or exact weight in mg) of sample in a dry screw-capped vial.
2. Add 1.0 mL MeOH containing 0.1 mg internal standard (methyl tricosanoate; 23:0 methyl ester).
3. Sonicate for 10 min.
4. Add 0.5 mL 1.5 N NaOH solution in MeOH, blanket with nitrogen, cap and mix.
5. Heat 5 min at 100° C. and cool.
6. Add 1.0 mL 14% $BF_3$ solution in MeOH blanket with nitrogen, mix and heat at 100° C. for 30 min.
7. Add 0.5 mL distilled water and mix.
8. Add 2.0 mL hexane, blanket with nitrogen and vortex for 30 sec.
9. Centrifuge using benchtop centrifuge (Fisher Scientific centrific model 228) for 1 min.
10. Transfer hexane layer (300-600 µL) to a GC vial, blanket with nitrogen and store the sample at −20° C. before analysis.
11. Mass of EPA and DHA in the sample will be calculated as mg/g sample, as follows:

$$\text{EPA or DHA, mg/g} = (A_x \cdot W_{IS} \cdot CF_x / A_{IS} \cdot W_S \cdot 1.04) \cdot 1000$$

Where $A_x$=area counts of EPA or DHA; AIS=area counts of internal standard (tricosylic acid methyl ester), $CF_x$=theoretical detector correlation factor for EPA or DHA (0.99 for EPA, 0.97 for DHA); $W_{IS}$=weight of IS added to sample in mg; $W_S$=sample weight in mg; and 1.04 is factor necessary to express result as mg fatty acid/g sample.

The weight of the rest of the fatty acids were also calculated using the same formula as described above, assuming that all fatty acids regardless of the structure have the same response as the internal standard (i.e. theoretical detector correlation factor is equal to 1).

Reference: AOAC official method 991.39. Fatty acids in encapsulated fish oils and fish oil methyl and ethyl esters. Gas chromatography methods.

TABLE 32

| Fatty Acid (FA) content, expressed in mg/g sample | | | | |
| --- | --- | --- | --- | --- |
| Fatty Acid (FA) | CV2 biomass | CN2 biomass | CV2 lipid | CN1 lipid |
| C8:0 | — | — | — | — |
| C10:0 | — | — | — | — |
| C11:0 | — | — | — | — |
| C12:0 (Lauric acid) | — | — | — | — |
| C13:0 (Tridecanoic acid) | — | — | — | — |
| C14:0 (Myristic acid) | — | — | — | 3.29 |
| C14:1 (Myristoleic acid) | — | 0.18 | 1.29 | 1.05 |
| C15:0 (Pentadecanoic acid) | — | — | 0.45 | 3.88 |
| C15:1 (cis-10-Pentadecenoic acid) | — | — | 0.30 | — |
| C16:0 (Palmitic add) | 2.60 | 0.75 | 24.39 | 107.60 |
| C16:1 n-7 (Palmitoleic acid) | — | — | 1.21 | — |
| C17:0 (Heptadecanoic acid) | — | — | 0.97 | 1.22 |
| C17:1 (cis-10-Heptadecenoic acid) | — | — | 3.97 | 0.98 |
| C18:0 (Stearic acid) | 0.21 | 0.08 | 2.67 | 10.13 |
| C18:1 n-9c/t (Oleic acid/Elaidic acid) | 0.75 | 0.51 | 13.33 | 47.06 |
| C18:1 n-7 | — | — | 1.65 | — |
| C18:2 n-6c/t (Linoleic acid/Linolelaidic acid) | 0.49 | 0.11 | 22.05 | 5.09 |
| C18:3 n-6 (γ-linolenic acid) | — | — | 0.16 | — |
| C18:3 n-3 (α-linolenic acid) | 0.15 | 0.08 | 0.12 | 3.71 |
| C20:0 (Arachidic acid) | — | — | 0.33 | — |
| C20:1 n-9 (cis-11-Eicosenoic acid) | — | — | 0.32 | 1.75 |
| C20:2 (cis-11,14-Eicosadienoic acid) | — | — | 0.08 | — |
| C20:3 n-6 (cis-8,11,14-Eicosatrienoic acid) | — | — | 0.48 | — |
| C21:0 (Henicosanoic acid) | — | — | 0.07 | — |

TABLE 32-continued

| Fatty Acid (FA) content, expressed in mg/g sample | | | | |
|---|---|---|---|---|
| Fatty Acid (FA) | CV2 biomass | CN2 biomass | CV2 lipid | CN1 lipid |
| C20:3 n-3 (cis-8,11,14-Eicosatrienoic acid) | — | — | 0.37 | 3.37 |
| C20:4 n-6 (Arachidonic acid) | — | — | 0.04 | 1.11 |
| C20:5 n-3 (Eicosapentaenoic acid) | — | — | 0.07 | — |
| C22:0 (Behenic acid) | — | — | 0.22 | 0.42 |
| C22:1 n-9 (Erucic acid) | — | — | 0.45 | 0.43 |
| C22:2 n-3 (Docosadienoic acid) | — | — | 0.68 | 1.67 |
| C24:0 (Lignoceric acid) | — | — | 0.07 | — |
| C22:6 n-3 (Docosahexaenoic acid) | — | — | — | — |
| unknown RT 6.419 | 0.15 | — | 1.70 | 6.54 |
| unknown RT 6.674 | 0.20 | — | 7.14 | 1.54 |
| unknown RT 11.743 | — | — | 10.45 | — |

(—) not detected

Example 5—Additional Testing of Algal Aqueous Mixtures

Two high pressure tests (1500 psi) were performed, and in both tests no changes occurred after 30 min and 60 min settling periods (i.e. no separation was seen in collection tanks located at the top of the vertical system). During the low pressure tests, a previous batch of *C. sorokiniana* showed very clear separation in the collection vessel. See Example 6 for experimental protocol details. The high and low pressure experiments performed at 1500 psi and at 18 psi described are the "1" and "2" samples reported in Table 32.

Figure 46:
FIG. 46 shows depictions of algal cultures, cavitation test setups, low pressure cavitation setups, and processed algal products obtained following treatment, in the testing performed in Example 5.
Figure 46:
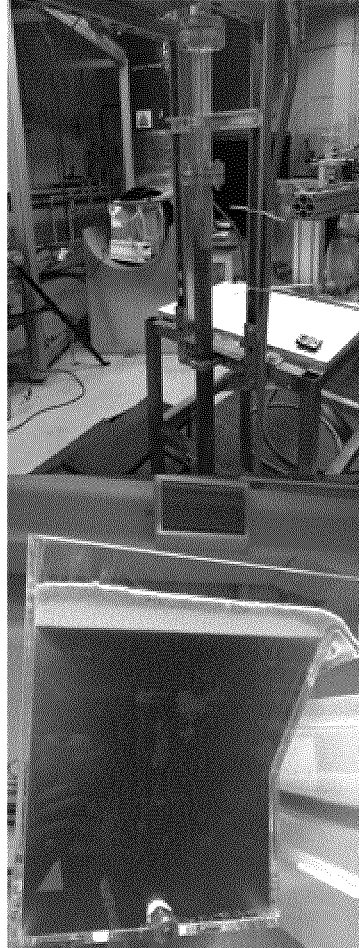
Figure 46:
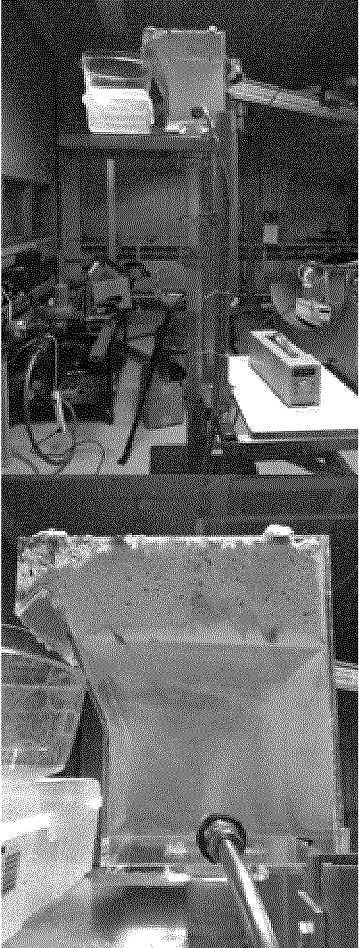
Figure 46:
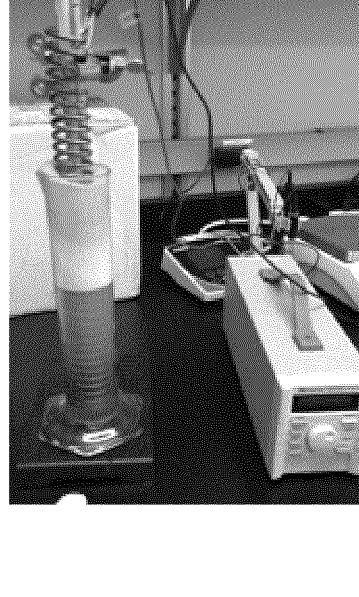
Figure 46:
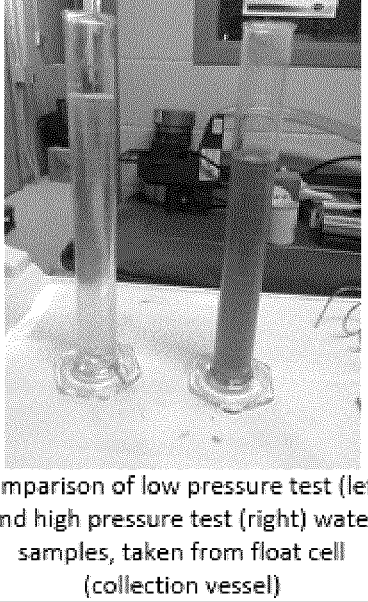

FIG. 46 shows depictions of algal cultures, cavitation test setups, low pressure cavitation setups, and processed algal products obtained following treatment.

Example 6—Symbiotic Culture Evaluation

Experimental Protocol:

Algal culture (*Chlorella vulgaris*) was received from Symbiotic Algae Inc. The received culture was obtained nutrient-depleted and with a low conductivity of 680 uS/m is connected to an AC power input (36 V, 10 amps) that serves to enhance the advanced oxidation generated by cavitating nuclei and results in lipid-biomass-water phase separation through lipid-bubble interactions and reduced polarity of the algal cells rendering their effective settling in a single step. There are several experiments carried out to validate the developed system from laboratory scale to pilot scales.

In certain embodiments, electrosorptive cavitation may be a continuous process and may be further designed to operate in a single step without the addition of added chemicals, flocculants, adsorbents, or pH buffer agents beyond the nutrients supplied to the culture during the algal growth in photobioreactors. Electrosorptive cavitation process may include a batch/continuous electrosorptive-cavitating flow system to perform both extraction and separation processes by applying a complex cavitating flow which applies a high pressure to a tangential flow inlet.

A summary showing differences between low and high pressure electrosorptive cavitation is benchmarked against a system with electrosorption only:

| Test Setup | System test using electrosorptive cavitation | System test using electrosorptive cavitation | System test using electrosorptive cavitation | System test using electrosorption only |
|---|---|---|---|---|
| Solution Type | *Chlorella vulgaris* with F2 media | *Chlorella vulgaris* with F2 media | *Chlorella vulgaris* with F2 media | *Chlorella vulgaris* with F2 media |
| Additives to Culture | None | None | None | None |
| Volume | 20 L | 20 L | 20 L | 20 L |
| Conductivity | Raw sample: 680 μs/cm | Raw sample: 680 μs/cm | Raw sample: 680 μs/cm | Raw sample: 680 μs/cm |
| pH | 7.10 | 7.10 | 7.10 | 7.1 |
| Pressure | 250 psi | 800 psi | 1100 psi | 18 psi |
| Frequency | 11 Hz | 20 Hz | 20 Hz | — |
| Run Time | 7:57 min | 5:05 min | 5:15 min | 25:40 min |
| Resonance Time | 1:17 min | 0:57 min | 00:50 min | 6:15 min |
| Flow | 0.9 L/min | 1.8 L/min | 2 L/min | 0.2 L/min |
| Mass of Algae and water | 78.6 (g), centrifuged with 1000 rpm for 10 min | 54.21 (g), centrifuged with 1000 rpm for 10 min | 91.72 (g), centrifuged with 1000 rpm for 10 min | 24.46 (g), centrifuged with 1000 rpm for 10 min |
| Physical Observations | After 3:00 min settling time, water in float cell appeared clear. | After 3:30 min settling time, water in float cell appeared clear. | Brown color in raw sample. Water in float cell appeared clear | After 3:00 min settling time, water in float cell was not very clear. | and was not stressed during operation to produce lipids. To find out the dry content of wet algae, 2.0 g of wet algae was dried in an oven overnight at 105° C. and the dry content was calculated. Multiple tests were performed using 400 ml (lab scale) to 20 L batches (pilot scale) in the electrosorptive cavitation system under low to medium to high pressure cavitation (18 psi, 250 psi, 800 psi and 1100 psi). The system Additional experiments testing treatment of algal culture were performed. Algal culture (*Chlorella vulgaris*) was tested. The culture was nutrient depleted, and was reported with a low conductivity of 680 μS/m and was not stressed during operation to produce lipids. Two pails of samples were brownish in color, with a distinct odour of degradation.

It can be inferred that the samples may have partially degraded due to storage time and/or temperature.

Multiple tests were performed using 20 L batches and electrosorptive cavitation treatment. Results are shown below for both low and high pressure cavitation. Algae cells were analyzed using a microscope and were observed to be between 2 and 7 microns in size. The culture was separated and water samples and both culture and water samples are prepared for spectroscopic analysis. The conditions of operation and collected results are summarized in the following Tables and Figures.

TABLE 33

Symbiotic Culture Evaluation - System Test 1

| Test Setup | System test using nozzle |
|---|---|
| Solution Type | *Chlorella vulgaris* algae with nutrient depleted media |
| Concentration | |
| Additives to Culture | None |
| Capacitance Separation Setup | Spiral coil cathode (steel) with high conductivity metal rod anode (aluminum) 36 in. length |
| Volume | 20 L |
| Conductivity | Raw sample: 680 µs/cm |
| pH | Raw sample: 7.10 |
| Turbidity | |
| Pressure | 250 psi |
| Frequency | 11 Hz |
| Voltage | 36.1 V (constant voltage)<br>34 V (after 5:00 min, switched to constant current) |
| Current | 7.7 A (constant voltage)<br>10 A (after 5:00 min, switched to constant current setting) |
| Run Time | 7:57 min |
| Resonance Time | 1:17 min |
| Flow | 0.9 L/min |
| Mass of lipid | |
| Mass of Algae and $H_2O$ after centrifuged | 78.6 (g), centrifuged with 1000 rpm for 10 min |
| Additional Details | Pail 1 of 3 |
| Physical Observations | After 3:00 min settling time, water in float cell appeared clear. |

Figure 47:
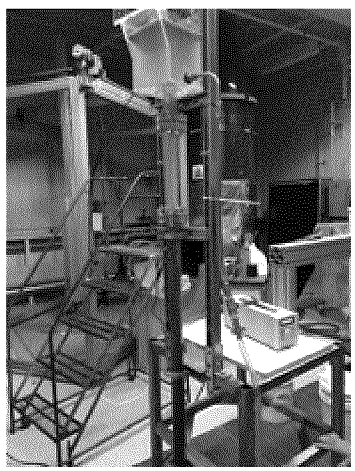
FIGS. 47-52 depict experimental setups, and processed samples produced, in the testing performed in Example 6.
Figure 47:
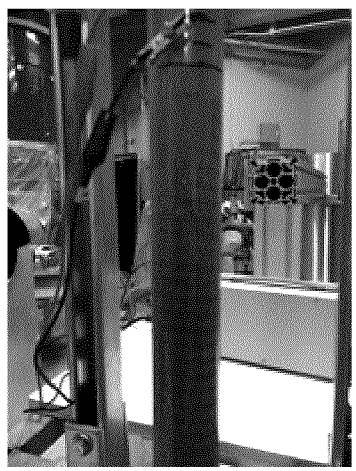
Figure 47:
Figure 47:
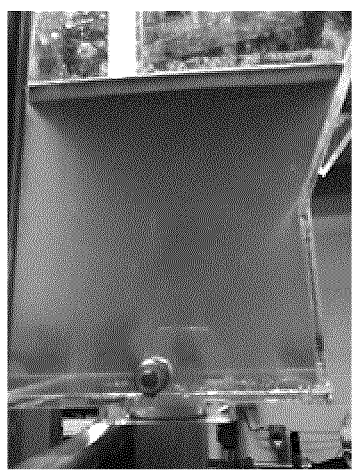
Figure 47:
Figure 47:

Experimental setup, and processed sample produced, shown in FIG. 47.

TABLE 34

Symbiotic Culture Evaluation - System Test 2

| Test Setup | System test using nozzle |
|---|---|
| Solution Type | *Chlorella vulgaris* algae with nutrient depleted media |
| Concentration | |
| Additives to Culture | None |
| Capacitance Separation Setup | Spiral coil cathode (steel) with high conductivity metal rod anode (aluminum) 36 in. length |
| Volume | 20 L |
| Conductivity | Raw sample: 680 µs/cm |
| pH | Raw sample: 7.10 |
| Turbidity | |
| Pressure | 800 psi |
| Frequency | 20 Hz |
| Voltage | 33.40 V (constant voltage)<br>32 V (after 4:00 min, switched to constant current setting) |
| Current | 10.10 A (constant voltage)<br>10 A (after 4:00 min, switched to constant current setting) |

TABLE 34-continued

Symbiotic Culture Evaluation - System Test 2

| Test Setup | System test using nozzle |
|---|---|
| Run Time | 5:05 min |
| Resonance Time | 0:57 min |
| Flow | 1.8 L/min |
| Mass of lipid | |
| Mass of Algae and $H_2O$ after centrifuged | 54.21 (g), centrifuged with 1000 rpm for 10 min |
| Additional Details | Pail 1 of 3 |
| Physical Observations | After 3:30 min settling time, water in float cell appeared clear. |

Figure 48:
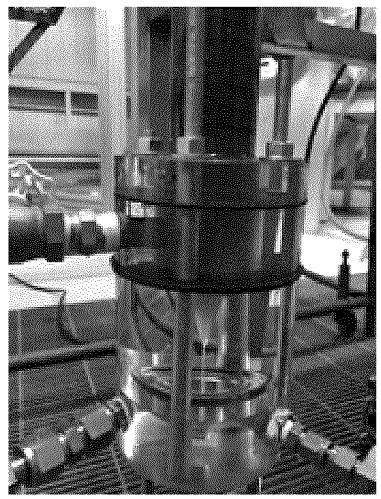
Figure 48:
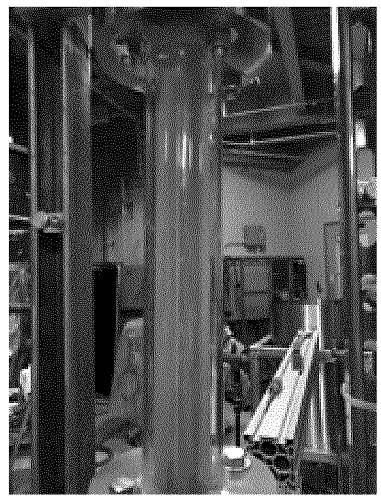
Figure 48:
Figure 48:

Experimental setup, and processed sample produced, shown in FIG. 48.

TABLE 35

Symbiotic Culture Evaluation - System Test 3

| Test Setup | System test using nozzle |
|---|---|
| Solution Type | *Chlorella vulgaris* algae with nutrient depleted media |
| Concentration | |
| Additives to Culture | None |
| Capacitance Separation Setup | Spiral coil cathode (steel) with high conductivity metal rod anode (aluminum) 36 in. length |
| Volume | 20 L |
| Conductivity | Raw sample: 680 µs/cm |
| pH | Raw sample: 7.10 |
| Turbidity | |
| Pressure | 18 psi |
| Frequency | |
| Voltage | 36 V |
| Current | 7.8 A (at start)<br>9 A (after 17:00 min)<br>8 A (after 24:00 min) |
| Run Time | 25:40 min |
| Resonance Time | 6:15 min |
| Flow | 0.2 L/min |
| Mass of lipid | |
| Mass of Algae and $H_2O$ after centrifuged | 24.46 (g), centrifuged with 1000 rpm for 10 min |
| Additional Details | Pail 2 of 3 |
| Physical Observations | After 3:00 min settling time, water in float cell was not very clear. Brown color in raw sample. |

Figure 49:
Figure 49:
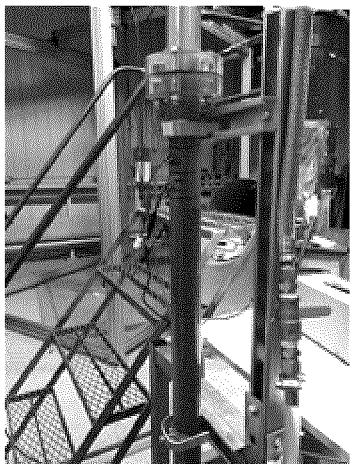
Figure 49:
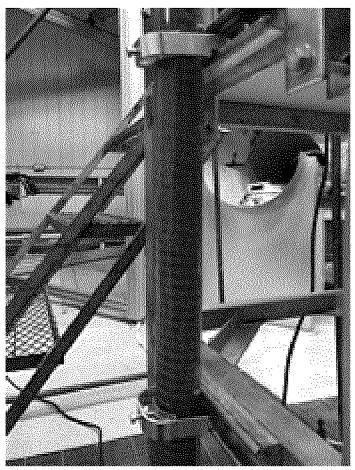
Figure 49:
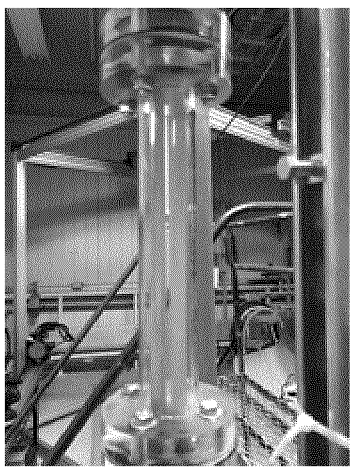
Figure 49:
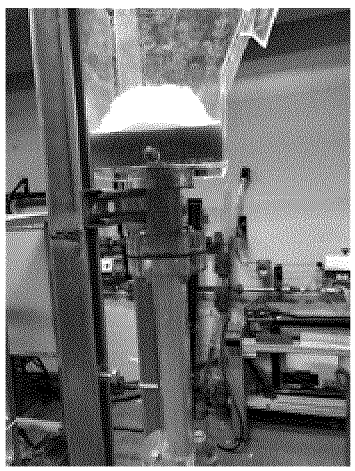
Figure 49:
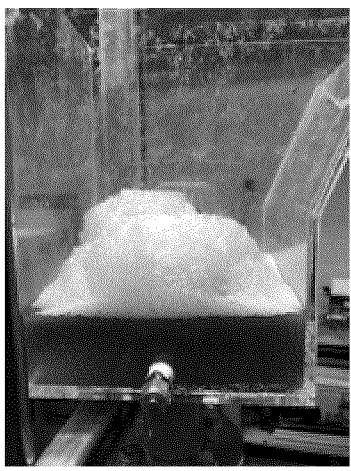

Experimental setup, and processed sample produced, shown in FIG. 49.

TABLE 36

Symbiotic Culture Evaluation - System Test 4

| Test Setup | System test using nozzle |
|---|---|
| Solution Type | *Chlorella vulgaris* algae with nutrient depleted media |
| Concentration | |
| Additives to Culture | None |
| Capacitance Separation Setup | Spiral coil cathode (steel) with high conductivity metal rod anode (aluminum) 36 in. length |
| Volume | 20 L |
| Conductivity | Raw sample: 680 µs/cm |
| pH | Raw sample: 7.10 |
| Turbidity | |
| Pressure | 1100 psi |
| Frequency | 20 Hz |
| Voltage | 36 V |

TABLE 36-continued

Symbiotic Culture Evaluation - System Test 4

| Test Setup | System test using nozzle |
|---|---|
| Current | 7.8 A (after 2:00 min) |
| | 8.5 A (after 3:00 min) |
| | 9.8 A (after 4:30 min) |
| Run Time | 5:15 min |
| Resonance Time | 00:50 min |
| Flow | 2 L/min |
| Mass of lipid | |
| Mass of Algae and H$_2$O after centrifuged | 91.72 (g), centrifuged with 1000 rpm for 10 min |
| Additional Details | Pail 2 of 3 |
| Physical Observations | Brown color in raw sample. |

Figure 50:
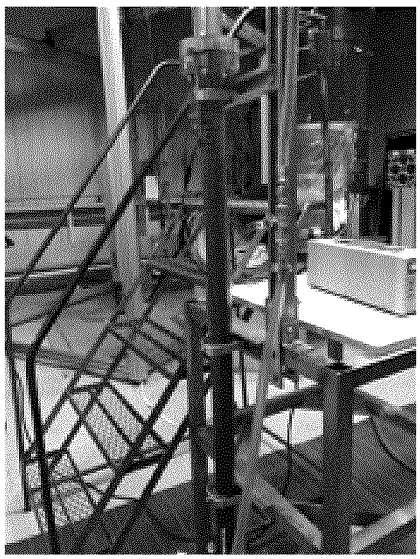
Figure 50:
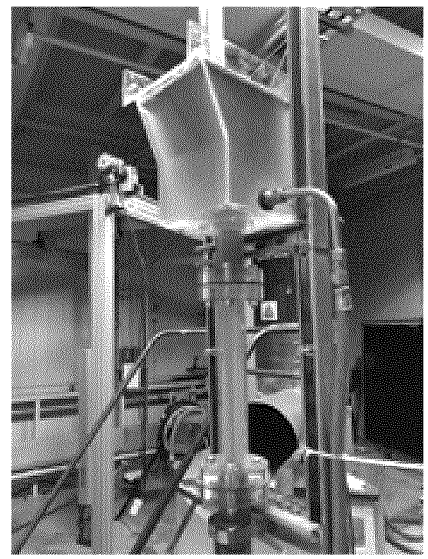
Figure 50:
Figure 50:

Experimental setup, and processed sample produced, shown in FIG. 50.

TABLE 37

Symbiotic Culture Evaluation - System Test 5

| Test Setup | System test using nozzle |
|---|---|
| Solution Type | *Chlorella vulgaris* algae with nutrient depleted media |
| Concentration | |
| Additives to Culture | None |
| Capacitance Separation Setup | Spiral coil cathode (steel) with high conductivity metal rod anode (aluminum) 36 in. length |
| Volume | 20 L |
| Conductivity | Raw sample: 680 µs/cm |
| pH | Raw sample: 7.10 |
| Turbidity | |
| Pressure | 1100 psi |
| Frequency | 20 Hz |
| Voltage | 36 V |
| Current | 8 A (at start) |
| | 9.5 A (after 3:00 min) |
| Run Time | 4:00 min |
| Resonance Time | 00:40 min |
| Flow | 2 L/min |
| Mass of lipid | |
| Mass of Algae and H$_2$O after centrifuged | 82.24 (g), centrifuged with 1000 rpm for 10 min |
| Additional Details | Pail 3 of 3 |
| Physical Observations | 3:00 min settling time |

Figure 51:
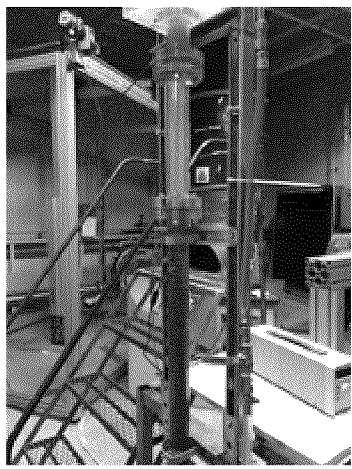
Figure 51:
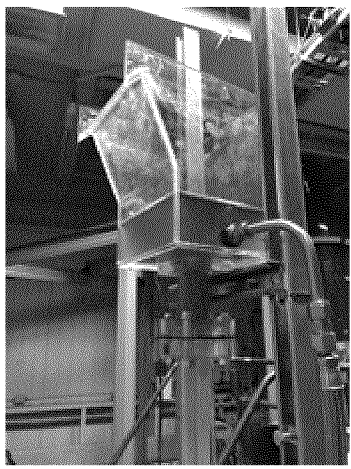
Figure 51:
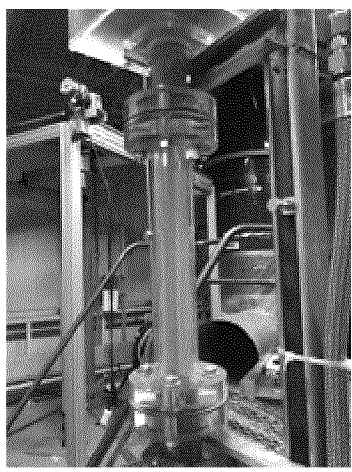
Figure 51:
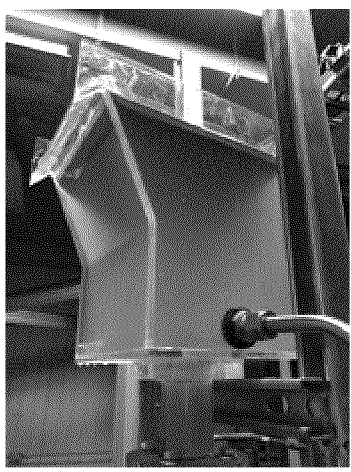
Figure 51:
Figure 51:
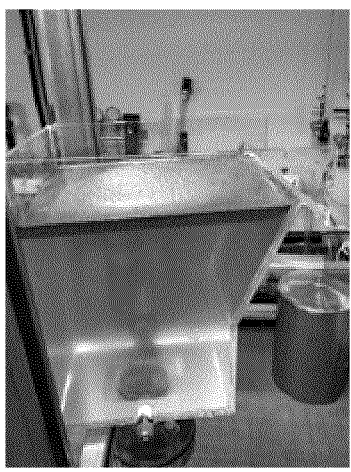

Experimental setup, and processed sample produced, shown in FIG. 51.

TABLE 38

Symbiotic Culture Evaluation - System Test 6

| Test Setup | System test using nozzle |
|---|---|
| Solution Type | *Chlorella vulgaris* algae with nutrient depleted media |
| Concentration | |
| Additives to Culture | None |
| Capacitance Separation Setup | Spiral coil cathode (steel) with high conductivity metal rod anode (aluminum) 36 in. length |
| Volume | 20 L |
| Conductivity | Raw sample: 680 µs/cm |
| pH | Raw sample: 7.10 |
| Turbidity | |
| Pressure | 250 psi |
| Frequency | 11 Hz |
| Voltage | 36 V |
| Current | 6.6 A (after 1:30 min) |
| | 9.3 A (after 7:00 min) |

TABLE 38-continued

Symbiotic Culture Evaluation - System Test 6

| Test Setup | System test using nozzle |
|---|---|
| Run Time | 7:55 min |
| Resonance Time | 1:18 min |
| Flow | 1 L/min |
| Mass of lipid | |
| Mass of Algae and H$_2$O after centrifuged | 154.56 (g), centrifuged with 1000 rpm for 10 min |
| Additional Details | Pail 3 of 3 |
| Physical Observations | 3:00 min settling time |

Figure 52:
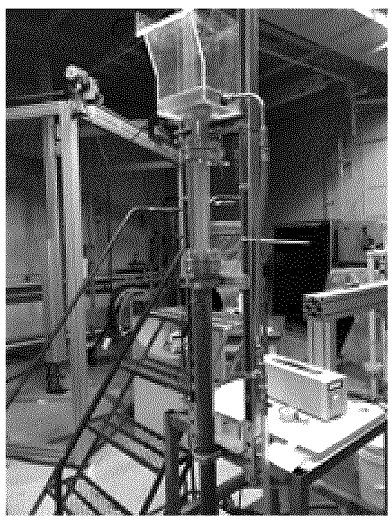
Figure 52:
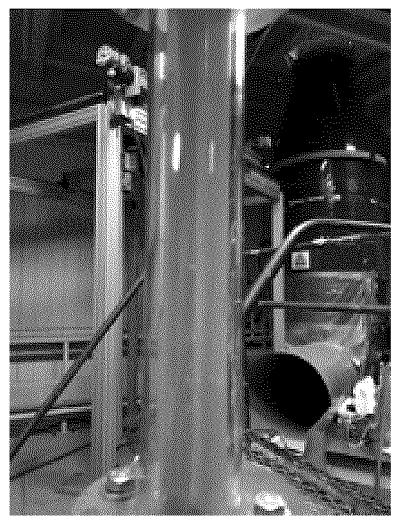
Figure 52:
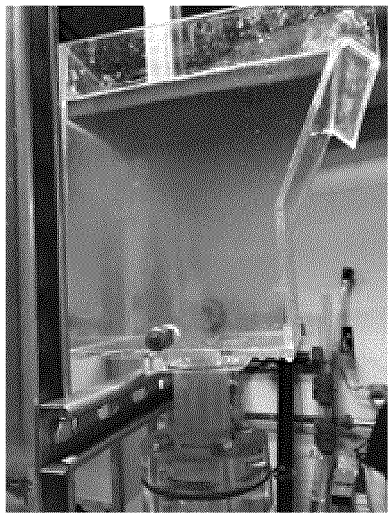
Figure 52:
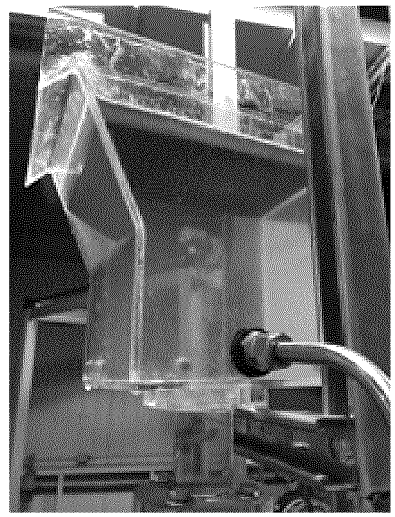

Experimental setup, and processed sample produced, shown in FIG. 52.

Example 7—Metals Separation and Processing of Mining Affected Water

Experiments were performed with mine water, and metals separation was assessed following treatment. The experimental results demonstrated a significant reduction in metals content in the water.

Mine affected water was subjected to electrosorptive cavitation in a laboratory scale system. Mine affected water, rich in aluminium, iron and sulphate was batch tested with electrosorptive cavitation in the system described earlier for algae-water-lipid extraction and phase separation.

During the test, 20 L of mine water was subjected to electrosorptive cavitation and samples were collected for ICP analysis. ICP results are shown below:

TABLE 39

Metals Separation from Mining Water

| Concentration (ppm) | Feed water | Electrosorptive Cavitation |
|---|---|---|
| Ag | | |
| Al | 90.64 | 31.77 |
| As | | |
| B | | |
| Ba | 0.0043 | 0.0074 |
| Be | 0.0032 | |
| Bi | | |
| Ca | 188.4 | 179 |
| Cd | | 2.84 |
| Co | 0.321 | 0.277 |
| Cr | | |
| Cu | 1.74 | 8.48 |
| Fe | 155.2 | 10.77 |
| K | 1.44 | 1.66 |
| Li | | |
| Mg | 97.55 | 92.94 |
| Mn | 6.94 | 9.63 |
| Mo | | |
| Na | 21.48 | 21.27 |
| Ni | 0.277 | 0.142 |
| P | | |
| Pb | | |
| S | 656.8 | 345.2 |
| Sb | | |
| Se | | |
| Si | 14.9 | 7.48 |
| SO4 | 1968 | 1034 |
| Sr | 0.402 | 0.389 |
| Te | | |
| Ti | | |
| Tl | | |
| V | | |
| Zn | 0.914 | 1.06 |
| Zr | 0.006 | |

Example 8—Algal Culture Processing Using Electrosorptive Cavitation

1. Extraction of Lipids from *Chlorella sorokiniana*

Figure 53:
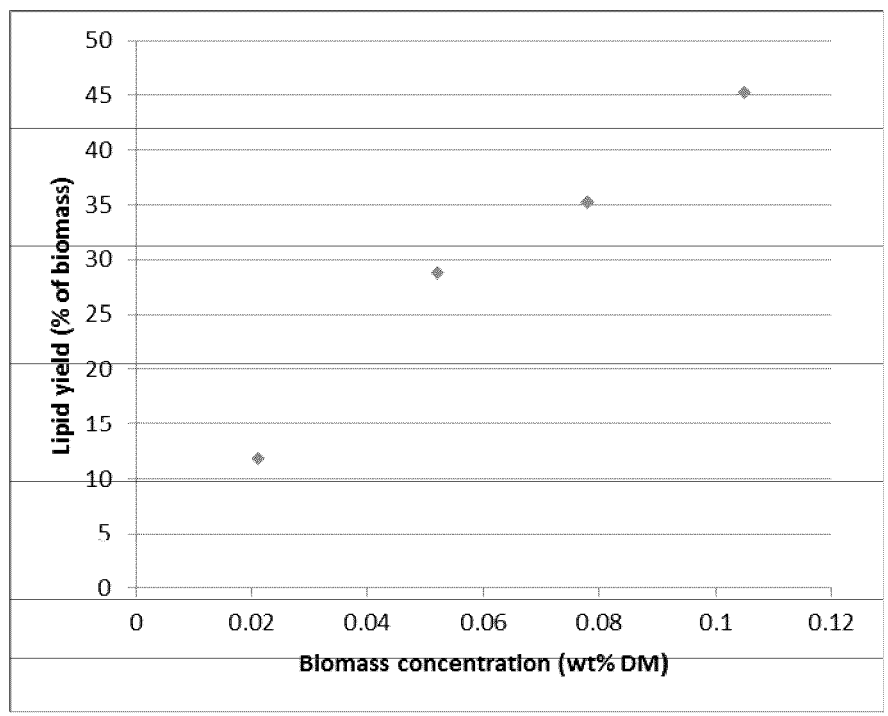
FIG. 53 depicts a graph illustrating lipid yield as a function of biomass concentration following lipid extraction from *Chlorella sorokiniana* using electrosorptive cavitation.

*Chlorella sorokiniana* samples treated by cavitation demonstrated an increasing trend of crude lipid recovery relative to biomass loading, approaching 50% recovery in the lipid fraction at 0.1 wt % dry solids biomass loading. Results are shown below in Table 40, and in FIG. 53.

TABLE 40

Lipid Recovery Using Electrosorptive Cavitation on *Chlorella sorokiniana* samples

| Algal Biomass (wt %) | Lipid recovery (mg) | lipid/biomass (%) | Conductivity (µS/cm) Before treatment | Post-treatment |
|---|---|---|---|---|
| 0.021 | 0.5 | 11.90 | 6.9 | 17.3 |
| 0.052 | 3 | 28.85 | 14.9 | 16.9 |
| 0.078 | 5.5 | 35.26 | 17.5 | 20.6 |
| 0.105 | 9.5 | 45.24 | 20.4 | 38.2 |

2. Conductivity Analysis of Different Algal Cultures

Results are shown below in Table 41. With the exception of *C. vulgaris*, the culture conductivity generally increased following ultrasound treatment compared to untreated samples, indicating the release of polar intracellular components.

TABLE 41

Conductivity of Different Algal Cultures Before and After Treatment

| Strain | Loading (% w/v) | Conductivity (µS/cm) Pre | Post |
|---|---|---|---|
| *Botryococcus* #66-02 | 0.008 | 9.7 | 13.5 |
|  | 0.020 | 19 | 15.3 |
|  | 0.030 | 17 | 19 |
|  | 0.040 | 19 | 21 |
| *Chlorella vulgaris* #208-01 | 0.023 | 9.1 | 8.5 |
|  | 0.057 | 19.2 | 13.5 |
|  | 0.086 | 13.5 | 5 |
|  | 0.114 | 20.5 | 25 |
| *Chlorella sorokiniana* #282-02 | 0.021 | 6.9 | 17.3 |
|  | 0.052 | 14.9 | 16.9 |
|  | 0.078 | 17.5 | 20.6 |
|  | 0.105 | 20.4 | 38.2 |
| *Scenedesmus* sp. #173-13 | 0.024 | 7.9 | 9.5 |
|  | 0.060 | 13.8 | 15 |
|  | 0.090 | 17.8 | 21.3 |
|  | 0.120 | 38.7 | 39.8 |

Example 9—Viscosity Analysis Using Tri-County Protein Soybean Oil

Soybean oil, a high viscosity liquid, was subjected to cavitation and did not demonstrate a significant change using either low or high frequency cavitation. 200 mL samples were treated with varying times and duty cycles at varying frequency at 4/6 amplitude. Viscosity was recorded pre and post-treatment. Results are shown below in Table 42.

TABLE 42

Soybean oil viscosity results following cavitation.

| Sample | Viscosity (cP) | Cavitation Period (min.) |
|---|---|---|
| soybean oil untreated | 63.4 | 0 |
| soybean oil – near sonic frequency | 54.4 | 2.5 |
| soybean oil + higher frequency | 54.4 | 2.5 |
| soybean oil + hydrodynamic cavitation | 66.4 | 5 |
| soybean oil higher frequency/cavitation | 63.7 | 5 |

As a slight change was observed in the case of lower frequency operations, electrosorptive cavitation at higher flow rates may allow for a higher removal efficiency.

Example 10—Electrosorptive Cavitation with *B. braunii*

Dispersions were prepared in 20 L BBM/tap water at 720 µS and used for two runs at low/high pressure. Lipids accumulated in the collections float cell were skimmed along with the biomass with clear high conductivity water without biomass in the continuous operation. Due to lipid bubble attachment, the cells were found to be trapped in the interstitial spaces between the lipid-bubble generated froth. To overcome this separation issue, in the last trials, collected foam was broken in a sieve, centrifuged, and the top foam layer collected by aspiration for $CHCl_3$ extraction to achieve better separation with minimal water present. Solids separated by centrifugation were freeze-dried to determine the final dry biomass to establish stoichiometry. Results are shown below in Table 43.

TABLE 43

Large-scale lipid recovery results with *B. Braunii*

| Sample | Pressure (psig) | Feed Culture Solids (wt %) | Phases Biomass Solids (g) | Lipid recovered (g) | Lipid recovered (mg) | Biomass wt recovered biomass | wt starting biomass |
|---|---|---|---|---|---|---|---|
| *Botryococcus* #66-02 | 300 | 0.094117 | 5.65 | 1.5901 | 8 | 0.14 | 0.50 |

TABLE 43-continued

Large-scale lipid recovery results with *B. Braunii*

| | | | Phases | | | |
| | | | Lipid | | Biomass | |
| | | Feed Culture | Biomass | Lipid | wt | wt |
| Sample | Pressure (psig) | Solids (wt %) | Solids (g) | recovered (g) | recovered (mg) | recovered biomass | starting biomass |
|---|---|---|---|---|---|---|---|
| *Botryococcus* #66-02 | 1100 | 0.094117 | 5.65 | 1.1043 | 8.5 | 0.15 | 0.77 |

During the operation, the electrosorptive system was operated at 30V DC and 10 A to obtain clear water flow without any lipids or biomass.

Example 11—Nanochloropsis Strain Grown with Marine Media with Low Lipid Yield

| Concentration (wt %) | Treatment | Conductivity μS | Lipid (mg) |
|---|---|---|---|
| 0.019434 | DTE | 79.3 | 4.5 |
| 0.019434 | eCav | 85.1 | 6.5 |

During this study, the focus was on determining the technology potential for low lipid yielding algae and to compare the potential of the electrosorptive cavitation method of the present application (eCav) to electrosorption or cavitation independently. Lipid extraction recovery was greater following treatment, and conductivity also increased indicating lipid release.

Untreated samples were compared to cavitation, 5 min 36 V electrosorption, and electrosorptive cavitation treatment. Micrographs of treatments (FIG. 54) were obtained to determine the benefits of the individual processes and compare them to electrosorptive cavitation treatment. Results are shown below in Table 44.

TABLE 44

Comparison of Cavitation, Electrosorption, and Electrosorptive cavitation on Conductivity and Biomass Recovery

| Concentration (wt %) | Treatment | Conductivity | pH | Recovered Biomass (g DM) |
|---|---|---|---|---|
| 0.097171 | Control | 408 | 8.2 | 0.135 |
| 0.097171 | Cavitation | 429 | 7.78 | 0.123 |
| 0.097171 | Electrosorption | 334 | 8.5 | 0.236 |
| 0.097171 | Electrosorptive cavitation | 338 | 8.67 | 0.206 |

Results:

Biomass yield was nearly 2× for electrosorption treatment as compared to untreated samples or treatment by cavitation alone, and was similar to electrosorptive cavitation, where the precipitates of the ionic species were not observed. Supernatants following centrifugation after electrosorption were much clearer than untreated samples or those treated by cavitation alone. Micrographs (FIG. 54) demonstrated planktonic cells in untreated and cavitation treatment samples, while samples treated by electrosorption and electrosorptive cavitation showed agglomeration.

Due to the brackish nature of the growth media, the system is subjected to other contaminants and the precipitation of the ionic species is critical and can be represented by reduced conductivity.

Figure 54:
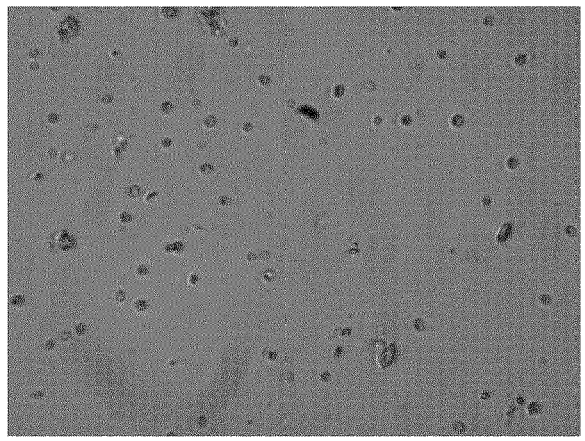
FIG. 54 depicts micrographs taken of low lipid yielding algae in (A) untreated samples; (B) samples treated using electrosorptive cavitation—showing global agglomeration; (C) samples treated using cavitation with longer residence time; and (D) samples treated using electrosorption only—showing limited agglomeration.
Figure 54:
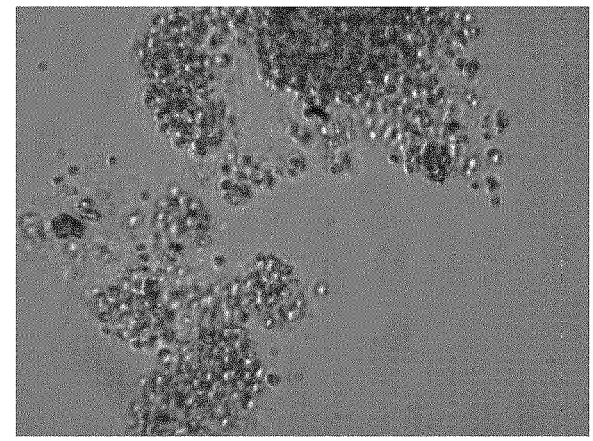
Figure 54:
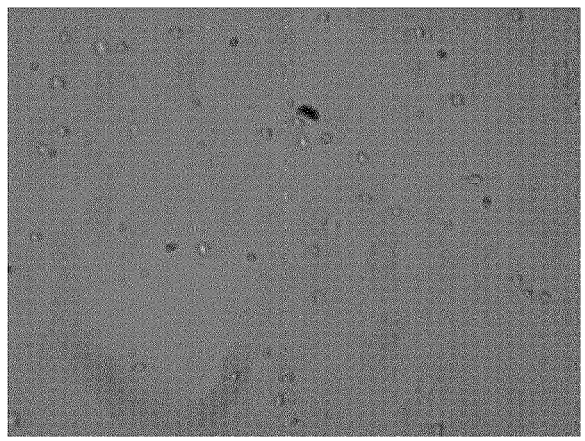
Figure 54:
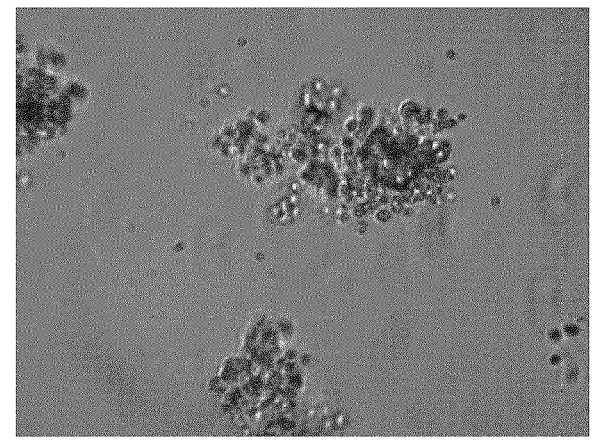

Electrosorptive cavitation conductivity decrease is substantially higher than cavitation as the advanced oxidative process initiated during cavitation is further enhanced by the immediate initiation of electrosorption, an advanced oxidation process that does not release lipids but the initiated cavitation voids propagate further energy dissipation and resulting added lipid due other than promoting agglomeration of algal cells. Thus, an indication of the benefits of electrosorptive cavitation is provided through the higher conductivity and pH within the solution. To confirm the findings, the micrographs shown in FIG. 54 show agglomeration of the cells throughout the solution using electrosorptive cavitation. This was not observed in the case of electrosorption treatment, where sporadic areas of agglomeration were observed.

Example 12—Mine Affected Water Treatment Using Electrosorptive Cavitation

1. Development of an Optimum Condition for Selenium Removal from Coal Mine Affected Waters A range of advanced oxidation treatment methods were applied in addition to electrosorptive cavitation on coal mine waters to determine the removal efficiency. Ultrasound based methods are limited for large scale mine waters. The objective of this work was to develop an approach to address high volume (throughput) treatment to remove selenium from coal mining affected waters.

Figure 55:
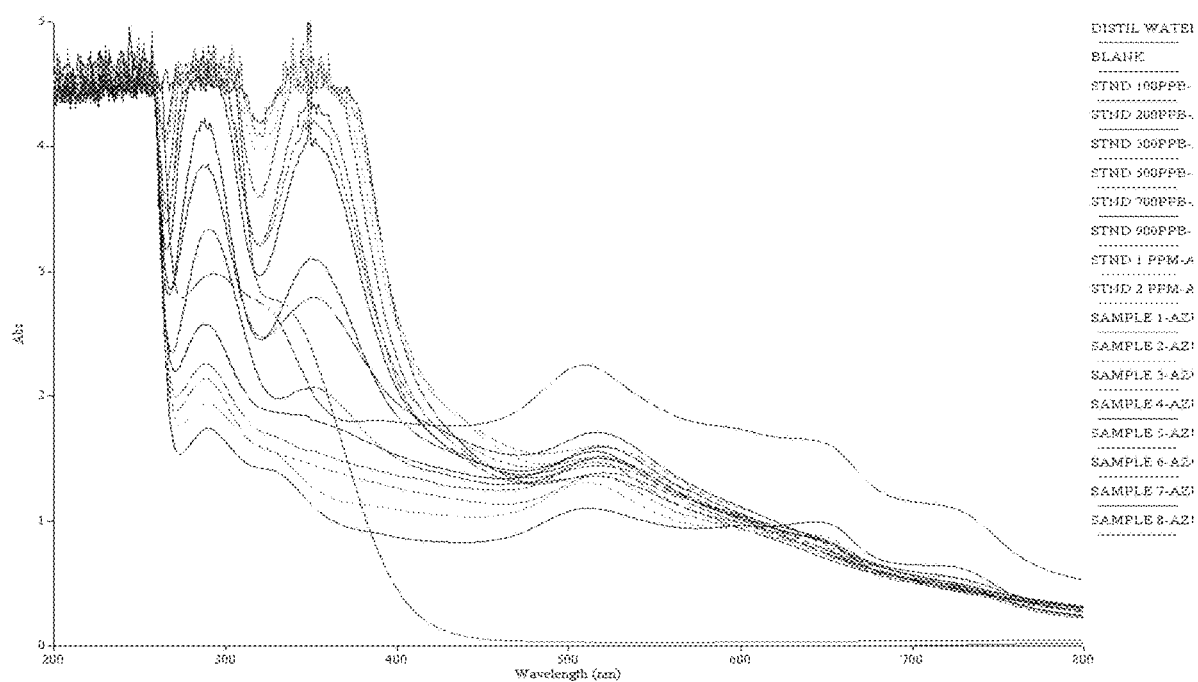
FIG. 55 shows the UV-Vis spectra of a range of coal mine water samples treated to remove selenium using oxidation treatment methods and electrosorptive cavitation.

Modified coal mining effluent water with initial pH 7.68. Different experimental conditions as below:

S1: Cavitation treatment with frequency of 574 kHz, power input 50%, sonication time 30 min.
S2: Cavitation treatment with frequency of 40 kHz, amplitude 50%, sonication time 1 hour.
S3: Cavitation treatment with frequency of 20 kHz, amplitude 80%, sonication time 1 hour.
S4: Oxidation treatment by adding 1 ml $H_2O_2$, 0.2 g $FeSO_4 \cdot 7H_2O$, pH 7.68, shaking for 1 h at 200 rpm.
S5: Oxidation-Cavitation treatment with addition of 0.2 g $FeSO_4 \cdot 7H_2O$, pH 7.68 with frequency of 40 kHz, power input 80%, sonication time 1 hour, sample volume 350 mL
S6: Ozonation treatment with ozone dose 60 L/h, ozonation time 30 min, sample volume 350 mL, pH 7.68
S7: Electrosorptive cavitation treatment
S8: Oxidation treatment by adding 1 ml $H_2O_2$, 0.2 g $FeSO_4 \cdot 7H_2O$, pH (2.5-3.5), shaking for 1 h at 200 rpm, sample volume 350 mL The selenium concentration was measured by using UV-Vis spectrophotometry after each treatment. The tests were repeated three times. The results were compared with the blank solutions with known concentration of selenium. All the results obtained by UV-Vis were compared with ICP-MS results for validation of the method. The UV-Vis spectra of sample analysis are presented in FIG. 55. Different results obtained during the treatment process are presented below in Table 45.

TABLE 45

Selenium concentration obtained by UV-Vis and ICP-MS after different treatments of coal mining affected waters.

| Sample name | Total selenium UV-VIS | ICP-MS (mg/L) | COD mg/L | Ammonia-N mg/L |
|---|---|---|---|---|
| Blank | | 0.398 | | |
| Effluent | 0.5961 | 0.587 | 99.6 | 3.58 |
| S1 | 0.4843 | 0.420 | — | 2.6 |
| S2 | 0.4902 | 0.416 | 72 | 2.36 |
| S3 | 0.3676 | 0.390 | 67.2 | 2.89 |
| S4 | 0.3524 | 0.392 | 80 | 2.79 |
| S5 | 0.3473 | 0.364 | 81.6 | 2.08 |
| S6 | 0.5127 | 0.447 | 73.6 | 3.48 |
| S7-Electrosorption | 0.4931 | 0.430 | 72 | 3.47 |

Tuning of Cavitation System: Using the above conditions, cavitation in the electrosorptive cavitation system was operated at a reduced pressure to only form incipient cavities.

| Cavitation Pressure Psi | Selenium concentration in effluent mg/L |
|---|---|
| 1500 | 430 |
| 1100 | 170 |
| 600 | 78 |
| 300 | 19 |
| 250 | 8 (incipient cavitation) |

2. Gold Mine Process Water Treatment i. Selenium Removal

A sample of gold mine processing water, sample CAV-S2, was obtained from a gold refining operation. Treatment was focused on selenium removal only. As seen below in Table 46, substantial reduction of selenium from the original mine water (at a concentration of Se=1 ppm) to 0.369 ppm was achieved through this treatment. Results for samples CAV-S10, CAV-S11 AND CAV-S12 show the effects of change in cavitation pressure on selenium removal in the electrosorptive cavitation system.

TABLE 46

Results for the removal of selenium from gold processing waters using electrosorptive cavitation.

| Sample No | Flow (l/min) | Sample Description | Date Sampled | Parameter | Aluminum μg/L | Antimony μg/L | Silver μg/L | Arsenic μg/L | Barium μg/L |
|---|---|---|---|---|---|---|---|---|---|
| Raw Water Condition | | CAV-S-2 | Jul. 28, 2017 | G/S 8600542 RDL | 5-100 9.00 5 | 1.00 1 | 0.26 <0.2 0.2 | 6.0 10.3 0.3 | 10.00 2 |
| 300 psi 9 Hz-9.1 V, 9.7 A | 10.300 | 1.104 | CAV-S-10 | Jul. 28, 2017 8600550 | 206.00 50sek-920 ml | 1.00 | <0.2 | 8.2 | 10.00 |
| 600 psi 12 Hz 8.9 V, 9.7 A | 11.600 | 1.48 | CAV-S-11 | Jul. 28, 2017 8600551 | 393.00 30sek-740 ml | 1.00 | <0.2 | 20.6 | 10.00 |
| 900 psi, 16 Hz 11.0 V 9.9 A | 12.900 | 1.89 | CAV-S-12 | Jul. 28, 2017 8600552 | 12.00 30sek-945 ml | 1.00 | <0.2 | 6.8 | 30.00 |

| Sample No | Flow (l/min) | Sample Description | Boron μg/L | Cadmium μg/L | Chromium μg/L | Cobalt μg/L | Copper μg/L | Manganese μg/L |
|---|---|---|---|---|---|---|---|---|
| Raw Water Condition | | CAV-S-2 | <40 40 | 0.09 0.2 0.1 | <1 1 | 0.002-0.004 <0.5 0.5 | 2-4 6.00 1 | 3.00 1 |
| 300 psi 9 Hz-9.1 V, 9.7 A | 10.300 | 1.104 CAV-S-10 | 77.00 | 0.3 | 2.00 50sek-920 ml | <0.5 | 10.00 | 22.00 |
| 600 psi 12 Hz 8.9 V, 9.7 A | 11.600 | 1.48 CAV-S-11 | 34.00 | 0.3 | 2.00 30sek-740 ml | <0.5 | 10.00 | 18.00 |

TABLE 46-continued

Results for the removal of selenium from gold processing waters using electrosorptive cavitation.

| | | | | | | | | | |
|---|---|---|---|---|---|---|---|---|---|
| 900 psi, 16 Hz 11.0 V 9.9 A | 12.900 | 1.89 | CAV-S-12 | 93.00 | 0.4 | <1 | <0.5 | 14.00 | 1.00 |
| | | | | 30sek-945 ml | | | | | |

| | Sample No | Flow (l/min) | Sample Description | Molybdenum µg/L | Nickel µg/L | Lead Unit µg/L | Selenium µg/L | Sodium µg/L | Zinc µg/L |
|---|---|---|---|---|---|---|---|---|---|
| Raw Water Condition | | | CAV-S-2 | 73 2.00 1 | 25-150 46.00 1 | 1-7 <0.5 0.5 | 1 1,010.00 1 | 17.90000 2 | 30 9.00 3 |
| 300 psi 9 Hz-9.1 V, 9.7 A | 10.300 | 1.104 | CAV-S-10 50sek-920 ml | 2.00 | 22.00 | <0.5 | 383.00 | 17.10000 | 6.00 |
| 600 psi 12 Hz 8.9 V, 9.7 A | 11.600 | 1.48 | CAV-S-11 30sek-740 ml | 2.00 | 24.00 | <0.5 | 658.00 | 17.10000 | 8.00 |
| 900 psi, 16 Hz 11.0 V 9.9 A | 12.900 | 1.89 | CAV-S-12 30sek-945 ml | 2.00 | 70.00 | <0.5 | 369.00 | 17.40000 | 10.00 |

| | | | | | Parameter | | | | | | |
|---|---|---|---|---|---|---|---|---|---|---|---|
| | | Sample Description | Date Sampled | | Aluminum µg/L | Antimony µg/L | Silver µg/L | Arsenic Unit µg/L | Barium µg/L G/S | Boron µg/L | Cadmium µg/L | Chromium µg/L |
| Raw Water | | CAV.S.2 | Jul. 28, 2017 | 8600542 | 5-100 9 00 | 1 00 | 0 25 <0.2 | 5 0 10.3 | 10.00 | <40 | 0 09 0.2 | <1 |

| Condition | Sample No | Flow (l/min) | | | RDL | | | | | | | |
|---|---|---|---|---|---|---|---|---|---|---|---|---|
| | | | | | 5 | 1 | 0.2 | 0 3 | 2 | 40 | 0.1 | 1 |
| 300 psi. 9 Hz 9 1 V. 97A | 10-300 | 1 104 | CAV.S.10 50 sek-920 ml | Jul. 28, 2017 | 8600550 | 206 00 | 1 00 | <0 2 | 8.2 | 10 00 | 77 00 | 0.3 | 2.00 |
| 600 psi. 12 Hz 8 9 V 97A | 11-600 | 1 48 | CAV.S.11 30 sek-740 ml | Jul. 28, 2017 | 8600551 | 393 00 | 1 00 | <0 2 | 20.6 | 10 00 | 84 00 | 0.3 | 2 00 |
| 900 psi. 16 Hz 11 0 V 9.9A | 12-900 | 1.89 | CAV.S.12 30 sek-945 ml | Jul. 28, 2017 | 8600552 | 12 00 | 1 00 | <0 2 | 6.8 | 30 00 | 93 00 | 0.4 | <1 |

-continued

| | | | Parameter | | | | | | | | | |
|---|---|---|---|---|---|---|---|---|---|---|---|---|
| | | | Cobalt | Copper | Manganese | Molybdenum | Nickel | Lead | Selenium | Sodium | Zinc |
| | | | | | | | Unit | | | | |
| | Sample | Date | µg/L | µg/L | µg/L | µg/L | µg/L G/S | µg/L | µg/L | µg/L | µg/L |
| | Description | Sampled | 0 002-0 004 | 2-4 | | | 73 | 25-150 | 1-7 | 1 | | 30 |
| Raw Water | CAV.S.2 | Jul. 28, 2017 | <0 5 | 6 00 | 3 00 | 2 00 | 46 00 | <0.5 | 1,010.00 | 17.900 00 | 9 00 |

| | Sample | Flow | | RDL | | | | | | | |
|---|---|---|---|---|---|---|---|---|---|---|---|
| Condition | No | (l/min) | | 0.5 | 1 | 1 | 1 | 1 | 0.5 | | 2 | 3 |
| 300 psi. 9 Hz 9 1 V. 97 A | 10-300 | 1 104 | CAV.S.10 Jul. 28, 2017 50 sek-920 ml | <0 5 | 10.00 | 22.00 | 2 00 | 22.00 | <0 5 | 383.00 | 17.100 00 | 6 00 |
| 600 psi. 12 Hz 8 9 V 97 A | 11-600 | 1 48 | CAV.S.11 Jul. 28, 2017 30 sek-740 ml | <0 5 | 10 00 | 18 00 | 2 00 | 24 00 | <0 5 | 658.00 | 17.100 00 | 8 00 |
| 900 psi. 16 Hz 11 0 V 9.9 A | 12-900 | 1.89 | CAV.S.12 Jul. 28, 2017 30 sek-945 ml | <0 5 | 14 00 | 1 00 | 2 00 | 70 00 | <0 5 | 369.00 | 17.400 00 | 10 00 | i. Salt Removal

Treatment of gold mining and extraction waters that are not selenium rich necessarily contain contaminants, such as salt and copper. Table 47 shows the salt and copper removal efficiency at incipient cavitation conditions of 250 psi and electrosorption operation a 30 V and 10 A.

TABLE 47

Results for the removal of salt and copper from gold processing waters using electrosorptive cavitation

| Assays | | | Gold Mining | Initial Cavitation | Controlled Cavitation |
|---|---|---|---|---|---|
| Metals | Unit | RDL | Affected Water | Processing | after Tuning |
| Aluminum | µg/L | 50 | 18.00 | 18,800.00 | 541.00 |
| Antimony | µg/L | 1 | 434.00 | 433.00 | 2.00 |
| Silver | µg/L | 0.2 | 0.4 | 0.5 | <0.2 |
| Arsenic | µg/L | 3 | 586.00 | 547.00 | <3 |
| Barium | µg/L | 2 | 49.00 | 55.00 | 60.00 |
| Boron | µg/L | 40 | 586.00 | 560.00 | <40 |
| Cadmium | µg/L | 0.2 | <0.1 | <0.1 | <0.2 |
| Chromium | µg/L | 1 | 2.00 | 15.00 | <1 |
| Cobalt | µg/L | 0.5 | 240.00 | 234.00 | <0.5 |
| Copper | µg/L | 1 | 23.00 | 184.00 | 3.00 |
| Iron | µg/L | 60 | <60 | 142.00 | <60 |
| Manganese | µg/L | 1 | 22.00 | 40.00 | 18.00 |
| Molybdenum | µg/L | 1 | 20.00 | 54.00 | <1 |
| Nickel | µg/L | 1 | 0.5 | 2.3 | 11.00 |
| Selenium | µg/L | 1 | 18.00 | 19.00 | <1 |
| Sodium | µg/L | 650 | 340,000.00 | 351,000.00 | 14,400.00 |
| Zinc | µg/L | 3 | 4.00 | 31.00 | 7.00 |

Example 13—Comparison of Continuous Electrosorptive Cavitation with Electrosorption and Cavitation Carried Out in Separate Processes To demonstrate that the two processes involved in the present apparatus and method cannot be de-coupled with equal results, the electrosorptive cavitation equipment was operated (i) as a continuous electrosorptive cavitation process, and (ii) as 2 different process stages with an intermediate tank after cavitation that was pumped at the same flow rate using a separate pump into the electrosorptive process stage.

An aqueous feed consisting of *Botryococcus braunii* culture dispersed at 0.5 g/L in basal mineral media with conductivity of 720 µS was subjected to 2 different configurations 1. Electrosorptive cavitation and subjected to low pressure cavitation at 300 psi fed directly into the electrosorptive system at 36 VDC/10 A without additional residence time and 2. The same culture was subjected to low pressure cavitation and the cavitation outlet flow was collected in a reservoir and then pumped into the electrosorption system An aqueous feed consisting of *Botryococcus* culture dispersed at 0.5 g/L in basal mineral media with conductivity of 720 µS was subjected to cavitation through a nozzle at 300 psi, and directly fed into a column containing steel coil and aluminum rod electrodes at 36 VDC/10 A for electrosorption.

To compare the effect of separate cavitation and electrosorption treatments in sequence, the feed was also run through the cavitation nozzle followed by a resting period of 5 minutes, to allow dissipation of generated cavitation bubbles prior to electrosorption. It was then passed through the electrode column at the same flow rate used in the integrated cavitation-electrosorption experiment, producing similar residence times in each treatment but removing any synergistic effects caused by the presence of active cavitation bubbles during electrosorption with a 5 minute residence time in the process.

Figure 56:
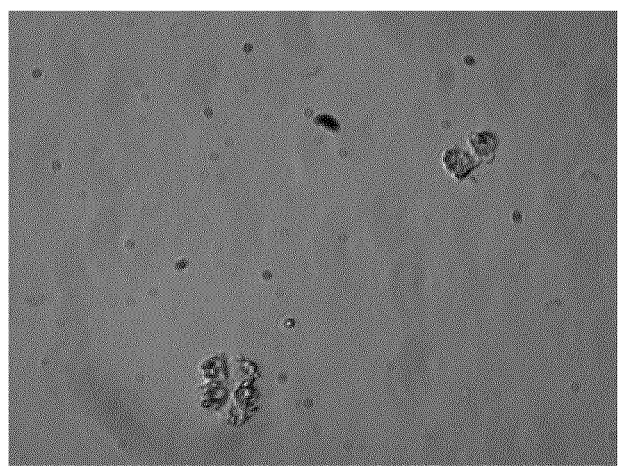
FIG. 56 shows micrographs of the biomass analysed using continuous electrosorptive cavitation compared with electrosorption and cavitation carried out in separate processes.
Figure 56:
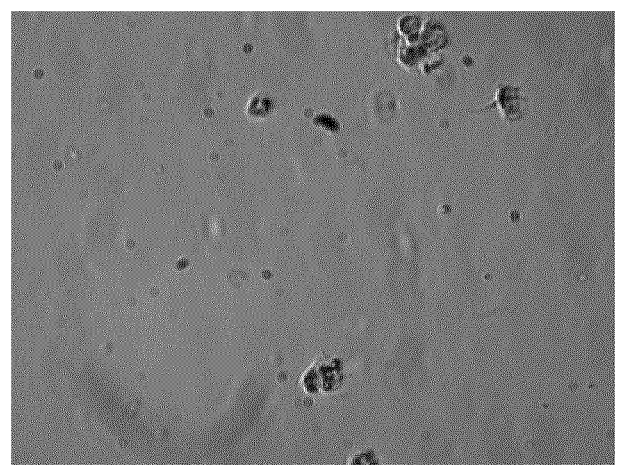
Figure 56:
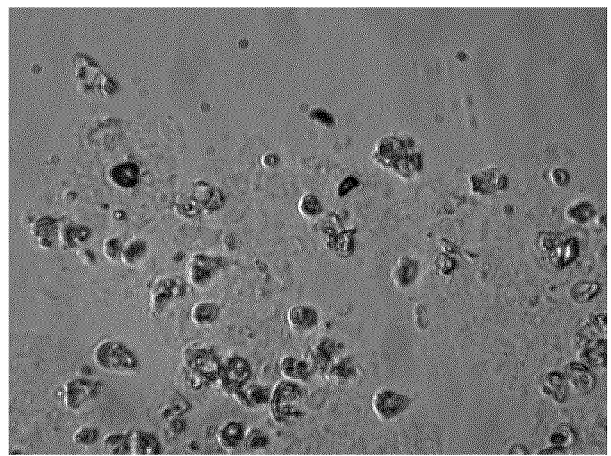
Figure 56:
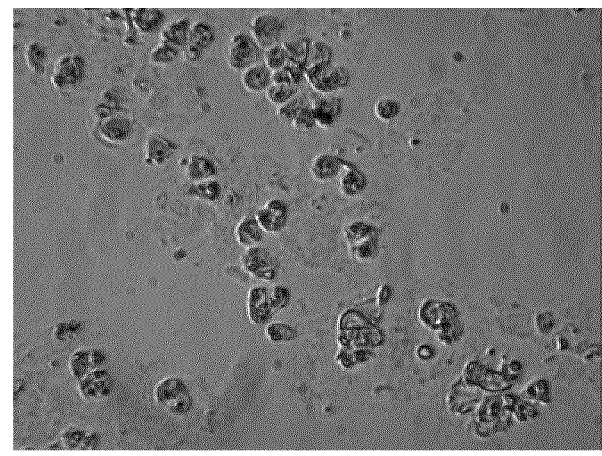
Figure 56:
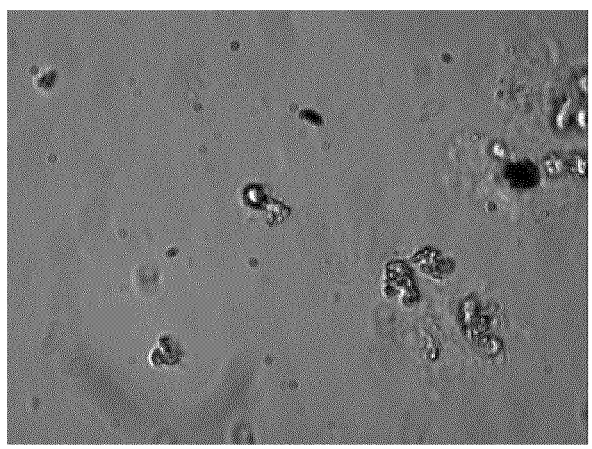
Figure 56:
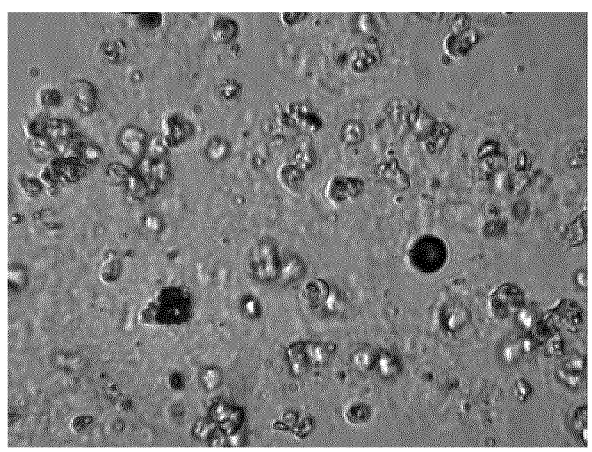
Figure 56:
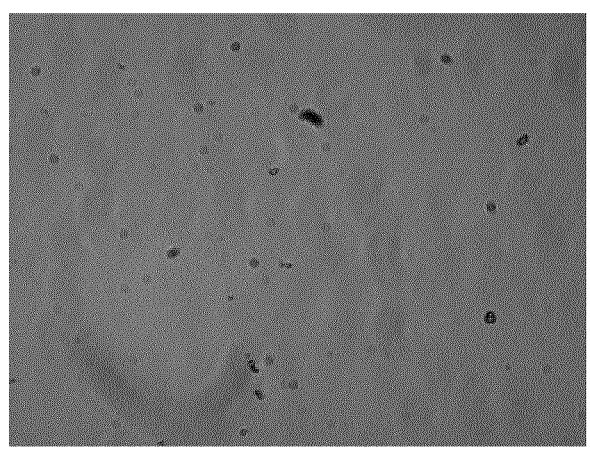

Photographs of the samples, micrographs of the biomass, and optical density measurements were taken and are shown in Table 48 below and in FIGS. 56 and 57. A large increase in the amount of lipid layer (foam) is shown for the integrated electrosorptive cavitation process relative to the same sample subjected to separate cavitation followed by a delay prior to electrosorption.

Optical density measurements were reduced by approximately 50% relative to the feed, indicating removal of biomass from the dispersion.

TABLE 47

Optical density measurements

| Culture Sample | OD 600 (Represents optical density of algae to determine biomass agglomeration) |
|---|---|
| Raw feed 0.5 g/L *Botryococcus* | 0.538 |
| Nozzle only | 0.595 |
| Nozzle -> electrode separately (Aqueous flow-through) | 0.314 |
| Nozzle -> electrode separately (Foam) | 8.67 |
| Nozzle + electrode integrated (Aqueous flow-through) | 0.321 |
| Nozzle + electrode integrated (Foam) | 7.68 |
| Nozzle + electrode integrated (Aqueous settled) | 0.12 |

Example 14—Gold Mining Effluent Water Treatment

Gold mine effluent water with a high turbidity of 5.4 was subjected to electrosorptive cavitation (e-Cav) and the water quality is reported below in Table 48. Assays performed to determine metals content before and after e-Cav show that there is a significant reduction in sodium (reduced by ~45%). This indicates that the process can be applied for de-salting applications from mine water effluents.

TABLE 48

Analysis of gold mine effluent water subjected to electrosorptive cavitation

| Sample Name | Sample Tag | Aluminum (mg/L) | Silver (mg/L) | Arsenic (mg/L) | Cobalt (mg/L) | Copper (mg/L) | Iron (mg/L) | Manganese (mg/L) | Molybdenum (mg/L) | Nickel (mg/L) | Selenium (mg/L) | Sodium (mg/L) |
|---|---|---|---|---|---|---|---|---|---|---|---|---|
| LDR | LDR | 0.04 | 0.020 | 0.05 | 0.01 | 0.1 | 0.1 | 0.01 | 0.01 | 0.01 | 0.15 | 0.200 |
| Effluent (PARC-1) | S1-R-C | 0.35 | 0.209 | 0.14 | 0.67 | 33.1 | 1.1 | 0.71 | 0.05 | 7.64 | 0.16 | 919.00 |
| PARC-1 Processed (e-Cav Process at 600 psi) | S1-P-600-C | 13.1 | 0.026 | 0.09 | | 16.8 | 1.5 | 0.42 | 0.03 | 4.31 | 0.15 | 540.00 |

To examine the impact of lower feed turbidity on the same mine affected water, pre-treated samples with reduced turbidity were subjected to the electrosorptive cavitation process. The initial and processed effluent characteristics are shown below in Table 49.

The e-Cav process shows a reduction in metals with a significant reduction in selenium—a hard to remove contaminant.

TABLE 49

Analysis of pretreated mine affected water (from Table 48 feed) with a reduced turbidity of 2.49.

| Tag | No. C/N | Silver µg/L | Barium µg/L | Boron µg/L | Cadmium µg/L | Chrome µg/L | Cobalt µg/L | Copper Units µg/L | Iron µg/L | Manganese µg/L | Nickel µg/L | Lead µg/L | Selenium µg/L | Zinc µg/L |
|---|---|---|---|---|---|---|---|---|---|---|---|---|---|---|
| LDR | LDR | 0.2 | 2 | 40 | 0.1 | 1 | 0.5 | 1 | 60 | 1 | 1 | 0.5 | 1 | 3 |
| S3-R-C-N | 8780230 | 4.10 | 37.00 | 121.00 | <0.1 | <1 | 242.00 | 390.00 | <60 | 35.00 | 42.00 | <0.5 | 117.00 | 33.00 |
| S3-AX-600 | 8780220 | 2.10 | 51.00 | 556.00 | 0.20 | 13.00 | 235.00 | 520.00 | 168.00 | 48.00 | 97.00 | 8.10 | 21.00 | 36.00 |

Example 15—Benchmarking of Selenium Removal Between Best Available Physico-Chemical Technologies (Ion Exchange and Adsorption)

The selenium extraction results described herein were further benchmarked with a best available technology—ion exchange process.

Ion Exchange with a Strong Base Anion Resin (Amberlite IRA 410) was evaluated to benchmark the removal of selenium from metallurgical coal waters (The same metallurgical coal affected water samples above were subjected to ion exchange and adsorption). (See FIG. 58)

Much lower selenium at less than 1 ppb was obtained with a fully regenerated bed. However, in less than 9 bed volumes selenium breakout above 60 ppb (beyond all known environmental discharge limits) was achieved and full exhaustion occurred at 15 bed volumes showing that the process was not suitable for large volume mine affected water.

To compare the performance of ion exchange vs. electrosorptive cavitation, the same water sample was run through the e-Cav system and the effluent selenium concentration was determined to be 8 ppb consistently for over 100 bed volumes (equivalent).

Benchmarking of the process with the same metallurgical coal affected mine water was also performed using a speciality oxy-anion adsorbent. (See FIG. 59). ADSORBSIA™ As600 media is an easy to use granular titanium oxide with strong affinity for arsenic (exists as arsenate or arsenite-oxy-anion form of arsenic in water, lead and other heavy metals. This distinct media is designed for non-regenerative applications. The inherently high adsorptive capacity of Dow's titanium oxide based technology has been formulated into a mechanically stable granulation suitable for use in a broad range of potable water applications. Because it is based on titanium, ADSORBSIA As600 does not support bacterial growth as will iron based media. However, as shown in FIG. 59, the selenium concentration of coal affected mine effluent was not significantly affected by the use of As-600 over 15 bed volumes and the effluent concentration was 400 ppb or higher throughout the evaluation. The exhaustive experiment showed a reduction to 175 ppb over 20 bed volumes but was far from the effluent discharge limits at the end of the process cycle.

One or more illustrative embodiments have been described by way of example. It will be understood to persons skilled in the art that a number of variations and modifications can be made without departing from the scope of the invention as defined in the claims.

What is claimed is:

1. A phase separation device for performing continuous phase separation of an aqueous mixture, said device comprising:
    a cavitation assembly for cavitating the aqueous mixture to produce a cavitated aqueous mixture; wherein the cavitation assembly comprises a tangential flow aqueous mixture inlet, a vortex stabilizer in communication with the tangential flow aqueous mixture inlet, and a nozzle in communication with the vortex stabilizer, wherein the nozzle comprises a restriction flow channel and a divergent outlet in communication with the electrosorption assembly; and
    an electrosorption assembly for receiving the cavitated aqueous mixture and performing an electrosorptive phase separation of the cavitated aqueous mixture; the electrosorption assembly comprising a non-sacrificial cathode and a non-sacrificial anode.

2. The device of claim 1, wherein the nozzle comprises the restriction flow channel having a length L and a diameter d, wherein the restriction flow channel receives the aqueous mixture and directs the aqueous mixture to the divergent outlet; wherein the cavitated aqueous mixture comprises cavitation voids comprising vapour, and wherein the electrosorptive phase separation of the cavitated aqueous mixture includes electrosorptive vapour bubble generation.

3. The device of claim 2, wherein the restriction flow channel has a d/L ratio of 0.005-0.02.

4. The device of claim 2, wherein d is 0.03-0.0625 inches.

5. The device of claim 1, wherein the vortex stabilizer comprises a vortex stabilizer insert comprising a conical portion having a longitudinal slit for allowing vortexing aqueous mixture to exit the vortex stabilizer and enter the nozzle.

6. The device of claim 1, wherein the divergent outlet comprises a conical channel which progressively widens toward the electrosorption assembly with a divergent angle of 30°-45°.

7. The device of claim 1, wherein the divergent outlet has a diameter to length ratio of 0.1875-0.3.

8. The device of claim 1, wherein the cathode comprising a conductive spiral tube with a central core and the anode comprising a conductive member disposed within the central core.

9. The device of claim 8, wherein the cathode comprises a carbon-based conductive material, $TiO_2$, copper, brass, aluminum, or stainless steel.

10. The device of claim 8, wherein the conductive spiral tube of the cathode comprises two or more turns, wherein each turn, in combination with the anode, forms a distinct electrochemical cell.

11. The device of claim 1, wherein the device is configured vertically or on an incline, such that the electrosorption assembly receives the cavitated aqueous mixture at a bottom end thereof and performs electrosorptive phase separation of the cavitated aqueous mixture as the cavitated aqueous mixture moves toward a top end of the electrosorption assembly, the top end being elevated relative to the bottom end.

12. The device of claim 1, wherein the cathode forms an outer shell defining an interior core, and the anode is disposed within the core.

13. The device of claim 12, wherein the cathode comprises a continuous conductive member, or a plurality of individual conductive members longitudinally aligned in series.

14. The device of claim 13, wherein the cathode comprises a tube, spiral, or coil.

* * * * *